United States Patent
Liu et al.

(10) Patent No.: US 11,173,692 B2
(45) Date of Patent: Nov. 16, 2021

(54) FREE RADICAL POLYMERIZABLE ADHESION-PROMOTING INTERLAYER COMPOSITIONS AND METHODS OF USE

(71) Applicant: PRC-DeSoto International, Inc., Sylmar, CA (US)

(72) Inventors: JianCheng Liu, Arcadia, CA (US); Chu Ran Zheng, Arcadia, CA (US); Kevin Cheng, San Gabriel, CA (US); Bruce Virnelson, Valencia, CA (US)

(73) Assignee: PRC-DeSoto International, Inc., Sylmar, CA (US)

( * ) Notice: Subject to any disclaimer, the term of this patent is extended or adjusted under 35 U.S.C. 154(b) by 73 days.

(21) Appl. No.: 16/721,416

(22) Filed: Dec. 19, 2019

(65) Prior Publication Data
US 2021/0187922 A1 Jun. 24, 2021

(51) Int. Cl.
B32B 27/28 (2006.01)
B32B 27/30 (2006.01)
B32B 27/26 (2006.01)
B32B 27/40 (2006.01)

(52) U.S. Cl.
CPC ............ *B32B 27/286* (2013.01); *B32B 27/26* (2013.01); *B32B 27/308* (2013.01); *B32B 27/40* (2013.01); *B32B 2305/72* (2013.01)

(58) Field of Classification Search
CPC ..... B32B 27/286; B32B 27/308; B32B 27/26; B32B 27/40; B32B 2305/72
See application file for complete search history.

(56) References Cited

U.S. PATENT DOCUMENTS

| | | | |
|---|---|---|---|
| 3,022,196 A | 2/1962 | Jenkins et al. |
| 4,366,307 A | 12/1982 | Singh et al. |
| 4,389,432 A | 6/1983 | Inoue et al. |
| 4,609,762 A | 9/1986 | Morris et al. |
| 5,178,675 A | 1/1993 | Sexsmith |
| 5,225,472 A | 7/1993 | Cameron et al. |
| 5,650,474 A | 7/1997 | Yamaya et al. |
| 5,750,197 A | 5/1998 | Van Ooij et al. |
| 5,888,656 A | 3/1999 | Suzuki et al. |
| 6,172,179 B1 | 1/2001 | Zook et al. |
| 6,525,168 B2 | 2/2003 | Zook et al. |
| 6,875,836 B2 | 4/2005 | Yoshihara et al. |
| 7,438,974 B2 | 10/2008 | Obuhowich |
| 8,513,339 B1 | 8/2013 | Keledjian et al. |
| 2001/0032568 A1 | 10/2001 | Schutt |
| 2001/0036554 A1 | 11/2001 | Jin et al. |
| 2004/0091716 A1 | 5/2004 | Van den Berg et al. |
| 2004/0131793 A1 | 7/2004 | Bier et al. |
| 2005/0245695 A1 | 11/2005 | Cosman |
| 2006/0105101 A1 | 5/2006 | Pialet et al. |
| 2006/0275616 A1 | 12/2006 | Clough et al. |
| 2008/0081120 A1 | 4/2008 | Van Ooij et al. |
| 2008/0268162 A1 | 10/2008 | Borovik et al. |
| 2008/0268216 A1 | 10/2008 | Schwoeppe et al. |
| 2010/0010133 A1 | 1/2010 | Zook et al. |
| 2010/0041839 A1 | 2/2010 | Anderson et al. |
| 2010/0191001 A1 | 7/2010 | Wassmer et al. |
| 2011/0148294 A1 | 6/2011 | Krajka et al. |
| 2011/0268899 A1 | 11/2011 | Albert et al. |
| 2011/0319559 A1 | 12/2011 | Kania et al. |
| 2012/0040103 A1 | 2/2012 | Keledjian et al. |
| 2012/0040104 A1 | 2/2012 | Keledjian et al. |
| 2013/0284359 A1 | 10/2013 | Virnelson |
| 2013/0344287 A1 | 12/2013 | Keledjian et al. |
| 2013/0345372 A1 | 12/2013 | Blackford et al. |
| 2014/0069293 A1 | 3/2014 | Albert et al. |
| 2014/0186543 A1 | 7/2014 | Keledjian et al. |
| 2014/0272155 A1 | 9/2014 | Kramer et al. |
| 2014/0275461 A1 | 9/2014 | Rao et al. |
| 2015/0115311 A1 | 4/2015 | Yoshida et al. |
| 2016/0200913 A1 | 7/2016 | Matsukawa et al. |
| 2018/0194979 A1 | 7/2018 | Cui et al. |
| 2019/0010370 A1 | 1/2019 | Lin et al. |

FOREIGN PATENT DOCUMENTS

| | | |
|---|---|---|
| CN | 1407042 A | 4/2003 |
| CN | 103773235 A | 5/2014 |
| EA | 001588 B1 | 6/2001 |
| JP | 54063176 A | 5/1979 |
| JP | 56125464 A | 10/1981 |
| JP | 2000-256620 A | 9/2000 |
| JP | 2003-176360 A | 6/2003 |
| JP | 2003-531924 A | 10/2003 |
| JP | 2010-537016 A | 12/2010 |
| JP | 5525431 A | 6/2011 |
| RU | 2447113 C2 | 9/2007 |
| RU | 2392288 C2 | 6/2010 |
| RU | 2524342 C1 | 7/2014 |
| WO | 2016/205741 A1 | 12/2016 |
| WO | 2020/167626 A1 | 8/2020 |

OTHER PUBLICATIONS

Heitz et al., "Cross-condensation and particle growth in aqueous silane mixtures at low concentration," Journal of Colloid and Interface Science, 2006, vol. 298, p. 192-201.
International Search Report and Written Opinion for PCT Application No. PCT/US2016/020602, dated Jun. 1, 2016, 8 pages.
International Search Report and Written Opinion for Application No. PCT/US2020/065775, dated Jul. 6, 2021, 6 pages.

*Primary Examiner* — Michael C Miggins
(74) *Attorney, Agent, or Firm* — William R. Lambert

(57) ABSTRACT

Adhesion-promoting compositions and the use of the adhesion-promoting compositions to provide adhesion-promoting interlayers to enhance adhesion between adjoining layers of sulfur-containing sealants are disclosed. In repair applications, the adhesion-promoting compositions can enhance the adhesion of an overlying radiation-curable sulfur-containing sealant to a damaged or aged sulfur-containing sealant.

24 Claims, No Drawings

FREE RADICAL POLYMERIZABLE ADHESION-PROMOTING INTERLAYER COMPOSITIONS AND METHODS OF USE

FIELD

The disclosure relates to adhesion-promoting compositions and the use of the adhesion-promoting compositions to provide adhesion-promoting interlayers to enhance adhesion between adjoining layers of sulfur-containing sealants. In repair applications, the adhesion-promoting compositions can enhance the adhesion of an overlying radiation-curable sulfur-containing sealant to a damaged or aged sulfur-containing sealant.

BACKGROUND

It is desirable that a sealant adhere to a variety of substrates including to underlying sealant layers. A sealant layer can become damaged and/or aged during use and it can become necessary to repair the damaged and/or sealant with a layer of fresh sealant.

SUMMARY

According to the present invention, adhesion-promoting compositions comprise a free radical polymerizable compound; a free radical initiator; and a volatile organic solvent.

According to the present invention, multilayer sealants comprise a first sulfur-containing sealant layer, wherein the first sulfur-containing sealant layer comprises a cross-linked first sulfur-containing prepolymer; an adhesion-promoting interlayer overlying the first sulfur-containing sealant layer; and a second sulfur-containing sealant layer overlying the adhesion-promoting interlayer, wherein the second sulfur-containing sealant layer comprises a free radical polymerized second sulfur-containing prepolymer, wherein the adhesion-promoting interlayer comprises a crosslinked free radical polymerized compound.

According to the present invention, methods of sealing a surface comprise applying the adhesion-promoting composition of claim 1 to a sulfur-containing sealant layer; drying the applied adhesion-promoting composition; applying a free radical polymerizable sulfur-containing sealant composition to the dried adhesion-promoting composition; and initiating free radical polymerization of the sulfur-containing sealant composition to cure the sulfur-containing sealant composition, and thereby seal the surface.

DETAILED DESCRIPTION

For purposes of the following detailed description, it is to be understood that embodiments provided by the present disclosure may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

A dash ("-") that is not between two letters or symbols is used to indicate a point of bonding for a substituent or between two atoms. For example, —$CONH_2$ is attached through the carbon atom.

"Alkanediyl" refers to a diradical of a saturated or unsaturated, branched or straight-chain, acyclic hydrocarbon group, having, for example, from 1 to 18 carbon atoms ($C_{1-18}$), from 1 to 14 carbon atoms ($C_{1-14}$), from 1 to 6 carbon atoms ($C_{1-6}$), from 1 to 4 carbon atoms ($C_{1-4}$), or from 1 to 3 hydrocarbon atoms ($C_{1-3}$). A branched alkanediyl has a minimum of three carbon atoms. An alkanediyl can be $C_{2-14}$ alkanediyl, $C_{2-10}$ alkanediyl, $C_{2-8}$ alkanediyl, $C_{2-6}$ alkanediyl, $C_{2-4}$ alkanediyl, or $C_{2-3}$ alkanediyl. Examples of alkanediyl groups include methanediyl (—$CH_2$—), ethane-1,2-diyl (—$CH_2CH_2$—), propane-1,3-diyl and iso-propane-1,2-diyl (e.g., —$CH_2CH_2CH_2$— and —$CH(CH_3)CH_2$—), butane-1,4-diyl (—$CH_2CH_2CH_2CH_2$—), pentane-1,5-diyl (—$CH_2CH_2CH_2CH_2CH_2$—), hexane-1,6-diyl (—$CH_2CH_2CH_2CH_2CH_2CH_2$—), heptane-1,7-diyl, octane-1,8-diyl, nonane-1,9-diyl, decane-1,10-diyl, and dodecane-1,12-diyl. Alkanediyl groups can include single, double, and/or triple bonds between carbon atoms.

"Alkanecycloalkyl" refers to a saturated hydrocarbon group having one or more cycloalkyl and/or cycloalkanediyl groups and one or more alkyl and/or alkanediyl groups, where cycloalkyl, cycloalkanediyl, alkyl, and alkanediyl are defined herein. Each cycloalkyl and/or cycloalkanediyl group(s) can be $C_{3-6}$, $C_{5-6}$, cyclohexyl or cyclohexanediyl. Each alkyl and/or alkanediyl group(s) can be $C_{1-6}$, $C_{1-4}$, $C_{1-3}$, methyl, methanediyl, ethyl, or ethane-1,2-diyl. An alkanecycloalkyl group can be $C_{4-8}$ alkanecycloalkyl ane, $C_{4-16}$ alkanecycloalkyl, $C_{4-12}$ alkanecycloalkyl, $C_{4-8}$ alkanecycloalkyl, $C_{6-12}$ alkanecycloalkyl, $C_{6-10}$ alkanecycloalkyl, or $C_{6-9}$ alkanecycloalkyl. Examples of alkanecycloalkyl groups include 1,1,3,3-tetramethylcyclohexane and cyclohexylmethane.

"Alkanecycloalkanediyl" refers to a diradical of an alkanecycloalkane group. An alkanecycloalkanediyl group can be $C_{4-18}$ alkanecycloalkanediyl, $C_{4-16}$ alkanecycloalkanediyl, $C_{4-12}$ alkanecycloalkanediyl, $C_{4-8}$ alkanecycloalkanediyl, $C_{6-12}$ alkanecycloalkanediyl, $C_{6-10}$ alkanecycloalkanediyl, or $C_{6-9}$ alkanecycloalkanediyl. Examples of alkanecycloalkanediyl groups include 1,1,3,3-tetramethylcyclohexane-1,5-diyl and cyclohexylmethane-4,4'-diyl.

"Alkanearene" refers to a hydrocarbon group having one or more aryl and/or arenediyl groups and one or more alkyl and/or alkanediyl groups, where aryl, arenediyl, alkyl, and alkanediyl are defined here. Each aryl and/or arenediyl group(s) can be $C_{6-12}$, $C_{6-10}$, phenyl or benzenediyl. Each alkyl and/or alkanediyl group(s) can be $C_{1-6}$, $C_{1-4}$, $C_{1-3}$, methyl, methanediyl, ethyl, or ethane-1,2-diyl. An alkanearene group can be $C_{4-18}$ alkanearene, $C_{4-16}$ alkanearene, $C_{4-12}$ alkanearene, $C_{4-8}$ alkanearene, $C_{6-12}$ alkanearene, $C_{6-10}$ alkanearene, or $C_{6-9}$ alkanearene. Examples of alkanearene groups include diphenyl methane.

"Alkanearenediyl" refers to a diradical of an alkanearene group. An alkanearenediyl group can be $C_{4-18}$ alkanearenediyl, $C_{4-16}$ alkanearenediyl, $C_{4-12}$ alkanearenediyl, $C_{4-8}$ alkanearenediyl, $C_{6-12}$ alkanearenediyl, $C_{6-10}$ alkanearenediyl, or $C_{6-9}$ alkanearenediyl. An example of an alkanearenediyl group is diphenyl methane-4,4'-diyl.

"Alkenyl" group refers to the structure $-CR=C(R)_2$ where the alkenyl group is a terminal group and is bonded to a larger molecule. In such embodiments, each R can independently comprise, for example, hydrogen and $C_{1-3}$ alkyl. Each R can be hydrogen and an alkenyl group can have the structure $-CH=CH_2$.

"Alkynyl" group refers to the structure $-C\equiv CR$ where the alkynyl group is a terminal group and is bonded to a larger molecule. In such embodiments, each R can independently comprise, for example, hydrogen or $C_{1-3}$ alkyl. Each R can be hydrogen and an alkynyl group can have the structure $-C\equiv CH$.

"Alkoxy" refers to a $-OR$ group where R is alkyl as defined herein. Examples of alkoxy groups include methoxy, ethoxy, n-propoxy, isopropoxy, and n-butoxy. An alkoxy group can be, for example, $C_{1-8}$ alkoxy, $C_{1-6}$ alkoxy, $C_{1-4}$ alkoxy, or $C_{1-3}$ alkoxy.

"Alkyl" refers to a monoradical of a saturated, branched or straight-chain, acyclic hydrocarbon group having, for example, from 1 to 20 carbon atoms, from 1 to 10 carbon atoms, from 1 to 6 carbon atoms, from 1 to 4 carbon atoms, or from 1 to 3 carbon atoms. It will be appreciated that a branched alkyl has a minimum of three carbon atoms. An alkyl group can be, for example, $C_{1-6}$ alkyl, $C_{1-4}$ alkyl, or $C_{1-3}$ alkyl. Examples of alkyl groups include methyl, ethyl, n-propyl, iso-propyl, n-butyl, iso-butyl, tert-butyl, n-hexyl, n-decyl, and tetradecyl.

"Arenediyl" refers to diradical monocyclic or polycyclic aromatic group. Examples of arenediyl groups include benzene-diyl and naphthalene-diyl. An arenediyl group can be, for example, $C_{6-12}$ arenediyl, $C_{6-10}$ arenediyl, $C_{6-9}$ arenediyl, or benzene-diyl.

"Cycloalkanediyl" refers to a diradical saturated monocyclic or polycyclic hydrocarbon group. A cycloalkanediyl group can be, for example, $C_{3-12}$ cycloalkanediyl, $C_{3-8}$ cycloalkanediyl, $C_{3-6}$ cycloalkanediyl, or $C_{5-6}$ cycloalkanediyl. Examples of cycloalkanediyl groups include cyclohexane-1,4-diyl, cyclohexane-1,3-diyl and cyclohexane-1,2-diyl.

"Cycloalkyl" refers to a saturated monocyclic or polycyclic hydrocarbon mono-radical group. A cycloalkyl group can be, for example, $C_{3-12}$ cycloalkyl, $C_{3-8}$ cycloalkyl, $C_{3-6}$ cycloalkyl, or $C_{5-6}$ cycloalkyl.

"Heteroalkanediyl" refers to an alkanediyl group in which one or more of the carbon atoms are replaced with a heteroatom, such as N, O, S, and/or P. In a heteroalkanediyl, the one or more heteroatoms can be N and/or O.

"Heterocycloalkanediyl" refers to a cycloalkanediyl group in which one or more of the carbon atoms are replaced with a heteroatom, such as N, O, S, and/or P. In a heterocycloalkanediyl, the one or more heteroatoms can be N and/or O.

"Heteroarenediyl" refers to an arenediyl group in which one or more of the carbon atoms are replaced with a heteroatom, such as N, O, S, and/or P. In a heteroarenediyl, the one or more heteroatoms can be N and/or O.

A "polyalkenyl" refers to a compound having at least two alkenyl groups. The at least two alkenyl groups can be terminal alkenyl groups and such polyalkenyls can be referred to as alkenyl-terminated compounds. Alkenyl groups can also be pendent alkenyl groups. A polyalkenyl can be a dialkenyl, having two alkenyl groups. A polyalkenyl can have more than two alkenyl groups such as from three to six alkenyl groups. A polyalkenyl can comprise a single type of polyalkenyl, can be a combination of polyalkenyls having the same alkenyl functionality, or can be a combination of polyalkenyls having different alkenyl functionalities.

A "polyalkenyl prepolymer" refers to a polyalkenyl having at least one repeat unit in the polyalkenyl backbone. A polyalkenyl prepolymer generally can have a molecular weight in the range from 500 Da to 6,000 Da, such as from 500 Da to 4,000 Da or from 500 Da to 2,000 Da.

A "monomeric polyalkenyl" refers to a polyalkenyl that does not include repeat units in the polyalkenyl backbone. A monomeric polyalkenyl generally has a molecular weight that is less than that of a polyalkenyl prepolymer. Monomeric polyalkenyls can be difunctional or have an alkenyl functionality greater than two.

A "polyalkynyl" refers to a compound having at least two alkynyl groups. The at least two alkynyl groups can be terminal alkynyl groups and such polyalkynyls can be referred to as alkynyl-terminated compounds. Alkynyl groups can also be pendent alkynyl groups. A polyalkynyl can be a dialkenyl, having two alkynyl groups. A polyalkynyl can have more than two alkynyl groups such as from three to six alkynyl groups. A polyalkynyl can comprise a single type of polyalkynyl, can be a combination of polyalkynyls having the same alkynyl functionality, or can be a combination of polyalkynyls having different alkynyl functionalities.

A "polyalkynyl prepolymer" refers to a polyalkynyl having at least one repeat unit in the polyalkynyl backbone. A polyalkynyl prepolymer generally can have a number average molecular weight in the range from 500 Da to 6,000 Da, such as from 500 Da to 4,000 Da or from 500 Da to 2,000 Da.

A "monomeric polyalkynyl" refers to a polyalkynyl that does not include repeat units in the polyalkynyl backbone. A monomeric polyalkynyl generally has a molecular weight that is less than that of a polyalkynyl prepolymer. Monomeric polyalkynyls can be difunctional or have an alkynyl functionality greater than two.

A "multifunctional (meth)acrylate" refers to a compound having at least two (meth)acryloyl groups. The at least two (meth)acryloyl groups can be terminal (meth)acryloyl groups and such multifunctional (meth)acrylates can be referred to as (meth)acryloyl-terminated compounds. (Meth) acryloyl groups can also be pendent (meth)acryloyl groups. A multifunctional (meth)acrylate can be a di(meth)acrylate, having two (meth)acryloyl groups. A multifunctional (meth) acrylate can have more than two (meth)acryloyl groups such as from three to six (meth)acryloyl groups. A multifunctional (meth)acrylate can comprise a single type of multifunctional (meth)acrylate, can be a combination of multifunctional (meth)acrylates having the same (meth)acryloyl functionality, or can be a combination of multifunctional (meth)acrylates having different (meth)acryloyl functionalities.

A "multifunctional (meth)acrylate prepolymer" refers to a multifunctional (meth)acrylate having at least one repeat unit in the multifunctional (meth)acrylate backbone. A multifunctional (meth)acrylate prepolymer generally can have a number average molecular weight in the range from 500 Da to 6,000 Da, such as from 500 Da to 4,000 Da or from 500 Da to 2,000 Da.

A "monomeric multifunctional (meth)acrylate" refers to a multifunctional (meth)acrylate that does not include repeat units in the multifunctional (meth)acrylate backbone. A monomeric multifunctional (meth)acrylate generally has a molecular weight that is less than that of a multifunctional (meth)acrylate prepolymer. Monomeric multifunctional (meth)acrylates can be difunctional or have a (meth)acryloyl functionality greater than two.

"Reaction product of" means a chemical reaction product(s) of at least the recited reactants and can include partial reaction products as well as fully reacted products and other reaction products that are present in a lesser amount. For example, a "prepolymer comprising the reaction product of reactants" refers to a prepolymer or combination of prepolymers that are the reaction product of the recited reactants.

A compound having a thiol functionality, or an alkenyl functionality refers to a compound which has reactive thiol or alkenyl groups, respectively. The reactive thiol or alkenyl groups may be terminal groups bonded to the ends of the molecule, may be bonded to the backbone of the molecule, or the compound may contain thiol or alkenyl groups that are terminal groups and are bonded to the backbone.

As used herein, the term "cure" or "cured" as used in connection with a composition, e.g., "composition when cured" or a "cured composition", means that any curable or cross-linkable components of the composition are at least partially reacted or crosslinked.

The term "equivalent" refers to the number of functional reactive groups of the substance.

"Equivalent weight" is effectively equal to the molecular weight of a substance, divided by the valence or number of functional reactive groups of the substance.

A "backbone" of a prepolymer refers to the segment between the reactive terminal groups. A prepolymer backbone typically includes repeating subunits. For example, the backbone of a polythiol HS—$[R]_n$—SH is —$[R]_n$—.

A "core" of a polyfunctionalizing agent B(—V)$_z$ refers to the moiety B. A "core" of a compound or a polymer refers to the segment between the reactive terminal groups. For example, the core of a polythiol HS—R—SH will be —R—. A core of a compound or prepolymer can also be referred to as a backbone of a compound or a backbone of a prepolymer. A core of a polyfunctionalizing agent can be an atom or a structure such as a cycloalkane, a substituted cycloalkane, heterocycloalkane, substituted heterocycloalkane, arene, substituted arene, heteroarene, or substituted heteroarene from which moieties having a reactive functional are bonded.

"Prepolymer" includes homopolymers and copolymers. For thiol-terminated prepolymers, molecular weights are number average molecular weights "Mn" as determined by end group analysis using iodine titration. For prepolymers that are not thiol-terminated, the number average molecular weights are determined by gel permeation chromatography using polystyrene standards. A prepolymer comprises reactive groups capable of reacting with another compound such as a curing agent or crosslinker to form a cured polymer. A prepolymer such as a chain-extended polythioether prepolymer provided by the present disclosure can be combined with a curing agent to provide a curable composition, which can cure to provide a cured polymer network. Prepolymers are liquid at room temperature (23° C.) and pressure (760 torr; 101 kPa).

"Oligomers" generally have a lower molecular weight than a prepolymer and can comprise, for example, less than 10 repeat units, less than 8 repeat units, less than 6 repeat units, or less than 4 repeat units.

A prepolymer includes multiple repeating subunits bonded to each other than can be the same or different. The multiple repeating subunits make up the backbone of the prepolymer.

A "curable composition" refers to a composition that comprises at least two reactants capable of reacting to form a cured composition. For example, a curable composition can comprise an isocyanate-terminated chain-extended polythioether prepolymer and a polyamine capable of reacting to form a cured polymer. A curable composition may include a catalyst for the curing reaction and other components such as, for example, filler, pigments, and adhesion promoters. A curable composition may be curable at room temperature or may require exposure to elevated temperature such as a temperature above room temperature or other condition(s) to initiate and/or to accelerate the curing reaction. A curable composition can be a free radical polymerizable composition in which the curing reaction proceeds in the presence of free radicals. A curable composition may initially be provided as a two-part composition including, for example, a separate base component and an accelerator component. The base composition can contain one of the reactants participating in the curing reaction such as an isocyanate-terminated chain-extended polythioether prepolymer and the accelerator component can contain the other reactant such as a polyamine. The two components can be mixed shortly before use to provide a curable composition. A curable composition can exhibit a viscosity suitable for a particular method of application. For example, a Class A sealant composition, which is suitable for brush-on applications, can be characterized by a viscosity from 1 poise to 500 poise (0.1 Pa-sec to 50 Pa-sec). A Class B sealant composition, which is suitable for fillet seal applications, can be characterized by a viscosity from 4,500 poise to 20,000 poise (450 Pa-sec to 2,000 Pa-sec). A Class C sealant composition, which is suitable for fay seal applications, can be characterized by a viscosity from 500 poise to 4,500 poise (50 Pa-sec to 450 Pa-sec). The viscosity of the sealant compositions (curable compositions) is measured as described herein. After the two components of a sealant system are combined and mixed, the curing reaction can proceed, and the viscosity of the curable composition can increase and at some point, will no longer be workable, as described herein. The duration between when the two components are mixed to form the curable composition and when the curable composition can no longer be reasonably or practically applied to a surface for its intended purpose can be referred to as the working time. As can be appreciated, the working time can depend on a number of factors including, for example, the curing chemistry, the catalyst used, the application method, and the temperature. Once a curable composition is applied to a surface (and during application), the curing reaction can proceed to provide a cured composition. A cured composition develops a tack-free surface, cures, and then fully cures over a period of time. A curable composition can be considered to be cured when the hardness of the surface is at least Shore 30A for a Class B sealant or a Class C sealant. After a sealant has cured to a hardness of Shore 30A it can take from several days to several weeks for a curable composition fully cure. A composition is considered fully cured when the hardness no longer increases. Depending on the formulation, a fully cured sealant can exhibit, for example, a hardness from Shore 40A to Shore 70A. All Shore hardness values disclosed herein are determined according to ISO 868. For coating applications, a curable composition can have a viscosity, for example, from 200 cps to 800 cps (0.2 Pa-sec to 0.8 Pa-sec). For sprayable coating and sealant compositions, a curable composition can have a viscosity, for example, from 15 cps to 100 cps (0.015 Pa-sec to 0.1 Pa-sec), such as from 20 cps to 80 cps (0.02 Pa-sec to 0.0.8 Pa-sec).

"SCOD" refers to cure on demand sealants. Cure-on-demand sealants can include free radical polymerizable compositions in which the curing reaction proceeds in the presence of free radicals. Free radicals can be generated using radiation-activated free radical initiators, thermally-activated free radical initiators, and/or chemically-activated free radical initiators. SCOD sealants can be formulated as Class A, Class B, or Class C sealants as described in the preceding paragraph. A SCOD sealant in which the free radical curing reaction is initiated upon exposure to UV is referred to as a UV SCOD sealant.

"Substituted" refers to a group in which one or more hydrogen atoms are each independently replaced with the same or different substituent(s). A substituent can comprise halogen, —S(O)$_2$OH, —S(O)$_2$, —SH, —SR where R is $C_{1-6}$ alkyl, —COOH, —NO$_2$, —NR$_2$ where each R is independently hydrogen and $C_{1-3}$ alkyl, —CN, =O, $C_{1-6}$ alkyl, —CF$_3$, —OH, phenyl, $C_{2-6}$ heteroalkyl, $C_{5-6}$ heteroaryl, $C_{1-6}$ alkoxy, or —C(O)R where R is $C_{1-6}$ alkyl. A substituent can be —OH, —NH$_2$, or $C_{1-3}$ alkyl.

"Derived from" as in "a moiety derived from a compound" refers to a moiety that is generated upon reaction of a parent compound with a reactant. For example, a bis (alkenyl) compound CH$_2$=CH—R—CH=CH$_2$ can react with another compound such as a compound having thiol groups to produce the moiety —(CH$_2$)$_2$—R—(CH$_2$)$_2$— derived from the reaction of the alkenyl groups with the thiol groups. For example, for a parent diisocyanate having the structure O=C=N—R—N=C=O, a moiety derived from the diisocyanate has the structure —C(O)—NH—R—NH—C(O)—. As another example, for a parent non-linear short chain diol having the structure HO—R—OH, a moiety derived from the non-linear short-chain diol has the structure —O—R—O—.

"Derived from the reaction of —V with a thiol" refers to a moiety —V'— that results from the reaction of a thiol group with a moiety comprising a terminal group reactive with a thiol group. For example, a group V— can comprise CH$_2$=CH—CH$_2$—O—, where the terminal alkenyl group CH$_2$=CH— is reactive with a thiol group —SH. Upon reaction with a thiol group, the moiety —V'— is —CH$_2$—CH$_2$—CH$_2$—O—.

"Dark cure" refers to curing mechanisms that do not require exposure to actinic radiation such as UV radiation to initiate the curing reaction. Actinic radiation may be applied to a dark cure system to accelerate curing of all or a part of a composition but exposing the composition to actinic radiation is not necessary to cure the sample. A dark cure composition can fully cure under dark conditions without exposure to actinic radiation.

Glass transition temperature $T_g$ is determined by dynamic mechanical analysis (DMA) using a TA Instruments Q800 apparatus with a frequency of 1 Hz, an amplitude of 20 microns, and a temperature ramp of −80° C. to 25° C., with the $T_g$ identified as the peak of the tan δ curve.

When reference is made to a chemical group defined, for example, by a number of carbon atoms, the chemical group is intended to include all sub-ranges of carbon atoms as well as a specific number of carbon atoms. For example, a $C_{2-10}$ alkanediyl includes a $C_{2-4}$ alkanediyl, $C_{5-7}$ alkanediyl, and other sub-ranges, a $C_2$ alkanediyl, a $C_6$ alkanediyl, and alkanediyls having other specific number(s) of carbon atoms from 2 to 10.

A polyfunctionalizing agent can have the structure of Formula (1):

$$B(\text{—V})_z \quad (1)$$

where B is the core of the polyfunctionalizing agent, each V is a moiety terminated in a reactive functional group such as a thiol group, an alkenyl group, an alkynyl group, an epoxy group, an isocyanate group, or a Michael acceptor group, and z is an integer from 3 to 6, such as 3, 4, 5, or 6. In polyfunctionalizing agents of Formula (1), each —V can have the structure, for example, —R—SH or —R—CH=CH$_2$, where R can be, for example, $C_{2-10}$ alkanediyl, $C_{2-10}$ heteroalkanediyl, substituted $C_{2-10}$ alkanediyl, or substituted $C_{2-10}$ heteroalkanediyl.

When the moiety V is reacted with another compound the moiety —V$^1$— results and is said to be derived from the reaction with the other compound. For example, when V is —R—CH=CH$_2$ and is reacted, for example, with a thiol group, the moiety V$^1$ is —R—CH$_2$—CH$_2$— is derived from the reaction.

In polyfunctionalizing agents of Formula (1), B can be, for example $C_{2-8}$ alkane-triyl, $C_{2-8}$ heteroalkane-triyl, $C_{5-8}$ cycloalkane-triyl, $C_{5-8}$ heterocycloalkane-triyl, substituted $C_{5-8}$ cycloalkene-triyl, $C_{5-8}$ heterocycloalkane-triyl, $C_6$ arene-triyl, $C_{4-5}$ heteroarene-triyl, substituted $C_6$ arene-triyl, or substituted $C_{4-5}$ heteroarene-triyl.

In polyfunctionalizing agents of Formula (1), B can be, for example, $C_{2-8}$ alkane-tetrayl, $C_{2-8}$ heteroalkane-tetrayl, $C_{8-10}$ cycloalkane-tetrayl, $C_{5-10}$ heterocycloalkane-tetrayl, $C_{6-10}$ arene-tetrayl, $C_4$ heteroarene-tetrayl, substituted $C_{2-8}$ alkane-tetrayl, substituted $C_{2-8}$ heteroalkane-tetrayl, substituted $C_{8-10}$ cycloalkane-tetrayl, substituted $C_{5-10}$ heterocycloalkane-tetrayl, substituted $C_{6-10}$ arene-tetrayl, and substituted $C_{4-10}$ heteroarene-tetrayl.

Examples of suitable alkenyl-terminated polyfunctionalizing agents include triallyl cyanurate (TAC), triallylisocyanurate (TAIC), 1,3,5-triallyl-1,3,5-triazinane-2,4,6-trione1, 3-bis(2-methylallyl)-6-methylene-5-(2-oxopropyl)-1,3,5-triazinone-2,4-dione, tris(allyloxy)methane, pentaerythritol triallyl ether, 1-(allyloxy)-2,2-bis((allyloxy)methyl)butane, 2-prop-2-ethoxy-1,3,5-tris(prop-2-enyl)benzene, 1,3,5-tris (prop-2-enyl)-1,3,5-triazinane-2,4-dione, and 1,3,5-tris(2-methylallyl)-1,3,5-triazinane-2,4,6-trione, 1,2,4-trivinylcyclohexane, and combinations of any of the foregoing.

A polyfunctionalizing agent of Formula (1) can be thiol terminated.

Examples of suitable trifunctional thiol-terminated polyfunctionalizing agents include, for example, 1,2,3-propanetrithiol, 1,2,3-benzenetrithiol, heptane-1,3-7-trithiol, 1,3,5-triazine-2,4-6-trithiol, isocyanurate-containing trithiols, and combinations thereof, as disclosed in U.S. Application Publication No. 2010/0010133, and the polythiols described in U.S. Pat. Nos. 4,366,307; 4,609,762; and 5,225, 472. Combinations of polyfunctionalizing agents may also be used.

Examples of suitable polythiol polyfunctionalizing agents include pentaerythritol tetra(3-mercapto-propionate) (PETMP), trimethylol-propane tri(3-mercaptopropionate) (TMPMP), tris[2-(3-mercapto-propionyloxy)ethyl]isocyanurate (TEMPIC), di-pentaerythritol hexa(3-mercaptopropionate) (di-PETMP), tri(3-mercaptopropionate) pentaerythritol, triethylolethane tri-(3-mercaptopropionate), and combinations of any of the foregoing.

Examples of suitable mercapto-acetate polythiol polyfunctionalizing agents include pentaerythritol tetramercaptoacetate (PRTMA), trimethylolpropane trimercaptoacetate (TMPMA), di-trimethylolpropane tetramercaptoacetate, and combinations of any of the foregoing.

Examples of suitable polythiol polyfunctionalizing agents include, tris[2-(3-mercaptopropionyloxy)ethyl]isocyanurate, 2,3-di(2-mercaptoethylthio)-1-propane-thiol, and combinations of any of the foregoing.

Other examples of polythiol polyfunctionalizing agents and polythiol monomers include pentaerythritol tetra(3-mercaptopropionate) (PETMP), pentaerythritol tetramercaptoacetate (PETMA), dipentaerythritol tetra(3-mercaptopropionate), dipentaerythritol tetramercaptoacetate, dipentaerythritol penta(3-mercaptopropionate), dipentaerythritol pentamercaptoacetate, dipentaerythritol hexa(3-mercaptopropionate), dipentaerythritol hexamercaptoacetate, ditrimethylolpropane tetra(3-mercaptopropionate), ditrimethylolpropane tetramercaptoacetate, and also alkoxylated, for example, ethoxylated and/or propoxylated, such as ethoxylated, products of these compounds. Examples include, pentaerythritol tetra(3-mercaptopropionate) (PETMP), pentaerythritol tetramercaptoacetate (PETMA), dipentaerythritol tetra(3-mercaptopropionate), dipentaerythritol tetramercaptoacetate, dipentaerythritol penta(3-mercaptopropionate), dipentaerythritol pentamercaptoacetate, dipentaerythritol hexa(3-mercaptopropionate), dipentaerythritol hexamercaptoacetate, ditrimethylolpropane tetra (3-mercaptopropionate), ditrimethylolpropane tetramercaptoacetate, particularly pentaerythritol tetra(3-mercaptopropionate) (PETMP), pentaerythritol tetramercaptoacetate (PETMA), dipentaerythritol hexa(3-mercaptopropionate), dipentaerythritol hexamercaptoacetate, ditrimethylolpropane tetra(3-mercaptopropionate), and ditrimethylolpropane tetramercaptoacetate.

Suitable polythiol polyfunctionalizing agents are commercially available, for example, from Bruno Bock Thiochemicals under the Thiocure® tradename.

"Derived from a polyfunctionalizing agent" refers to a moiety that results from the reaction of a polyfunctionalizing agent with a reactive functional group. For example, a moiety derived from the polyfunctionalizing agent triallyl cyanurate of Formula (2a):

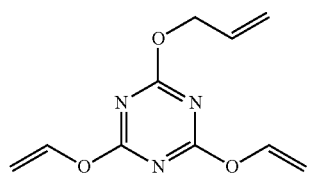

(2a)

results in a moiety having the structure of Formula (2b):

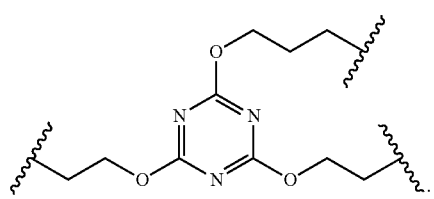

(2b)

where the segments are bonded to the other reactants.

"Polythiol polyfunctionalizing agent" refers to a polythiol having, for example, from 3 to 6 terminal thiol groups. A polythiol polyfunctionalizing agent can have a molecular weight, for example, less than 1,400 Da, less than 1,200 Da, less than 1,000 Da, less than 800 Da, less than 700 Da, less than 600 Da, less than 500 Da, less than 400 Da, less than 300 Da, less than 200 Da, or less than 100 Da. Polythiol polyfunctionalizing agents can be represented by the formula $B(-V)_z$, where $B^4$ represents a core of a z-valent polyfunctionalizing agent $B(-V)_z$, z is an integer from 3 to 6; and each —V is a moiety comprising a terminal thiol (—SH) group.

A polythiol or a polyalkenyl can be a polythiol polyfunctionalizing agent or a polyalkenyl polyfunctionalizing agent, respectively.

"Composition" is intended to encompass a product comprising the specified components in the specified amounts, as well as any product which results, directly or indirectly, from the combination of the specified ingredients in the specified amounts.

"Average molecular weight" refers to number average molecular weight. Number average molecular weight can be determined by gel permeation chromatography using a polystyrene standard, or for thiol-terminated prepolymers, can be determined using iodine titration.

"Sulfur-containing prepolymer" refers to a prepolymer in which the repeating unit of the prepolymer backbone comprises sulfur atom such as —S— or —Sn— groups. Thiol-terminated prepolymers have reactive thiol groups at the ends of the prepolymer backbone. Prepolymers can have pendent reactive thiol groups extending from the prepolymer backbone. Prepolymers having only thiol-terminal and/or only pendent thiol groups are not encompassed by a sulfur-containing prepolymer.

"Sulfur-containing sealant" refers to a sealant composition having a sulfur content, for example, greater than 10 wt %, greater than 15 wt %, greater than 17.5 wt %, greater than 20 wt %, greater than 25 wt %, or greater than 30 wt %, where wt % is based on the total weight of the organic constituents of the sealant composition. Organic constituents of a sealant composition can include polymerizable constituents such as prepolymers, monomers and polyfunctionalizing agents, adhesion promoters, and other organic additives. A sulfur-containing sealant can have a sulfur content, for example, from 10 wt % to 35 wt %, from 10 wt % to 30 wt %, from 10 wt % to 25 wt %, from 10 wt % to 20 wt %, from 12 wt % to 20 wt %, or from 14 wt % to 20 wt %, where wt % is based on the total weight of the sealant composition. Sealant compositions having a high sulfur content can be more resistant to fluids and solvents.

Reference is now made to certain compounds, compositions, and methods of the present invention. The disclosed compounds, compositions, and methods are not intended to be limiting of the claims. To the contrary, the claims are intended to cover all alternatives, modifications, and equivalents.

Adhesion between layers of sulfur-containing sealants can be enhanced by using a free radical-polymerizable composition between the layers. A free radical-polymerizable composition can be applied over an incumbent sulfur-containing sealant layer. The incumbent sealant layer can be a fresh sealant layer or a damaged and/or aged sealant layer. A sulfur-containing sealant layer such as a free radical polymerizable sulfur-containing sealant layer can be applied over a cured or uncured adhesion-promoting interlayer. The free radical-polymerizable adhesion-promoting layer can be useful for repairing damaged and/or aged sulfur-containing sealant layers.

A free radical-polymerizable adhesion-promoting interlayer can be prepared from a composition comprising a free radical-polymerizable compound, a photoinitiator, and a volatile solvent.

Free radical polymerizable compounds can comprise ethylenically unsaturated compounds. Free radical polymerizable compounds include multifunctional (meth)acrylates, polythiols and polyalkenyls and/or polyalkynyls.

Multifunctional (meth)acrylates, polythiols, polyalkenyls, and polyalkynyls can comprise a combination of compounds having a different chemical structure and/or having a different reactive functionality. A reactive functionality refers to a (meth)acryloyl group, a thiol group, an alkenyl group, or an alkynyl group.

Free radical polymerizable compounds can have an average reactive functionality, for example, of 2, two or more, three or more, four or more, or 6 or more.

Free radical polymerizable compounds can have an average reactive functionality, for example, from 2 to 10, from 2 to 8, from 2 to 6, from 2 to 4, or from 2 to 3.

Free radical polymerizable compounds can have a molecular weight, for example, from 150 Da to 2,000 Da, from 200 Da to 1,500 Da, from 300 Da to 1,000 Da, or from 400 Da to 800 Da. Free radical polymerizable compounds can have a molecular weight, for example, less than 2,000 Da, less than 1,500 Da, less than 1,000 Da, less than 800 Da, less than 700 Da, less than 600 Da, or less than 500 Da. Free radical polymerizable compounds can have a molecular weight, for example, greater than 150 Da, greater than 250 Da, greater than 500 Da, greater than 1,000 Da, or greater than 1,500 Da.

Free radical polymerizable compounds can comprise monomers, oligomers, prepolymers, or a combination of any of the foregoing. An oligomeric or polymeric free radical polymerizable compound can comprise a core terminated with free radical reactive groups. Examples of suitable cores include aliphatic polyurethanes, aromatic polyurethanes, bisphenol A type epoxides, bisphenol F type epoxides, novolac type epoxides, polyesters, silicones, and melamines. An oligomer or prepolymer can be prepared, for example, by reacting a multifunctional compound with a compound comprising a free radical reactive group and a group reactive with the core compound. For example, a diacrylate oligomer can be prepared by reacting 4,4'-isopropylidenediphenol, 1-chloro-2,3-epoxy propane, and acrylic acid to provide the corresponding bisphenol A epoxy diacrylate.

The core of an oligomeric or a polymeric free radical polymerizable compound can comprise repeating segments.

An adhesion-promoting composition provided by the present disclosure can comprise, for example, from 10 wt % to 89 wt %, from 10 wt % to 60 wt % of a free radical polymerizable compound or combination of free radical polymerizable compounds, from 15 wt % to 55 wt %, from 20 wt % to 50 wt %, from 25 wt % to 45 wt %, or from 30 wt % to 40 wt %, where wt % is based on the total weight of the adhesion-promoting composition. An adhesion-promoting composition provided by the present disclosure can comprise, for example, greater than 10 wt % of a free radical polymerizable compound or combination of free radical polymerizable compounds, greater than 15 wt %, greater than 20 wt %, greater than 25 wt %, greater than 30 wt %, greater than 35 wt %, greater than 40 wt %, greater than 45 wt %, greater than 50 wt %, greater than 60 wt %, greater than 70 wt % or greater than 90 wt %, where wt % is based on the total weight of the adhesion-promoting composition. An adhesion-promoting composition provided by the present disclosure can comprise, for example, less than 60 wt % of a free radical polymerizable compound or combination of free radical polymerizable compounds, less than 100 wt %, less than 80 wt %, less than 60 wt %, less than 50 wt %, less than 45 wt %, less than 40 wt %, less than 35 wt %, less than 30 wt %, less than 25 wt %, less than 20 wt %, or less than 15 wt %, where wt % is based on the total weight of the adhesion-promoting composition.

An adhesion-promoting composition provided by the present disclosure can comprise, for example, from 0.1 wt % to 20 wt % of a free radical initiator or combination of free radical initiators, from 0.1 wt % to 15 wt %, from 0.1 wt % to 10 wt %, from 0.2 wt % to 4.5 wt %, from 0.3 wt % to 4.0 wt %, from 0.5 wt % to 3 wt %, or from 1 wt % to 2.5 wt %, where wt % is based on the total weight of the adhesion-promoting composition. An adhesion-promoting composition provided by the present disclosure can comprise, for example, greater than 0.1 wt % of a free radical initiator or combination of free radical initiators, greater than 0.25 wt %, greater than 0.5 wt %, greater than 0.75 wt %, greater than 1 wt %, greater than 2 wt %, greater than 3 wt %, greater than 4 wt %, greater than 6 wt %, greater than 10 wt %, or greater than 15 wt %, where wt % is based on the total weight of the adhesion-promoting composition. An adhesion-promoting composition provided by the present disclosure can comprise, for example, less than 10 wt % of a free radical initiator or combination of free radical initiators, less than 15 wt %, less than 10 wt %, less than 6 wt % less than 4 wt %, less than 3 wt %, less than 2 wt %, less than 1 wt %, or less than 0.5 wt %, where wt % is based on the total weight of the adhesion-promoting composition.

An adhesion-promoting composition provided by the present disclosure can comprise, for example, from 0 wt % to 90 wt % of a volatile organic solvent or combination of volatile organic solvents, from 5 wt % to 90 wt %, from 15 wt % to 90 wt %, from 25 wt % to 90 wt %, from 35 wt % to 90 wt %, from 45 wt % to 85 wt %, from 50 wt % to 80 wt %, from 55 wt % to 75 wt %, or from 60 wt % to 70 wt %, where wt % is based on the total weight of the adhesion-promoting composition. An adhesion-promoting composition provided by the present disclosure can comprise, for example, greater than 0 wt % of a volatile organic solvent or combination of volatile organic solvents, greater than 10 wt %, greater than 20 wt %, greater than 30 wt %, greater than 45 wt %, greater than 50 wt %, greater than 55 wt %, greater than 60 wt %, greater than 65 wt %, greater than 70 wt %, greater than 75 wt %, greater than 80 wt %, or greater than 85 wt %, where wt % is based on the total weight of the adhesion-promoting composition. An adhesion-promoting composition provided by the present disclosure can comprise, for example, less than 90 wt % of a volatile organic solvent or combination of volatile organic solvents, less than 85 wt %, less than 80 wt %, less than 75 wt %, less than 70 wt %, less than 65 wt %, less than 60 wt %, less than 55 wt %, less than 50 wt %, less than 40 wt %, less than 30 wt %, less than 20 wt %, less than 10 wt %, or less than 5 wt %, where wt % is based on the total weight of the adhesion-promoting composition.

An adhesion-promoting composition provided by the present disclosure can comprise, for example, from 10 wt % to <99.9 wt % of a free radical polymerizable compound or combination of free radical polymerizable compounds, from 0.1 wt % to 20 wt % of a free radical initiator or a combination of free radical initiators; and from >0 wt % to 89.9 wt % of a volatile organic solvent or combination of volatile organic solvents, where wt % is based on the total weight of the adhesion-promoting composition. An adhesion-promoting composition provided by the present disclosure can comprise, for example, from 20 wt % to 89.6 wt % of a free radical polymerizable compound or combination of free radical polymerizable compounds, from 0.4 wt % to 15 wt % of a free radical initiator or a combination of free radical initiators; and from 10 wt % to 79.6 wt % of a volatile organic solvent or combination of volatile organic solvents, where wt % is based on the total weight of the adhesion-promoting composition. An adhesion-promoting composition provided by the present disclosure can comprise, for example, from 30 wt % to 79 wt % of a free radical polymerizable compound or combination of free radical polymerizable compounds, from 1 wt % to 10 wt % of a free radical initiator or a combination of free radical initiators; and from 20 wt % to 69 wt % of a volatile organic solvent or combination of volatile organic solvents, where wt % is based on the total weight of the adhesion-promoting composition.

An adhesion-promoting composition provided by the present disclosure can comprise, for example, greater than 10 wt % of a free radical polymerizable compound or combination of free radical polymerizable compounds, greater than 0.1 wt % of a free radical initiator or a combination of free radical initiators; and greater than 0 wt % of a volatile organic solvent or combination of volatile organic solvents, where wt % is based on the total weight of the adhesion-promoting composition. An adhesion-promoting composition provided by the present disclosure can comprise, for example, greater than 20 wt % of a free radical polymerizable compound or combination of free radical polymerizable compounds, greater than 1 wt % of a free radical initiator or a combination of free radical initiators; and greater than 10 wt % of a volatile organic solvent or combination of volatile organic solvents, where wt % is based on the total weight of the adhesion-promoting composition. An adhesion-promoting composition provided by the present disclosure can comprise, for example, greater than 30 wt % of a free radical polymerizable compound or combination of free radical polymerizable compounds, greater than 5 wt % of a free radical initiator or a combination of free radical initiators; and greater than 20 wt % of a volatile organic solvent or combination of volatile organic solvents, where wt % is based on the total weight of the adhesion-promoting composition.

An adhesion-promoting composition provided by the present disclosure can comprise, for example, less than 100 wt % of a free radical polymerizable compound or combination of free radical polymerizable compounds, less than 20 wt % of a free radical initiator or a combination of free radical initiators; and less than 90 wt % of a volatile organic solvent or combination of volatile organic solvents, where wt % is based on the total weight of the adhesion-promoting composition. An adhesion-promoting composition provided by the present disclosure can comprise, for example, less than 80 wt % of a free radical polymerizable compound or combination of free radical polymerizable compounds, less than 10 wt % of a free radical initiator or a combination of free radical initiators; and less than 70 wt % of a volatile organic solvent or combination of volatile organic solvents, where wt % is based on the total weight of the adhesion-promoting composition. An adhesion-promoting composition provided by the present disclosure can comprise, for example, less than 60 wt % of a free radical polymerizable compound or combination of free radical polymerizable compounds, less than 5 wt % of a free radical initiator or a combination of free radical initiators; and less than 30 wt % of a volatile organic solvent or combination of volatile organic solvents, where wt % is based on the total weight of the adhesion-promoting composition.

An adhesion-promoting composition provided by the present disclosure can comprise, for example, from 10 wt % to 59.9 wt % of a free radical polymerizable compound or combination of free radical polymerizable compounds, from 0.1 wt % to 5 wt % of a free radical initiator or a combination of free radical initiators; and from 40 wt % to 89.9 wt % of a volatile organic solvent or combination of volatile organic solvents, where wt % is based on the total weight of the adhesion-promoting composition. An adhesion-promoting composition provided by the present disclosure can comprise, for example, from 20 wt % to 49.5 wt % of a free radical polymerizable compound or combination of free radical polymerizable compounds, from 0.5 wt % to 4 wt % of a free radical initiator or a combination of free radical initiators; and from 50 wt % to 79.5 wt % of a volatile organic solvent or combination of volatile organic solvents, where wt % is based on the total weight of the adhesion-promoting composition. An adhesion-promoting composition provided by the present disclosure can comprise, for example, from 20 wt % to 40 wt % of a free radical polymerizable compound or combination of free radical polymerizable compounds, from 1 wt % to 3 wt % of a free radical initiator or a combination of free radical initiators; and from 55 wt % to 75 wt % of a volatile organic solvent or combination of volatile organic solvents, where wt % is based on the total weight of the adhesion-promoting composition.

An adhesion-promoting composition provided by the present disclosure can comprise, for example, greater than 10 wt % of a free radical polymerizable compound or combination of free radical polymerizable compounds, greater than 0.1 wt % of a free radical initiator or a combination of free radical initiators; and greater than 40 wt % of a volatile organic solvent or combination of volatile organic solvents, where wt % is based on the total weight of the adhesion-promoting composition. An adhesion-promoting composition provided by the present disclosure can comprise, for example, greater than 20 wt % of a free radical polymerizable compound or combination of free radical polymerizable compounds, greater than 1 wt % of a free radical initiator or a combination of free radical initiators; and greater than 50 wt % of a volatile organic solvent or combination of volatile organic solvents, where wt % is based on the total weight of the adhesion-promoting composition. An adhesion-promoting composition provided by the present disclosure can comprise, for example, greater than 30 wt % of a free radical polymerizable compound or combination of free radical polymerizable compounds, greater than 2 wt % of a free radical initiator or a combination of free radical initiators; and greater than 60 wt % of a volatile organic solvent or combination of volatile organic solvents, where wt % is based on the total weight of the adhesion-promoting composition.

An adhesion-promoting composition provided by the present disclosure can comprise, for example, less than 60 wt % of a free radical polymerizable compound or combination of free radical polymerizable compounds, less than 5 wt % of a free radical initiator or a combination of free radical initiators; and less than 90 wt % of a volatile organic solvent or combination of volatile organic solvents, where wt % is based on the total weight of the adhesion-promoting composition. An adhesion-promoting composition provided by the present disclosure can comprise, for example, less than 50 wt % of a free radical polymerizable compound or combination of free radical polymerizable compounds, less than 4 wt % of a free radical initiator or a combination of free radical initiators; and less than 80 wt % of a volatile organic solvent or combination of volatile organic solvents, where wt % is based on the total weight of the adhesion-promoting composition. An adhesion-promoting composition provided by the present disclosure can comprise, for example, less than 40 wt % of a free radical polymerizable compound or combination of free radical polymerizable compounds, less than 3 wt % of a free radical initiator or a combination of free radical initiators; and less than 70 wt % of a volatile organic solvent or combination of volatile organic solvents, where wt % is based on the total weight of the adhesion-promoting composition.

An adhesion-promoting composition can comprise, for example, from 10 wt % to <99.9 wt % of the free radical polymerizable compound; from 0.1 wt % to 20 wt % of the free radical initiator; and from 0 wt % to 89.9 wt % of the volatile organic solvent, wherein wt % is based on the total weight of the composition.

An adhesion-promoting composition can comprise, for example, from 15 wt % to 89.8 wt % of the free radical polymerizable compound; from 0.2 wt % to 18 wt % of the free radical initiator; and from 10 wt % to 84.8 wt % of the volatile organic solvent, wherein wt % is based on the total weight of the composition.

An adhesion-promoting composition can comprise, for example, from 20 wt % to 89.6 wt % of the free radical polymerizable compound; from 0.4 wt % to 15 wt % of the free radical initiator; and from 10 wt % to 79.6 wt % of the volatile organic solvent, wherein wt % is based on the total weight of the composition.

An adhesion-promoting composition can comprise, for example, from 15 wt % to 45 wt % of the free radical polymerizable compound; from 0.2 wt % to 2 wt % of the free radical initiator; and from 55 wt % to 85 wt % of the volatile organic solvent, wherein wt % is based on the total weight of the composition.

An adhesion-promoting composition can comprise, for example, from 20 wt % to 40 wt % of the free radical polymerizable compound; from 0.2 wt % to 2 wt % of the free radical initiator; and from 65 wt % to 75 wt % of the volatile organic solvent, wherein wt % is based on the total weight of the composition.

An adhesion-promoting composition can comprise, for example, from 15 wt % to 25 wt % of the free radical polymerizable compound; from 0.2 wt % to 0.6 wt % of the free radical initiator; and from 75 wt % to 85 wt % of the volatile organic solvent, wherein wt % is based on the total weight of the composition.

An adhesion-promoting composition can comprise, for example, from 35 wt % to 45 wt % of the free radical polymerizable compound; from 0.6 wt % to 1.0 wt % of the free radical initiator; and from 55 wt % to 65 wt % of the volatile organic solvent, wherein wt % is based on the total weight of the composition.

Adhesion-promoting compositions provided by the present disclosure can comprise a multifunctional (meth)acrylate or combination of multifunctional (meth)acrylates.

Suitable multifunctional (meth)acrylates can comprise two or more (meth)acryloyl groups. For example, a multifunctional (meth)acrylate can have a (meth)acryloyl functionality from 2 to 10, from 2 to 8, from 2 to 6, or from 2 to 4. A multifunctional (meth)acrylate can have a (meth) acryloyl functionality greater than 2, greater than 3, greater than 4, greater than 5, greater than 6, or greater than 8.

Suitable multifunctional (meth)acrylates can have a molecular weight, for example, from 150 Da to 2,000 Da, from 200 Da to 1,500 Da, from 300 Da to 1,000 Da, or from 400 Da to 800 Da. A multifunctional (meth)acrylate can have a molecular weight, for example, less than 2,000 Da, less than 1,500 Da, less than 1,000 Da, less than 800 Da, less than 700 Da, less than 600 Da, or less than 500 Da. A multifunctional (meth)acrylate can have a molecular weight, for example, greater than 2,000 Da, greater than 1,500 Da, greater than 1,000 Da, greater than 800 Da, greater than 700 Da, greater than 600 Da, greater than 500 Da, or greater than 150 Da.

A multifunctional (meth)acrylate can be a monomeric multifunctional (meth)acrylate, an oligomeric multifunctional (meth)acrylate, a polymeric multifunctional (meth) acrylate, or a combination thereof.

An oligomeric or polymeric (meth)acrylate comprises a core terminated with (meth)acryloyl groups. Examples of suitable cores include aliphatic polyurethanes, aromatic polyurethanes, bisphenol A type epoxy, novolac type epoxy, polyesters, silicones, and melamines. A multifunctional (meth)acrylate oligomer can be prepared, for example, by reacting a difunctional compound with acrylic acid to provide the corresponding multifunctional (meth)acrylate.

Examples of multifunctional (meth)acrylates include trimethylolpropane triacrylate (TMPTA) and tripropylene glycol diacrylate (TPGDA).

Examples of suitable difunctional acrylates include 1,6-hxanediol diacrylate, 1,6-hexanediol diacrylate (HDDA), hydroxypivalic acid neopentyl glycol diacrylate, neopentylglycol diacrylate, tripropylene glycol diacrylate, dipropylene glycol diacrylate (DPGDA), triethylene glycol diacrylate, bisphenol A $(EO)_z$ diacrylate (z=3, 4, 10, 20, or 30), tricyclodecane dimethanol diacrylate, tetraethylene glycol diacrylate, polyethylene glycol 400 diacrylate, polyethylene glycol 200 diacrylate, polyethylene glycol 600 diacrylate, bisphenol F $(EO)_z$ diacrylate (z=3 to 30), and polypropylene glycol 400 diacrylate.

Examples of suitable trifunctional acrylates include trimethylol propane triacrylate (TMPTA), tripropylene glycol diacrylate (TPGDA), trimethylol propane $(EO)_z$ triacrylate (z=3, 6, 9, or 15), glycerine $(PO)_3$ triacrylate, pentaerythritol triacrylate, trimethylolpropane $(PO)_3$ triacrylate, and tris(2-hydroxyethyl)isocyanurate triacrylate.

Examples of suitable multifunctional acrylates include pentaerythritol $(EO)_m$ tetraacrylate (m=3 to 30), ditrimethylol propane tetraacrylate, pentaerythritol tetraacrylate, dipentaerythritol pentaacrylate, and dipentaerythritol hexacrylate.

Examples of suitable difunctional methacrylates include 1,6-hexanediol dimethacrylate, 1,4-butanediol dimethacrylate, neopentyl glycol dimethacrylate, ethylene glycol dimethacrylate, diethylene glycol dimethacrylate, triethylene glycol dimethacrylate, tetraethylene glycol dmethacrylate, bisphenol A $(EO)_z$ dimethacrylate (z=3, 4, 10, or 30), 1,3-butylene glycol dimethacrylate, polyethylene glycol 400 dimethacrylate, polyethyleneglycol 200 dimethacrylate, and ethoxylated polypropyleneglycol dimethacrylate.

Examples of suitable trifunctional methacrylates include trimethylol propane trimethacrylate.

Examples of (meth)acrylate oligomers and (meth)acrylate prepolymer include aliphatic polyurethane (meth)acrylates, aromatic polyurethane (meth)acrylates, bisphenol A epoxy (meth)acrylates (bisphenol A type), bisphenol F epoxy (meth)acrylates, novolac epoxy (meth)acrylates, polyester (meth)acrylates, silicone (meth)acrylates, melamine (meth) acrylates, polybutadiene (meth)acrylates, and dendritic (meth)acrylates.

Adhesion-promoting compositions provided by the present disclosure can comprise a polythiol or a combination of polythiols and a polyalkenyl or a combination of polyalkenyls.

Adhesion-promoting compositions provided by the present disclosure can comprise a polythiol or a combination of polythiols and a polyalkynyl or a combination of polyalkynyls.

Adhesion-promoting compositions provided by the present disclosure can comprise a polythiol or a combination of polythiols; and a combination of: a polyalkenyl or a combination of polyalkenyls, and a polyalkynyl or a combination of polyalkynyls.

In compositions comprising a combination of polyalkenyls and polyalkynyls, the molar ratio of polyalkenyls to polyalkynyls can be, for example, from 5 to 60, from 10 to 50, from 15 to 40, or from 20 to 30. In compositions comprising a combination of polyalkyenyls and polyalkynyls, the molar ratio of polyalkenyls to polyalkynyls can be, for example, greater than 5, greater than 10, greater than 15, greater than 20, greater than 30, greater than 40, or greater than 50 In compositions comprising a combination of polyalkyenyls and polyalkynyls, the molar ratio of polyalkenyls to polyalkynyls can be, for example, from less than 70, less than 60, less than 50, less than 40, less than 30, less than 20, or less than 10.

In compositions comprising a combination of polyalkyenyls and polyalkynyls, the equivalents ratio of alkenyl groups to alkynyl groups can be, for example, from 5 to 60, from 10 to 50, from 15 to 40, or from 20 to 30. In compositions comprising a combination of polyalkyenyls and polyalkynyls, the equivalents ratio of alkenyl groups to alkynyl groups can be, for example, greater than 5, greater than 10, greater than 15, greater than 20, greater than 30, greater than 40, or greater than 50 In compositions comprising a combination of polyalkyenyls and polyalkynyls, the equivalents ratio of alkenyl groups to alkynyl groups can be, for example, from less than 70, less than 60, less than 50, less than 40, less than 30, less than 20, or less than 10.

Adhesion-promoting compositions provided by the present disclosure can comprise a polythiol or a combination of polythiols.

Suitable polythiols can comprise two or more polythiols groups. For example, a polythiols can have a thiol functionality from 2 to 10, from 2 to 8, from 2 to 6, or from 2 to 4. A polythiols can have a thiol functionality greater than 2, greater than 4, greater than 6, or greater than 8.

Suitable polythiols can have a molecular weight, for example, from 150 Da to 2,000 Da, from 200 Da to 1,500 Da, from 300 Da to 1,000 Da, or from 400 Da to 800 Da. A polythiol can have a molecular weight, for example, less than 2,000 Da, less than 1,500 Da, less than 1,000 Da, less than 800 Da, less than 700 Da, less than 600 Da, or less than 500 Da. A polythiol can have a molecular weight, for example, greater than 2,000 Da, greater than 1,500 Da, greater than 1,000 Da, greater than 800 Da, greater than 700 Da, greater than 600 Da, greater than 500 Da, or greater than 150 Da.

A polythiols can comprise a polythiol prepolymer, a monomeric polythiol, an oligomeric polythiol, a polymeric polythiol, or a combination of any of the foregoing.

A thiol-terminated monomer/oligomer can have the structure of Formula (3):

$$HS-R^1-SH \quad (3)$$

wherein, $R^1$ is selected from $C_{2-6}$ alkanediyl, $C_{6-8}$ cycloalkanediyl, $C_{6-10}$ alkanecycloalkanediyl, $C_{5-8}$ heterocycloalkanediyl, and -[—(CHR$^3$)$_p$—X—]$_q$—(CHR$^3$)$_r$—; wherein, each $R^3$ is independently selected from hydrogen and methyl;

each X is independently selected from —O—, —S—, —NH—, and —N(—CH$_3$)—;

p is an integer from 2 to 6;

q is an integer from 1 to 5; and r is an integer from 2 to 10.

A polythiol monomer/oligomer of Formula (3) can have a sulfur content, for example, greater than 5 wt %, greater than 10 wt %, greater than 15 wt %, or greater than 25 wt %, where wt % is based on the weight of the polythiol.

In a dithiol of Formula (3), $R^1$ can be -[—(CHR$^3$)$_p$—X—]$_q$—(CHR$^3$)$_r$—.

In a dithiol of Formula (3), X can be —O— or —S—, and thus -[—(CHR$^3$)$_p$—X—]$_q$—(CHR$^3$)$_r$— in Formula (1) can be —[(CHR$^3$)$_p$—O—]$_q$—(CHR$^3$)$_r$—, -[(—CHR$^3$—)$_p$—S—]$_q$—(CHR$^3$)$_r$—, —[(CH$_2$)$_p$—O—]$_q$—(CH$_2$)$_r$—, or —[(CH$_2$)$_p$—S-]$_q$(CH$_2$)$_r$. In a dithiol of Formula (3), p and r can be equal, such as where p and r can be both two.

In a dithiol of Formula (3), $R^1$ can be $C_{2-6}$ alkanediyl or -[—(CHR$^3$)$_p$—X—]$_q$—(CHR$^3$)$_r$—.

In a dithiol of Formula (3), $R^1$ can be -[—(CHR$^3$)$_p$—X—]$_q$—(CHR$^3$)$_r$—, where X can be —O—, or X can be —S—.

In a dithiol of Formula (3), $R^1$ can be -[—(CH$_2$)$_p$—X—]$_q$—(CH$_2$)$_r$—, or X can be —O—, or X can be —S—.

In a dithiol of Formula (3) where $R^1$ can be -[—(CHR$^3$)$_p$—X—]$_q$—(CHR$^3$)—, p can be 2, r can be 2, q is 1, and X can be —S—; p can be 2, q can be 2, r can be 2, and X is —O—; or p can be 2, r can be 2, q can be 1, and X can be —O—.

In a dithiol of Formula (3) where $R^1$ can be -[—(CH$_2$)$_p$—X—]$_q$—(CH$_2$)$_r$—, p can be 2, r can be 2, q can be 1, and X can be —S—; p can be 2, q can be 2, r can be 2, and X can be —O—; or p can be 2, r can be 2, q can be 1, and X can be —O—.

In a dithiol of Formula (3) where $R^1$ can be -[—(CHR$^3$)$_p$—X—]$_q$—(CHR$^3$)$_r$—, each $R^3$ can be hydrogen, or at least one R3 can be methyl.

In a dithiol of Formula (3), each $R^1$ can be derived from dimercaptodioxaoctane (DMDO) or each $R^1$ is derived from dimercaptodiethylsulfide (DMDS).

In a dithiol of Formula (3), each p can be independently 2, 3, 4, 5, or 6; or each p can be the same and can be 2, 3, 4, 5, or 6.

In a dithiol of Formula (3), each r can be 2, 3, 4, 5, 6, 7, or 8.

In a dithiol of Formula (3), each q can be 1, 2, 3, 4, or 5.

Examples of suitable dithiols include 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methylbutane, dipentenedimercaptan, ethylcyclohexyldithiol (ECHDT), dimercaptodiethylsulfide, methyl-substituted dimercaptodiethylsulfide, dimethyl-substituted dimercaptodiethylsulfide, dimercaptodioxaoctane, 1,5-dimercapto-3-oxapentane, and a combination of any of the foregoing. A polythiol may have one or more pendent groups selected from a lower (e.g., $C_{1-6}$) alkyl group, a lower alkoxy group, and a hydroxyl group. Suitable alkyl pendent groups include, for example, $C_{1-6}$ linear alkyl, $C_{3-6}$ branched alkyl, cyclopentyl, and cyclohexyl.

Other examples of suitable dithiols include dimercaptodiethylsulfide (DMDS) (in Formula (3), $R^1$ is -[—$(CH_2)_p$—X—$]_q$—$(CH_2)_r$—, wherein p is 2, r is 2, q is 1, and X is —S—); dimercaptodioxaoctane (DMDO) (in Formula (1), $R^1$ is -[—$(CH_2)_p$—X—$]_q$—$(CH_2)_r$—, wherein p is 2, q is 2, r is 2, and X is —O—); and 1,5-dimercapto-3-oxapentane (in Formula (3), $R^1$ is -[—$(CH_2)_p$—X—$]_q$—$(CH_2)_r$—, wherein p is 2, r is 2, q is 1, and X is —O—). It is also possible to use dithiols that include both a heteroatom in the carbon backbone and a pendent alkyl group, such as a pendent methyl group. Such compounds include, for example, methyl-substituted DMDS, such as HS—$CH_2CH(CH_3)$—S—$CH_2CH_2$—SH, HS—$CH(CH_3)CH_2$—S—$CH_2CH_2$—SH and dimethyl substituted DMDS, such as HS—$CH_2CH(CH_3)$—S—$CHCH_3CH_2$—SH and HS—$CH(CH_3)CH_2$—S—$CH_2CH(CH_3)$—SH.

A polythiol can comprise a polythiol of Formula (1a):

 (1a)

wherein,

B comprises a core of a z-valent polyfunctionalizing agent ;

z is an integer from 3 to 6; and each —V is independently a moiety comprising a terminal thiol group.

In polythiols of Formula (1a), V can be, for example, thiol-terminated $C_{1-10}$ alkanediyl, thiol-terminated $C_{1-10}$ heteroalkanediyl, thiol-terminated substituted $C_{1-10}$ alkanediyl, or thiol-terminated substituted $C_{1-10}$ heteroalkanediyl.

In polythiols of Formula (1a), z can be, for example, 3, 4, 5, or 6.

In polythiols of Formula (1a), z can be 3. Suitable trifunctional polythiols include, for example, 1,2,3-propanetrithiol, isocyanurate-containing trithiols, and combinations thereof, as disclosed in U.S. Application Publication No. 2010/0010133, and the polythiols described in U.S. Pat. Nos. 4,366,307; 4,609,762; and 5,225,472. Mixtures polythiols of Formula (1a) may also be used.

Isocyanurates as disclosed, for example, in U.S. Application Publication No. 2011/0319559.

A dithiol can comprise a sulfur-containing dithiol meaning that the moiety between the two terminal thiol groups comprises at least one thioether —S— group or a polysulfide group —S—S—. For example, in dithiols of Formula (3), $R^1$ in a sulfur-containing dithiol of Formula (3) can comprise at least one thioether —S— group.

Suitable thiol-terminated monomers include, for example, mercapto-propionates, mercapto-acetates, mercapto-acrylates, and other polythiols.

Examples of suitable mercapto-propionates include pentaerythritol tetra (3-mercapto-propionate) (PETMP), trimethylol-propane tri(3-mercaptopropionate) (TMPMP), glycol di(3-mercaptopropionate) (GDMP), tris[2-(3-mercaptopropionyloxy)ethyl]isocyanurate (TEMPIC), di-pentaerythritol hexa(3-mercaptopropionate) (di-PETMP), tri(3-mercaptopropionate) pentaerythritol, and triethylolethane tri-(3-mercaptopropionate).

Examples of suitable thiols include ethoxylated trimethylolpropane tri(3-mercaptopropionate) and polycaprolactone tetra-3-mercaptopropionate.

Examples of suitable mercapto-acetates include pentaerythritol tetramercaptoacetate (PRTMA), trimethylolpropane trimercaptoacetate (TMPMA), glycol dimercaptoacetate (GDMA), ethyleneglycol dimercaptoacetate, and di-trimethylolpropane tetramercaptoacetate.

A small molecule polythiol can have a thiol-functionality, for example, from 2 to 6. A small molecule polythiol can be a sulfur-containing small molecule polythiol. A small molecule polythiol can comprise a polyfunctionalizing agent having a thiol functionality, for example, from 3 to 6.

Examples of suitable trifunctional thiol-terminated polyfunctionalizing agents include, for example, 1,2,3-propanetrithiol, 1,2,3-benzenetrithiol, 1,1,1-butanetrithiol, heptane-1,3-7-trithiol, 1,3,5-triazine-2,4-6-trithiol, isocyanurate-containing trithiols, and combinations thereof, as disclosed in U.S. Application Publication No. 2010/0010133, and the polythiols described in U.S. Pat. Nos. 4,366,307; 4,609,762; and 5,225,472. Combinations of polyfunctionalizing agents may also be used.

Examples of suitable polythiol polyfunctionalizing agents include pentaerythritol tetra(3-mercapto-propionate) (PETMP), trimethylol-propane tri(3-mercaptopropionate) (TMPMP), glycol di(3-mercaptopropionate) (GDMP), tris[2-(3-mercapto-propionyloxy)ethyl]isocyanurate (TEMPIC), di-pentaerythritol hexa(3-mercaptopropionate) (di-PETMP), tri(3-mercaptopropionate) pentaerythritol, triethylolethane tri-(3-mercaptopropionate), and combinations of any of the foregoing.

Examples of suitable mercapto-acetate polythiol polyfunctionalizing agents include pentaerythritol tetramercaptoacetate (PRTMA), trimethylolpropane trimercaptoacetate (TMPMA), glycol dimercaptoacetate (GDMA), ethyleneglycol dimercaptoacetate, di-trimethylolpropane tetramercaptoacetate, and combinations of any of the foregoing.

Examples of suitable mercapto-acrylate polythiol polyfunctionalizing agents include tris[2-(3-mercaptopropionyloxy)ethyl]isocyanurate, 2,3-di(2-mercaptoethylthio)-1-propane-thiol, dimercaptodiethylsulfide (2,2'-thiodiethanethiol), dimercaptodioxaoctane (2,2'-(ethylenedioxy) diethanethiol, 1,8-dimercapto-3,6-dioxaoctane, and combinations of any of the foregoing.

Suitable polythiol polyfunctionalizing agents are commercially available, for example, from Bruno Bock Thiochemicals under the Thiocure® tradename.

Other examples of suitable polythiols include 4,8-dimercaptomethyl-1,11-dimercapto-3,6,9-trithiaundecane, 4-mercaptomethyl-3,6-dithia-1,8-octanedithiol (2,2'-((3-mercaptopropane-1,2-diyl)bis(sulfanediyl))bis(ethane-1-thiol), 7-hydroxymethyl-3,6,9,12-tetrathia-1,14-tetradecanedithiol (2,3-bis((2-((2-mercaptoethyl)thio)ethyl)thio) propan-1-ol) and/or isomers thereof, 2,5-dimercaptomethyl-1,4-dithiane ((1,4-dithiane-2,5-diyl)dimethanethiol), and combinations of any of the foregoing.

Other examples of suitable polythiols include 2,5-dimercaptomethyl-1,4-dithiane, 2-ethyl-2-(mercaptomethyl) propane-1,3-dithiol, 1,2,3-trimercaptopropane, 2,2-bis(mercaptomethyl)propane-1,3-dithiol, 4-mercaptomethyl-3,6-dithia-1,8-octanedithiol, 1,3-dimercapto-2-propanol, 3-mercapto-1,2-propanediol, 2-mercapto-1,3-propanediol, 2,3-dimercapto-1-propanol, 7-hydroxymethyl-1,14-dimercapto-3,6,9,12-tetrathiatetradecane, 4,8-bis(mercaptomethyl)-1,11-dimercapto-3,6,9-trithiaundecane and regioisomers thereof such as the 4,7- and 5,7-regioisomers, and combinations of any of the foregoing.

A polythiol can have, for example, a sulfur content from 0 wt % to 50 wt %, from 5 wt % to 40 wt %, from 10 wt % to 40 wt % or from 20 wt % to 40 wt %, where wt % is based on the total weight of the polythiol. A polythiol can be selected such that when reacted with a polyalkenyl and/or a polyalkynyl, the product can have a sulfur content, for example, greater than 5 wt %, greater than 10 wt %, greater than 15 wt %, greater than 20 wt %, or greater than 25 wt %. For example, the product can have a sulfur content from 5 wt % to 50 wt %, from 10 wt % to 40 wt %, from 15 wt % to 30 wt %, or from 10 wt % to 20 wt %, where wt % is based on the total weight of the reaction product.

Adhesion-promoting compositions provided by the present disclosure can comprise a polyalkenyl or a combination of polyalkenyls.

Suitable polyalkenyls can comprise two or more polythiols groups. For example, a polyalkenyls can have an alkenyl functionality from 2 to 10, from 2 to 8, from 2 to 6, or from 2 to 4. Polyalkenyls can have an alkenyl functionality greater than 2, greater than 3, greater than 4, greater than 5, greater than 6, or greater than 8.

Suitable polyalkenyls can have a molecular weight or an average molecular weight, for example, from 150 Da to 2,000 Da, from 200 Da to 1,500 Da, from 300 Da to 1,000 Da, or from 400 Da to 800 Da. Polyalkenyls can have a molecular weight, for example, less than 2,000 Da, less than 1,500 Da, less than 1,000 Da, less than 800 Da, less than 700 Da, less than 600 Da, or less than 500 Da. A polyalkenyl can have a molecular weight, for example, greater than 2,000 Da, greater than 1,500 Da, greater than 1,000 Da, greater than 800 Da, greater than 700 Da, greater than 600 Da, greater than 500 Da, or greater than 150 Da.

Polyalkenyls can comprise a polyalkenyl prepolymer, a monomeric polyalkenyl, an oligomeric polyalkenyl, a polymeric polyalkenyl, or a combination of any of the foregoing.

A polyalkenyl can have, for example, a sulfur content from 0 wt % to 50 wt %, from 5 wt % to 40 wt %, from 10 wt % to 40 wt % or from 20 wt % to 40 wt %, where wt % is based on the total weight of the polyalkenyl. A polyalkenyl can be selected such that when reacted with a polythiol, the product can have a sulfur content, for example, greater than 5 wt %, greater than 10 wt %, greater than 15 wt %, greater than 20 wt %, or greater than 25 wt %. For example, the product can have a sulfur content from 5 wt % to 50 wt %, from 10 wt % to 40 wt %, from 15 wt % to 30 wt %, or from 10 wt % to 20 wt %, where wt % is based on the total weight of the reaction product.

A polyalkenyl mayor may not contain sulfur atoms.

Examples of suitable polyalkenyl monomers, oligomers and prepolymers include divinyl ethers such as divinyl ethers having the structure of Formula (4):

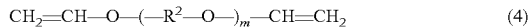

$$CH_2=CH-O-(-R^2-O-)_m-CH=CH_2 \quad (4)$$

where m can be from 0 to 50 and $R^2$ in Formula (4) can be selected from $C_{2-6}$ n-alkanediyl, $C_{3-6}$ branched alkanediyl, $C_{6-8}$ cycloalkanediyl, $C_{6-10}$ alkanecycloalkanediyl, and -[—$(CH_2)_p$—X—$]_q$—$(CH_2)_r$—, where p can be an integer ranging from 2 to 6, q can be an integer from 1 to 5, r can be an integer from 2 to 10, and X can be O or S. In a divinyl ether of Formula (4), $R^2$ can be, for example, $C_{2-6}$ n-alkanediyl, $C_{3-6}$ branched alkanediyl, $C_{6-8}$ cycloalkanediyl, $C_{6-10}$ alkanecycloalkanediyl, —[$(CH_2)_p$—O—$]_q$—$(CH_2)_r$—, or —[$(CH_2)_p$—S—$]_q$—$(CH_2)_r$—.

In divinyl ethers of Formula (4), m can bean integer from 0 to 50, such as an integer from 1 to 6, from 1 to 4, or from 1 to 3.

In divinyl ethers of Formula (4), m can be 1, 2, 3, 4, 5, or 6.

In divinyl ethers of Formula (4), each $R^2$ can independently be $C_{2-6}$ alkanediyl such as 1,2-ethane-diyl, 1,3-propane-diyl, 1,4-butane-diyl, 1,5-pentane-diyl, or 1,6-hexanediyl.

In divinyl ethers of Formula (4), each $R^2$ can be -[—$(CH_2)_p$—X—$]_q$—$(CH_2)_r$—.

In divinyl ethers of Formula (4), each $R^2$ can be -[—$(CH_2)_p$—X—$]_q$—$(CH_2)_r$—, where each p can be 2, each r can be 2, and q can be 1, 2, 3, 4, or 5.

Suitable divinyl ethers include, for example, compounds having at least one oxyalkanediyl group, such as from 1 to 4 oxyalkanediyl groups, i.e., compounds in which m in Formula (4) can be an integer ranging from 1 to 4. In a divinyl ether of Formula (4) m can be an integer ranging from 2 to 4. It is also possible to employ commercially available divinyl ether mixtures that are characterized by a non-integral average value for the number of oxyalkanediyl units per molecule. Thus, m in Formula (4) can also be a rational number from 0 to 10.0, such as from 1.0 to 10.0, from 1.0 to 4.0, or from 2.0 to 4.0, such as 2.5, which represents an average functionality.

Examples of suitable vinyl ethers include, divinyl ether, ethylene glycol divinyl ether (EG-DVE) ($R^2$ in Formula (4) is ethanediyl and m is 1), butanediol divinyl ether (BD-DVE) ($R^2$ in Formula (4) is butanediyl and m is 1), hexanediol divinyl ether (HD-DVE) ($R^2$ in Formula (4) is hexanediyl and m is 1), diethylene glycol divinyl ether (DEG-DVE; $R^2$ in Formula (4) is ethanediyl and m is 2), triethylene glycol divinyl ether (TEG-DVE; $R^2$ in Formula (4) is ethanediyl and m is 3), tetraethylene glycol divinyl ether ($R^2$ in Formula (4) is ethanediyl and m is 4), cyclohexanedimethanol divinyl ether, polytetrahydrofuryl divinyl ether; trivinyl ether monomers, such as trimethylolpropane trivinyl ether; tetrafunctional ether monomers, such as pentaerythritol tetravinyl ether; and combinations of two or more such polyvinyl ether monomers. A polyvinyl ether may have one or more pendent groups selected from alkyl groups, hydroxyl groups, alkoxy groups, and amine groups.

Other useful divinyl ethers include compounds in which $R^2$ in Formula (4) is polytetrahydrofuryl (poly-THF) or polyoxyalkanediyl, such as those having an average of about 3 monomer units.

A polyalkenyl can have the structure of Formula (1b):

$$B(-V)_z \quad (1b)$$

wherein,

B comprises a core of a z-valent polyfunctionalizing agent $B(-V)_z$;

z is an integer from 3 to 6; and each —V is independently a moiety comprising a terminal alkenyl group.

In polyalkenyls of Formula (1b), z can be, for example, 3, 4, 5, or 6.

A polyalkenyl of Formula (1b) can be trifunctional, that is, compounds where z is 3. Suitable trifunctionalizing polyalkenyls include, for example, triallyl cyanurate (TAC), and trimethylolpropane trivinyl ether. Combinations of polyalkenyl compounds may also be used.

Examples of suitable polyalkenyl monomers having an alkenyl functionality greater than two include, for example, triallyl cyanurate (TAC), triallyl isocyanurate (TAIC), trimethylolpropane trivinyl ether, 2,4,6-triallyloxy-1,3,5-triazine, 1,3,5-triacryloylhexahydro-1,3,5-triazine, and tris[2-(acryloyloxy)ethyl] isocyanurate.

A divinyl ether can comprise a sulfur-containing bis (alkenyl) ether. An example of a suitable sulfur-containing divinyl ether is allyl sulfide.

A sulfur-containing bis(alkenyl) ether can have the structure of Formula (5):

$$CH_2=CH-O-(CH_2)_n-Y'-R^4-Y'-(CH_2)_n-O-CH=CH_2 \quad (5)$$

wherein,
each n is independently an integer from 1 to 4;
each Y' is independently selected from —O— and —S—; and
$R^4$ is selected from $C_{2-6}$ n-alkanediyl, $C_{3-6}$ branched alkanediyl, $C_{6-8}$ cycloalkanediyl, $C_{6-10}$ alkanecycloalkanediyl, and -[—$(CH_2)_p$—X—$]_q$—$(CH_2)_r$—, wherein,
each X is independently selected from —O—, —S—, and —S—S—;
p is an integer from 2 to 6;
q is an integer from 1 to 5; and
r is an integer from 2 to 6; and
at least one Y' is —S—, or R4 is -[—$(CH_2)_p$—X—$]_q$—$(CH_2)_r$— and at least one X is —S— or —S—S—.

In sulfur-containing bis(alkenyl) ethers of Formula (5), each n can be 1, 2, 3, or 4.

In sulfur-containing bis(alkenyl) ethers of Formula (5), each Y' can be —O— or each Y' can be —S—.

In sulfur-containing bis(alkenyl) ethers of Formula (5), $R^4$ can be $C_{2-6}$ n-alkanediyl, such as ethane-diyl, n-propane-diyl, n-butane-diyl, n-pentane-diyl, or n-hexane-diyl.

In sulfur-containing bis(alkenyl) ethers of Formula (5), $R^4$ can be $C_{2-6}$ n-alkanediyl; both Y' can be —S— or one Y' can be —S— and the other Y' can be —O—.

In sulfur-containing bis(alkenyl) ethers of Formula (5), $R^4$ can be -[—$(CH_2)_p$—X—$]_q$—$(CH_2)_r$—.

In sulfur-containing bis(alkenyl) ethers of Formula (5), $R^4$ can be -[—$(CH_2)_p$—X—$]_q$—$(CH_2)_r$—, where each X can be —O— or each X can be —S—S— or at least one X can be —O— or at least one X can be —S—S—.

In sulfur-containing bis(alkenyl) ethers of Formula (5), $R^4$ can be -[—$(CH_2)_p$—X—$]_q$—$(CH_2)_r$—, where each X can be —S— or at least one X can be —S—.

In sulfur-containing bis(alkenyl) ethers of Formula (5), $R^4$ can be -[—$(CH_2)_p$—X—$]_q$—$(CH_2)_r$—, where each p can be 2 and r can be 2.

In sulfur-containing bis(alkenyl) ethers of Formula (5), $R^4$ can be -[—$(CH_2)_p$—X—$]_q$—$(CH_2)_r$—, where q can be 1, 2, 3, 4, or 5.

In sulfur-containing bis(alkenyl) ethers of Formula (5), $R^4$ can be -[—$(CH_2)_p$—X—$]_q$—$(CH_2)_r$—, where each pc an be 2, r can be 2, and q can be 1, 2, 3, 4, or 5.

In sulfur-containing bis(alkenyl) ethers of Formula (5), $R^4$ can be -[—$(CH_2)_p$—X—$]_q$—$(CH_2)_r$—, where each X can be —S—; each p can be 2, r can be 2, and q can be 1, 2, 3, 4, or 5.

In sulfur-containing bis(alkenyl) ethers of Formula (5), $R^4$ can be -[—$(CH_2)_p$—X—$]_q$—$(CH_2)_r$—, where each X can be —O—; each p can be 2, r can be 2, and q can be 1, 2, 3, 4, or 5.

In sulfur-containing bis(alkenyl) ethers of Formula (5), $R^4$ can be -[—$(CH_2)_p$—X—$]_q$—$(CH_2)_r$—, where each X can be —O—; and each Y' can be —S—.

In sulfur-containing bis(alkenyl) ethers of Formula (5), $R^4$ can be -[—$(CH_2)_p$—X—$]_q$—$(CH_2)_r$—, where each X can be —S—; and each Y' can be —O—.

In sulfur-containing bis(alkenyl) ethers of Formula (5), each n can be 2, each Y' can be independently selected from —O— and —S—, and $R^4$ can be -[—$(CH_2)_p$—X—$]_q$—$(CH_2)_r$—, where each X can be independently selected from —O—, —S—, and —S—S—, p can be 2, q can be selected from 1 and 2, and r can be 2.

In sulfur-containing bis(alkenyl) ethers of Formula (5), each n can be 2, each Y' can be independently selected from —O— and —S—, and $R^4$ can be $C_{2-4}$ alkanediyl, such as ethanediyl, n-propanediyl, or n-butanediyl.

Sulfur-containing bis(alkenyl) ethers can comprise sulfur-containing bis(alkenyl) ethers of Formula (5a), Formula (5b), Formula (5c), Formula (5d), Formula (5e), Formula (5f), Formula (5g), Formula (5h), or a combination of any of the foregoing:

$$CH_2=CH-O-(CH_2)_2-S-(-(CH_2)_2-O-)_2-(CH_2)_2-S-(CH_2)_2O-CH=CH_2 \quad (5a)$$

$$CH_2=CH-O-(CH_2)_2-S-(CH_2)_2-S-(CH_2)_2-S-(CH_2)_2O-CH=CH_2 \quad (5b)$$

$$CH_2=CH-O-(CH_2)_2-S-(CH_2)_2-O-(CH_2)_2-S-(CH_2)_2O-CH=CH_2 \quad (5d)$$

$$CH_2=CH-O-(CH_2)_2-S-(CH_2)_2-S-(CH_2)_2O-CH=CH_2 \quad (5d)$$

$$CH_2=CH-O-(CH_2)_2-S-(CH_2)_2-O-(CH_2)_2O-CH=CH_2 \quad (5e)$$

$$CH_2=CH-O-(CH_2)_2-O-(CH_2)_2-S-(CH_2)_2-O-(CH_2)_2O-CH=CH_2 \quad (5f)$$

$$CH_2=CH-O-(CH_2)_2-O-(CH_2)_2-S-(CH_2)_2-S-(CH_2)_2-O-(CH_2)_2O-CH=CH_2 \quad (5g)$$

$$CH_2=CH-O-(CH_2)_2-O-(CH_2)_2-S-S-(CH_2)_2-O-(CH_2)_2O-CH=CH_2 \quad (5h)$$

Examples of suitable sulfur-containing bis(alkenyl) ethers include 3,9,12,18-tetraoxa-6,15-dithiaicosa-1,19-diene, 3,6,15,18-tetraoxa-9,12-dithiaicosa-1,19-diene, 3,15-dioxa-6,9,12-trithiaheptadeca-1,16-diene, 3,9,15-trioxa-6,12-dithiaheptadeca-1,16-diene, 3,6,12,15-tetraoxa-9-thiaheptadeca-1,16-diene, 3,12-dioxa-6,9-dithiatetradeca-1,13-diene, 3,6,12-trioxa-9-thiatetradeca-1,13-diene, 3,6,13,16-tetraoxa-9,10-dithiaoctadeca-1,17-diene, and combinations of any of the foregoing.

Sulfur-containing bis(alkenyl) ethers can be prepared by reacting a dithiol, a diol, or a compound comprising both terminal thiol and hydroxyl groups with a chlorovinyl ether.

For example, a sulfur-containing bis(alkenyl) ether can comprise reaction products of reactants comprising:
(a) a compound of Formula (6):

$$Y-R^4-Y \quad (6)$$

wherein,
each Y is independently selected from —OH and —SH;
$R^4$ is selected from $C_{2-6}$ n-alkanediyl, $C_{3-6}$ branched alkanediyl, $C_{6-8}$ cycloalkanediyl, $C_{6-10}$ alkanecycloalkanediyl, and -[—$(CH_2)_p$—X—$]_q$—$(CH_2)_r$—, wherein,
each X is independently selected from —O—, —S—, and —S—S—;
each p is independently an integer from 2 to 6;
q is an integer from 1 to 5; and
r is an integer from 2 to 6; and
at least one Y is —SH, or $R^4$ is -[—$(CH_2)_p$—X—$]_q$—$(CH_2)_r$— and at least one X is —S—; and
(b) a compound having the structure of Formula (7):

$$CH_2=CH-O-(CH_2)_t-Cl \quad (7)$$

wherein t is an integer from 1 to 6.

Compounds of Formula (6) can be dithiols in which each Y is —SH.

Compounds of Formula (6) can be diols in which each Y is —OH.

In compounds of Formula (6), one Y can be —SH and the other Y can be —OH.

In compounds of Formula (6), $R^4$ can be $C_{2-6}$ n-alkanediyl, such as ethane-diyl, n-propane-diyl, n-butane-diyl, n-pentane-diyl, or n-hexane-diyl.

In compounds of Formula (6), $R^4$ can be -[—$(CH_2)_p$—X—$]_q$—$(CH_2)_r$—.

In compounds of Formula (6), $R^4$ can be -[—$(CH_2)_p$—X—$]_q$—$(CH_2)_r$—, where each X can be —O— or each X can be —S—S—.

In compounds of Formula (6), $R^4$ can be -[—$(CH_2)_p$—X—$]_q$—$(CH_2)_r$—, where each X can be —S—.

In compounds of Formula (6), $R^4$ can be -[—$(CH_2)_p$—X—$]_q$—$(CH_2)_r$—, where each p can be 2 and r can be 2.

In compounds of Formula (6), $R^4$ can be -[—$(CH_2)_p$—X—$]_q$—$(CH_2)_r$—, where q can be 1, 2, 3, 4, or 5.

In compounds of Formula (6), $R^4$ can be -[—$(CH_2)_p$—X—$]_q$—$(CH_2)_r$—, where each p can be 2 and r can be 2; and q can be 1, 2, 3, 4, or 5.

In compounds of Formula (6), $R^4$ can be -[—$(CH_2)_p$—X—$]_q$—$(CH_2)_r$—, where each X can be —S—; each p can be 2, r can be 2, and q can be 1, 2, 3, 4, or 5.

In compounds of Formula (6), $R^4$ can be -[—$(CH_2)_p$—X—$]_q$—$(CH_2)_r$—, where each X can be —O—; each p can be 2, r can be 2, and q can be 1, 2, 3, 4, or 5.

In compounds of Formula (6), $R^4$ can be -[—$(CH_2)_p$—X—$]_q$—$(CH_2)_r$—, at least one X can be —O— and at least one X can be —S—.

A compound of Formula (6) can comprise dimercaptodioxaoctane (DMDO), dimercaptodiethylsulfide (DMDS), 2,2-thiodiethanethiol, 2-mercaptoethyl ether, 1,2-ethanedithiol, mercaptoethanol, thiodiglycol, 3,6-dithia-1,8-octanediol, 2-hydroxyethyldisulfide, or a combination of any of the foregoing.

A compound of Formula (6) can comprise a compound of Formula (6a), Formula (6b), Formula (6c), Formula (6d), Formula (6e), Formula (6f), Formula (6g), Formula (6h), or a combination of any of the foregoing:

$$HS—(CH_2)_2—O—(CH_2)_2—O—(CH_2)_2—SH \quad (6a)$$

$$HS—(CH_2)_2—S—(CH_2)_2—SH \quad (6b)$$

$$HS—(CH_2)_2—O—(CH_2)_2—SH \quad (6c)$$

$$HS—(CH_2)_2—SH \quad (6d)$$

$$HS—(CH_2)_2—OH \quad (6e)$$

$$HO—(CH_2)_2—S—(CH_2)_2—OH \quad (6f)$$

$$HO—(CH_2)_2—S—(CH_2)_2—S—(CH_2)_2—OH \quad (6g)$$

$$HO—(CH_2)_2—S—S—(CH_2)_2—OH \quad (6h)$$

In chlorovinyl ethers of Formula (7), t can be 1, 2, 3, 4, 5, or 6. For example, a chlorovinyl ether of Formula (7) can comprise (chloromethoxy)ethane, (2-chloroethoxy) ethane, 1-chloro-3-(vinyloxy)propane, 1-chloro-4-(vinyloxy)butane, 1-chloro-5-(vinyloxy)pentane, 1-chloro-6-(vinyloxy) hexane, or a combination of any of the foregoing.

Sulfur-containing bis(alkenyl) ethers can be prepared by reacting a dithiol, a diol, or a compound comprising both terminal thiol and hydroxyl groups with a chlorovinyl ether in the presence of a catalyst such as potassium hydroxide at an elevated temperature such as 80° C.

Sulfur-containing bis(alkenyl) ethers of Formula (5) are difunctional. Sulfur-containing alkenyl ethers provided by the present disclosure can also include sulfur-containing polyalkenyl ethers having a functionality greater than two, such as a functionality from 3 to 6.

For example, a sulfur-containing poly(alkenyl) ether can have the structure of Formula (1c):

$$B(—V)_z \quad (1c)$$

wherein,

B comprises a core of a z-valent polyfunctionalizing agent $B(—V)_z$;

z is an integer from 3 to 6; and each —V is a moiety comprising a sulfur-containing alkenyl ether moiety having a terminal alkenyl group.

A sulfur-containing multifunctional(alkenyl) ether can be derived from a sulfur-containing bis(alkenyl) ether of Formula (5), by reacting a sulfur-containing bis(alkenyl) ether of Formula (5) with a polyfunctionalizing agent of Formula (1a), where the polyfunctionalizing agent of Formula (a) comprises terminal groups reactive with alkenyl groups such as thiol groups.

For example, a polyfunctional sulfur-containing poly(alkenyl) ether can have the structure of Formula (8):

$$\{CH_2{=}CH—O—(CH_2)_2—Y'—R^4—Y'—(CH_2)_n—O—(CH_2)_2—V'—\}_zB \quad (8)$$

where n, Y', and $R^4$ are defined as in Formula (5), z and B are defined as in Formula (1), and —V'— can be derived from the reaction of —V with an alkenyl group.

In sulfur-containing multifunctional (alkenyl) ethers of Formula (8), $B(—V)_z$ can be a polythiol such as any of those disclosed herein, such as 1,2,3-propane trithiol and isocyanurate-containing trithiols.

Sulfur-containing multifunctional (alkenyl) ethers of Formula (8) can be prepared by reacting a sulfur-containing bis(alkenyl) ether of Formula (5) with a thiol-terminated polyfunctionalizing agent $B(—V)_z$ of Formula (1a) in the presence of a suitable catalyst such as an amine catalyst.

Multifunctional sulfur-containing (alkenyl) ethers can be used to prepare multifunctional sulfur-containing (alkenyl) ether-containing polythioether prepolymers provided by the present disclosure. For example, the reactants can include sulfur-containing multifunctional (alkenyl) ethers as part of the alkenyl component. Sulfur-containing multifunctional (alkenyl) ethers can be the only polyfunctional reactant having a functionality greater than 2 or may be used in combination with an alkenyl-terminated polyfunctionalizing agent such as triallyl cyanurate or triallylisocyanurate.

Similarly, multifunctional polyalkenyl ethers can have the structure of Formula (9):

$$\{CH_2{=}CH—O—(—R^2—O—)_m—(CH_2)_2—V'—\}_zB \quad (9)$$

where m, z, $R^2$, and B are defined as in Formula (4) and Formula (1), and V' is derived from the reaction of an alkenyl group an V.

A polyalkenyl can have an alkenyl functionality greater than 2, such as 3, 4, 5, or 6. Examples of suitable polyalkenyls include 1,3,5-triallyl-1,3,5-triazine-2,4,6(1H,3H,5H)-trione, and triallyl cyanurate (2,4,6-triallyloxy-1,3,5-triazine).

Polythioethers comprising a moiety derived from a sulfur-containing polyalkenyl ether and methods of preparing polythioether prepolymers are disclosed, for example, in PCT International Publication No. WO 2018/085650.

Adhesion-promoting compositions provided by the present disclosure can comprise a polyalkynyl or a combination of polyalkynyls.

Suitable polyalkynyl can comprise two or more alkynyl groups. For example, a polyalkynyl can have an alkenyl functionality from 2 to 10, from 2 to 8, from 2 to 6, or from 2 to 4. Polyalkynyl can have an alkynyl functionality greater than 2, greater than 3, greater than 4, greater than 5, greater than 6, or greater than 8.

Suitable polyalkynyls can have a molecular weight or an average molecular weight, for example, from 150 Da to 2,000 Da, from 200 Da to 1,500 Da, from 300 Da to 1,000 Da, or from 400 Da to 800 Da. Polyalkynyls can have a molecular weight, for example, less than 2,000 Da, less than 1,500 Da, less than 1,000 Da, less than 800 Da, less than 700 Da, less than 600 Da, or less than 500 Da. A polyalkynyl can have a molecular weight, for example, greater than 2,000 Da, greater than 1,500 Da, greater than 1,000 Da, greater than 800 Da, greater than 700 Da, greater than 600 Da, greater than 500 Da, or greater than 150 Da.

Polyalkynyls can be polyalkynyl prepolymers, monomeric polyalkynyls, oligomeric polyalkynyls, polymeric polyalkynyls, or a combination of any of the foregoing.

Polyalkynyls may or may not include sulfur atoms.

Examples of suitable polyalkynyls include 1,7-octadiyne, 1,6-heptadiyne, 1,4-diethynylbenzene, 1,8-decadiyne, ethylene glycol 1,2-bis(2-propynyl) ether, and combinations of any of the foregoing.

Adhesion-promoting compositions provided by the present disclosure are polymerizable by free-radical mechanisms. Adhesion-promoting compositions comprise a free radical initiator such as, for example, a radiation-activated free radical initiator, a thermally-activated free radical initiator, a chemically-activated free radically initiator, or a combination of any of the foregoing. A free radical initiator can be activated by exposure to radiation, heat, or at ambient conditions (25° C./50% RH) without exposing the composition to electromagnetic or thermal energy.

An adhesion-promoting composition can include, for example, both a radiation-activated free radical initiator and a chemically-activated free radical initiator. In such compositions, all or a portion of the adhesion-promoting composition can be exposed to radiation to at least partially cure the adhesion-promoting composition, and chemically-activated free radicals can complete or fully cure the adhesion-promoting composition.

Adhesion-promoting compositions can include one radiation-activated free radical initiator or combination of radiation-activated free radical initiators.

A radiation-activated free radical initiator can generate free radicals upon exposure to actinic radiation.

Actinic radiation includes α-rays, γ-rays, X-rays, ultraviolet (UV) light (200 nm to 400 nm) including UV-A (320 nm to 400 nm), UV-B (280 nm to 320 nm), and UV-C (200 nm to 280 nm), visible light (400 nm to 770 nm), blue light (450 nm to 490 nm), infrared (>700 nm), near-infrared (0.75 μm to 1.4 μm), or an electron beam. For example, a radiation-activated free radical initiator can be a photoinitiator such as a visible photoinitiator or a UV photoinitiator.

The free radical photopolymerization reaction can be initiated by exposing an adhesive-promoting composition provided by the present disclosure to actinic radiation such as UV radiation, for example, for less than 180 seconds, less than 120 seconds, less than 90 seconds, less than 60 seconds, less than 30 seconds, less than 15 seconds, or less than 5 seconds.

The free radical photopolymerization reaction can be initiated by exposing an adhesive-promoting composition provided by the present disclosure to actinic radiation such as UV radiation, for example, for from 5 seconds to 180 seconds, from 5 seconds to 120 seconds, from 10 seconds to 90 seconds, from 15 seconds to 60 seconds, for rom 20 seconds to 40 seconds.

The UV radiation can include radiation at a wavelength of 394 nm.

The total power of the UV exposure can be, for example, from 50 mW/cm$^2$ to 500 mW/cm$^2$, from 50 mW/cm$^2$ to 400 mW/cm$^2$, from 50 mW/cm$^2$ to 300 mW/cm$^2$, from 100 mW/cm$^2$ to 300 mW/cm$^2$, or from 150 mW/cm$^2$ to 250 mW/cm$^2$.

Actinic radiation-curable adhesive-promoting compositions provided by the present disclosure can be exposed to a UV dose of 1 J/cm$^2$ to 4 J/cm$^2$ to cure the composition. The UV source is a 8 W lamp with a UVA spectrum. Other doses and/or other UV sources can be used. A UV dose for curing a composition can be, for example, from 0.5 J/cm$^2$ to 4 J/cm$^2$, from 0.5 J/cm$^2$ to 3 J/cm$^2$, from 1 J/cm$^2$ to 2 J/cm$^2$, or from 1 J/cm$^2$ to 1.5 J/cm$^2$.

Actinic radiation-curable adhesive-promoting compositions provided by the present disclosure can also be cured with radiation at blue wavelength ranges such as using a light-emitting diode.

Actinic radiation-curable adhesive-promoting compositions can be substantially transmissive to actinic radiation, partially transmissive to actinic radiation, or substantially opaque to actinic radiation.

Actinic radiation-curable adhesive-promoting compositions provided by the present disclosure comprise a photopolymerization initiator or a combination of photopolymerization initiators.

A photopolymerization initiator can comprise a free radical photoinitiator, a cationic photoinitiator, a photolatent base generator, a photolatent metal catalyst, or a combination of any of the foregoing. Exposure of the photopolymerization initiator to suitable actinic radiation can activate the polymerization initiator, for example, by generating free radicals, producing cations, producing Lewis acids, or releasing activated catalysts.

Suitable photoinitiators include, for example, aromatic ketones and synergistic amines, alkyl benzoin ethers, thioxanthones and derivatives, benzyl ketals, acylphosphine oxide, ketoxime ester or α-acyloxime esters, cationic quaternary ammonium salts, acetophenone derivatives, and combinations of any of the foregoing.

Examples of suitable UV photoinitiators include α-hydroxyketones, benzophenone, α,α-diethoxyacetophenone, 4,4-diethylaminobenzophenone, 2,2-dimethoxy-2-phenylacetophenone, 4-isopropylphenyl 2-hydroxy-2-propyl ketone, 1-hydroxycyclohexyl phenyl ketone, isoamyl p-dimethylaminobenzoate, methyl 4-dimethylaminobenzoate, methyl O-benzoylbenzoate, benzoin, benzoin ethyl ether, benzoin isopropyl ether, benzoin isobutyl ether, 2-hydroxy-2-methyl-1-phenylpropan-1-one, 2-isopropylthioxanthone, dibenzosuberone, 2,4,6-trimethylbenzoyldiphenylphosphine oxide, and bisacyclophosphine oxide.

Examples of suitable benzophenone photoinitiators include 2-hydroxy-2-methyl-1-phenyl-1-propanone, 2-hydroxy-1,4,4-(2-hydroxyethoxy)phenyl]-2-methyl-1-propanone, α-dimethoxy-α-phenylacetophenone, 2-benzyl-2-(dimethylamino)-1-[4-(4-morpholinyl) phenyl]-1-butanone, and 2-methyl-1-[4-(methylthio)phenyl]-2-(4-morpholinyl)-1-propanone.

Examples of suitable oxime photoinitiators include (hydroxyimino)cyclohexane, 1-[4-(phenylthio)phenyl]-octane-1,2-dione-2-(O-benzoyloxime), 1-[9-ethyl-6-(2-methylbenzoyl)-9H-carbazol-3-yl]-ethanone-1-(O-acetyloxime), trichloromethyl-triazine derivatives), 4-(4-methoxystyryl)-2,6-trichloromethyl-1,3,5-triazine), 4-(4-methoxyphenyl)-2,6-trichloromethyl-1,3,5-triazine, and α-aminoketone (1-(4-morpholinophenyl)-2-dimethylamino-2-benzyl-butan-1-one).

Examples of suitable phosphine oxide photoinitiators include diphenyl (2,4,6-trimethylbenzoyl)-phosphine oxide (TPO) and phenylbis(2,4,6-trimethyl benzoyl) phosphine oxide (BAPO).

Other examples of suitable UV photoinitiators include the Irgacure® products from BASF or Ciba, such as Irgacure® 184, Irgacure® 500, Irgacure® 1173, Irgacure® 2959, Irgacure® 745, Irgacure® 651, Irgacure® 369, Irgacure® 907, Irgacure® 1000, Irgacure® 1300, Irgacure® 819, Irgacure® 819DW, Irgacure® 2022, Irgacure® 2100, Irgacure® 784, Irgacure® 250; Irgacure® MBF, Darocur® 1173, Darocur® TPO, Darocur® 4265, and combinations of any of the foregoing.

A UV photoinitiator can comprise, for example, 2,2-dimethoxy-1,2-diphenylethan-1-one (Irgacure® 651, Ciba Specialty Chemicals), 2,4,6-trimethylbenzoyl-diphenyl-phosphineoxide (Darocur® TPO, Ciba Specialty Chemicals), or a combination thereof.

Other examples of suitable photoinitiators include Darocur® TPO (available from Ciba Specialty Chemicals), Lucirin® TPO (available from BASF), Speedcure® TPO (available from Lambson), Irgacure® TPO (available from Ciba Specialty Chemicals, and Omnirad® (available from IGM Resins), and combinations of any of the foregoing.

A photopolymerization initiator can comprise a cationic photoinitiator or a combination of cationic photoinitiators.

Examples of suitable cationic photoinitiators include hexafluoroantimonates, sulfonium salts, perfluorobutane sulfonates, and iodium salts.

Polymerizable compositions provided by the present disclosure can comprise one or more free radial initiators such as thermally-activated free radical initiators. A thermally-activated free radical initiator can become active at elevated temperature, such as at a temperature greater than 25° C.

Examples of suitable thermally-activated free radical initiators include organic peroxy compounds, azobis(organonitrile) compounds, N-acyloxyamine compounds, O-iminoisourea compounds, and combinations of any of the foregoing. Examples of suitable organic peroxy compounds, that may be used as thermal polymerization initiators include peroxymonocarbonate esters, such as tertiarybutylperoxy 2-ethylhexyl carbonate and tertiarybutylperoxy isopropyl carbonate; peroxyketals, such as 1,1-di-(tert-butyl peroxy)-3,3,5-trimethylcyclohexane; peroxydicarbonate esters, such as di(2-ethylhexyl)peroxydicarbonate, di(secondary butyl)peroxydicarbonate and diisopropylperoxydicarbonate; diacyperoxides such as 2,4-dichlorobenzoyl peroxide, isobutyryl peroxide, decanoyl peroxide, lauryl peroxide, propionyl peroxide, acetyl peroxide, benzoyl peroxide, and p-chlorobenzoyl peroxide; peroxyesters such as tert-butylperoxy pivalate, tert-butylperoxy octylate, and tert-butylperoxyisobutyrate; methylethylketone peroxide, acetylcyclohexane sulfonyl peroxide, and combinations of any of the foregoing. Other examples of suitable peroxy compounds include 2,5-dimethyl-2,5-di(2-ethylhexanoylperoxy)hexane, and/or 1,1-bis(tert-butylperoxy)-3,3,5-trimethylcyclohexane. Examples of suitable azobis(organonitrile) compounds that may be used as thermal polymerization initiators include azobis(isobutyronitrile), 2,2'-azobis(2-methyl-butanenitrile), and/or azobis(2/1-dimethylvaleronitrile). A thermally-activated free radical initiator can comprise 1-acetoxy-2,2,6,6-tetramethylpiperidine and/or 1,3-dicyclohexyl-O—(N-cyclohexylideneamino)-isourea.

Adhesion-promoting compositions provided by the present disclosure, can be exposed to actinic radiation for a sufficient time to fully or partially cure the surface of the composition. The full depth of the composition can then cure with time via dark cure mechanisms, for example, in which free radicals are generated by chemical mechanisms. Providing a fully or partially cured surface can facilitate handling of the article comprising the adhesion-promoting interlayer and can provide structural strength and integrity while the article is being fabricated and fully cures.

Adhesion-promoting compositions provided by the present disclosure can comprise a chemically-activated free radical initiator or a combination of chemically-activated free radical initiators. Chemically-activated free radical initiators refer to compounds and complexes capable of generating free radicals without being activated by actinic radiation and/or by exposure to heat.

Chemically-activated free radical initiators can facilitate curing of portions of an adhesion-promoting composition not exposed to actinic radiation and can effectively extend the depth of cure. For example, adhesion-promoting compositions can be at least partly curable upon exposure to actinic radiation and such compositions can include a photopolymerization initiator. The actinic radiation can be applied to at least a portion of an adhesion-promoting composition. The adhesion-promoting composition can be accessible to the actinic radiation and the portion of the adhesion-promoting composition exposed to the actinic radiation can be cured to a certain surface depth and/or to a certain radiation does. A portion of the adhesion-promoting composition may not be accessible or may be incompletely accessible to actinic radiation either because of absorption or scattering of the actinic radiation such that the adhesion-promoting composition prevents the actinic radiation from interacting with the full thickness of the adhesion-promoting composition.

Chemically-activated free radical initiators can also be included in adhesion-promoting compositions that are not curable upon exposure to actinic radiation. For example, an overlying layer of a sulfur-containing sealant may not be transmissive or may be only partially transmissive to actinic radiation such as UV radiation.

In dark cure mode, i.e., when actinic radiation such as UV radiation is not used to generate free radicals, chemically-activated free radical initiators provide an alternate radical initiation mechanism that takes place in absence of actinic radiation.

Examples of suitable chemically-activated free radical initiators include combinations of metal complexes and organic peroxides, trialkylborane complexes, and peroxide-amine redox initiators.

Examples of suitable chemically-activated free radical initiators are disclosed, for example, in U.S. application Ser. No. 16/373,668 filed on Apr. 3, 2019, and in PCT International Publication No. WO 2018/227149.

Combinations of metal complexes and organic peroxides can be used as free radical initiators in adhesion-promoting compositions provided by the present disclosure. Combinations of metal complexes and organic peroxides can also impart useful dual cure properties to radiation curable compositions such as actinic radiation-curable adhesion-promoting compositions. The cure dynamics can depend on the combination of metal complexes and organic peroxides. Using different solvent mixtures to disperse the metal complexes it is also possible to control the gel time of an adhesion-promoting composition and control the time to fully cure an adhesion-promoting composition under dark conditions. Physical properties and adhesion of adhesion-promoting compositions cured using a dark cure redox radial initiated reaction are comparable to those of compositions cured using actinic radiation only (in the absence of the dark cure catalyst system) such as UV-radiation. Such dual cure adhesion-promoting compositions have several advantages. For example, in geometries and configurations where it is not possible to directly expose an adhesion-promoting composition to actinic radiation, a portion of the adhesion-promoting composition can be exposed to the actinic radiation thereby initiating dark cure redox curing mechanisms that can propagate through unexposed areas of the adhesion-promoting composition. As another example, an overlying sulfur-containing sealant layer may not be sufficiently transmissive to actinic radiation to partially or fully activate radiation-activated free radical initiators in the adhesion-promoting composition. For example, the overlying sulfur-containing sealant layer can contain constituents that absorb and/or scatter incident actinic radiation. Dual cure mechanisms can further provide opportunities to control the cure rate of an adhesion-promoting composition, which can lead to improved properties such as improved tensile strength, % elongation, solvent resistance, and adhesion. The use of dark-cure catalysts can expand the range of materials used in the sulfur-containing sealant layer.

Adhesion-promoting compositions provided by the present disclosure can comprise a metal complex or combination of metal complexes capable of generating free radicals. Suitable metal complexes are capable of reacting with organic peroxides at temperatures from 20° C. to 25° C. to generate free radicals.

Suitable metal complexes include metal(II) ($M^{2+}$) and metal(III) ($M^{3+}$) complexes. The anions can be compatible with the other components of an adhesion-promoting composition. For example, suitable anions include organic anions.

In the presence of a suitable organic peroxides, suitable metal complexes can provide a fully cured adhesion-promoting composition, for example, within 7 days, within 10 days, within 14 days, within 21 days, or within 28 days.

Suitable metal complexes include metal complexes of cobalt, copper, manganese, iron, vanadium, potassium, cerium, and aluminum. Suitable ligands include organic ligands.

Examples of suitable metal(II) complexes include manganese(II) bis(tetramethylcyclopentadienyl), manganese(II) 2,4-pentanedioante, manganese(II) acetylacetonate, iron(II) acetylacetonate, iron(II) trifluoromethanesulfonate, iron(II) fumarate, cobalt(II) acetylacetonate, copper(II) acetylacetonate, and combinations of any of the foregoing.

Examples of suitable metal(III) complexes include manganese(III) 2,4-pentanedionate, manganese(III) acetylacetonate, manganese(III) methanesulfonate, iron(III)acetylacetonate, and combinations of any of the foregoing.

Examples of suitable metal complexes include Mn(III) (acac)3, Mn(III)(2,2'-bipyridyl)2(acac)$_3$, Mn(II)(acac)$_2$, V(acac)$_3$(2,2'-bipyridyl), Fe(III)acac)$_3$, and combinations of any of the foregoing.

Suitable Mn complexes can be formed with ligands including, for example, 2,2'-bipyridine, 1,10-phenanthroline, 1,4,7-trimethyl-4,7-triazacyclononane, 1,2-bis(4,7-dimethyl-1,4,7-triazacyclononan-1-yl)-ethane, N,N,N',N'',N''',N'''-hexamethyltriethylenetetraamine, acetylacetonate (acac), N,N'-bis(alicylidene)cyclohexylenediamine, 5,10,15,20-tetrakisphenylporphyrin, 5,10,15,20-tetrakis(4'-methoxyphenyl)porphyrin, porphyrin, 6-amino-1,4,6-trimethyl-1, 4-diazacycloheptane, 6-dimethylamino-1,4-bis (pyridine-2-ylmethyl)-6-methyl-1, 4-diazacycloheptane, 1,4,6-trimethyl-6[N-pyridin-2-ylmethyl)-N-methylamino]-1,4-dizazcycloheptane, 4,11-dimethyl-1,4,8,11-tetraazabicyclo[6.6.2]hexadecane, and combinations of any of the foregoing.

Suitable Fe complexes can be formed with ligands including, for example, 1,4-deazacycloheptane-based ligands such as 6-amino-1,4,6-trimethyl-1,4-diazacycloheptane, 6-dimethylamino-1,4-bis(pyridine-2-ylmethyl)-6-methyl-1,4-diazacycloheptane, 1,4,6-trimethyl-6[N-(pyrinin-2-ylmethyl)-N-methylamino]-1,4-diazacycloheptane, bisphendimethyl 3-methyl-9-oxo-2, and 4-dipyridin-2-yl-7-(pyridin-2-ylmethyl)-3,7-diazbicyclo[3.3.1]nonane-1,3-dicarboxylate; ferrocene-based ligands such as ferrocene, acylferrocene, benzeneacycloferrocene, N,N-bis(pyridin-2-ylmethyl)-1,1-bis (pyridine-2-yl)-1-amino-ethane; and combinations of any of the foregoing.

Suitable metal complexes can be, for example, trivalent or tetravalent.

The ligand of the metal complex can be selected to improve the storage stability of a formulation containing the metal complex. Metal complexes with an acetylacetonate ligand are observed to be storage stable.

Adhesion-promoting compositions provided by the present disclosure can comprise, for example, from 0.01 wt % to 3 wt % of a metal complex, from 0.05 wt % to 2.5 wt %, from 0.1 wt % to 2 wt %, or from 0.5 wt % to 1.5 wt %, where wt % is based on the total weight of the adhesion-promoting composition.

Adhesion-promoting compositions provided by the present disclosure can comprise an organic peroxide or combination of organic peroxides.

Examples of suitable organic peroxides include ketone peroxides, diacyl peroxides, hydroperoxides, dialkyl peroxides, peroxyketals, alkyl peresters, and percarbonates.

Suitable organic peroxides include tert-butyl peroxide, cumene hydroperoxide, p-methane hydroperoxide, di-tert-butyl peroxide, tert-butylcumyl peroxide, acetyl peroxide, isobutyryl peroxide, octanoyl peroxide, dibenzoyl peroxide, 3,5,5-trimethylhexanoyl peroxide, and tert-butyl peroxyisobutyrate. Additional examples of suitable organic peroxides include benzoyl peroxide, tert-butyl perbenzoate, o-methylbenzoyl peroxide, p-methylbenzoyl peroxide, di-tert-butyl peroxide, dicumyl peroxide, 1,1-bis(tert-butylperoxy)-3,3,5-trimethyl cyclohexane, 1,1-di(tert-butylperoxy) cyclohexane, 2,5-dimethyl-2,5-di(tert-butylperoxy)hexane, 2,5-dimethyl-2,5-di(tert-butylperoxy)hexane, 1,6-bis(p-toluoylperoxy carbonyloxy)hexane, di(4-methylbenzoyl peroxy)hexamethylene bis-carbonate, tert-butylcumyl peroxide, methyl ethyl ketone peroxide, cumene hydroperoxide, 2,5-dimethyl-2,5-di(tert-butylperoxy)hexane, 2,5-dimethyl-2,5-di(benzoylperoxy)hexane, 2,5-dimethyl-2,5-di (tert-butylperoxy)hexane, 1,3-bis(tert-butylperoxypropyl) benzene, di-tert-butylperoxy-diisopropylbenzene, tert-butylperoxybenzene, 2,4-dichlorobenzoyl peroxide, 1,1-dibutylperoxy-3,3,5-trimethylsiloxane, n-butyl-4,4-di-tert-butyl peroxyvalerate, and combinations of any of the foregoing.

Examples of suitable organic peroxides include 3,3,5,7, 7-pentamethyl-1,2,4-trioxepane, 2,5-dimethyl-2,5-di(tert-butylperoxy)hexyne-3, di-tert-butyl peroxide, 2,5-dimethyl- 2,5-di(tert-butylperoxy)hexane, tert-butyl cumyl peroxide, di(tert-butylperoxyisopropyl)benzene, dicumyl peroxide, butyl 4,4-di(tert-butylperoxy)valerate, tert-butylperoxy 2-ethylhexyl carbonate, 1,1-di(tert-butylperoxy-3,3,5-trimethylcyclohexane, tert-butyl peroxybenzoate, di(4-methylbenzoyl) peroxide, dibenzoyl peroxide, and di(2,4-dichlorobenzoyl) peroxide, which are commercially available, for example, from AkzoNobel.

Adhesion-promoting compositions comprising an organic peroxide can also contain a metal salt, such as, for example, Fe(II) sulfate heptahydrate or Mn(III)-stearate.

Adhesion-promoting compositions provided by the present disclosure can comprise, for example, from 0.1 wt % to 5 wt %, from 0.2 wt % to 3 wt % of an organic peroxide, from 0.5 wt % to 3 wt %, from 0.7 wt % to 2.5 wt %, from 0.1 wt % to 2 wt %, from 0.2 wt % to 2 wt %, or from 0.2 wt % to 1 wt %, where wt % is based on the total weight of the adhesion-promoting composition.

Metal complexes and organic peroxides can be provided in dilute solutions of a solvent. For example, the solutions can comprise from 1 wt % to 15 wt %, or from 5 wt % to 15 wt % of the metal complex or organic peroxide. Examples of solvents include acetylacetone, HB-40® (combination of terphenyls), toluene, water, isopropanol, methyl propyl ketone, hexanes, methanol, and cyclohexane.

The solvent can influence the curing time of an adhesion-promoting composition. For example in Fe(III)(acetylacetonate)$_3$ and Mn(III)(acetylacetonate)$_3$ systems, increasing the ratio of toluene to acetylacetonate in the solution can make the metal center more available for reaction by shifting the equilibrium in a direction where the ligand(s) can leave more easily. This mechanism should also be applicable with other ligand and metal-ligand complexes such as 2-ethylhexanoic acid and cobalt(II)bis(2-ethylhexanoate). Thus, by using different metals, organic anions, and solvent compositions, the cure time and the application time can be selected for dual cure systems.

Suitable solvents can have, for example, a polarity similar to that of toluene. Suitable solvents include, for example, toluene, o-xylene, cyclohexane, diethyl ether, methyl-tert-butyl ether, hexane, and ethyl acetate.

Suitable organic peroxides include those commercially available under the tradename Trigonox®, Butanox®, and Perkodox® from AkzoNobel, and, under the tradename Cadox® from Summit Composites Pty, Ltd.

Trialkylborane complexes can be used to generate free radicals. In the process, a blocked trialkylborane B(—R)$_3$(-L) where each R is an alkyl such as a C$_{1-8}$ alkyl, and L is a ligand can be deblocked to form a trialkylborane B(—R)$_3$. The deblocking can take place in the presence of an acid and/or a co-catalyst. At room temperature (25° C.) the un-blocked trialkyl borane can oxidize in the presence of atmospheric O$_2$ to form the peroxide R$_2$B—O—O—R, which upon fragmentation provides several radicals including the borinate radical B(R)$_2$O*, an alkyl radical R*, a peroxy radical R—O—O*, and an alkoxy radial R—O*, in increasing order of reactivity. Reaction of the trialkyl borane with oxygen is necessary to generate the free radical. Thus, when used as the only radical catalyst in a coreactive composition system the depth of cure will be limited by the diffusion of atmospheric oxygen from the surface.

To extend the generation of free radicals using trialkyl boranes a co-catalyst can be used to provide a source of oxygen. The co-catalyst should provide a source of oxygen radicals at room temperature and suitable illumination conditions and be able to deblock the ligand from the borane complex under dark conditions.

For example, under dark cure conditions, i.e., when actinic radiation such as UV radiation is not used to generate free radicals, the decomposition of a trialkyl borane complex tri-n-butylborane-3-methoxypropylamine (TnBB-MOPA), in the presence of a co-catalyst tetrabutylammonium persulfate (TBAPS) to generate free radicals and initiate the polymerization reaction.

The use of organoborane complexes in combination with a dark cure co-catalyst can provide cured adhesion-promoting composition compositions with properties similar to those of UV-cured adhesion-promoting compositions.

Adhesion-promoting compositions provided by the present disclosure can comprise an organoborane complex or a combination of organoborane complexes. An organoborane complex comprises an organoborane complexed with a ligand.

Adhesion-promoting compositions can comprise, for example, from 0.1 wt % to 4 wt % of an organoborane complex, from 0.5 wt % to 3.5 wt %, from 1 wt % to 3 wt %, or from 1.5 wt % to 2.5 wt % of an organoborane complex, where wt % is based on the total weight of the adhesion-promoting composition.

An organoborane complex can comprise an organoborane compound and a blocking ligand. When the organoborane becomes unblocked, the organoborane can react with oxygen or an oxygen source to provide a source of radicals for promoting a free radical initiated reaction such as a thiol-ene polymerization reaction.

An organoborane radical initiator may be any organoborane compound known in the art capable of generating free radicals. Examples of suitable organoboranes include trifunctional boranes having the structure of Formula (10):

(10)

where each of R$^{10}$ can independently be selected from hydrogen, C$_{1-20}$ alkyl, C$_{1-20}$ alkoxy, C$_{5-10}$ cycloalkyl, and C$_{6-8}$ aryl. For example, each R$^{10}$ can be independently selected from C$_{1-20}$ alkyl, C$_{1-15}$ alkyl, C$_{1-10}$ alkyl, or C$_{1-5}$ alkyl.

Examples of suitable organoboranes include tri-methylborane, tri-ethylborane, tri-n-butylborane, tri-n-octylborane, tri-sec-butylborane, tri-dodecylborane, phenyldiethylborane, and combinations of any of the foregoing. An organoborane can comprise tri-n-butylborane.

An organoborane can be an organosilicon-functional organoborane and may include a functional group including at least one of a silicon atom, a siloxane prepolymer, and a siloxane polymer. Examples of suitable organosilicon-functional organoboranes are described in PCT International Publication No. WO 2006/073695. An organosilicon-functional organoborane may include a complex including at least one a silicon atom, a siloxane prepolymer, and/or a siloxane polymer.

An organoborane initiator can be derived from decomplexation of an air-stable complex of an organoborane compound and an organonitrogen compound. For example, an organoborane initiator can be derived from an organoborane-organonitrogen complex. Suitable organoborane initiators include, for example, organoborane-amine complexes, organoborane-azole complexes, organoborane-amidine complexes, organoborane-heterocyclic nitrogen complexes, amido-organoborate complexes, and combinations thereof. An organoborane-amine complex can comprise a trialkylborane-amine complex. Additional examples of suitable organoborane initiators are described in U.S. Publication No. 2007/0141267, U.S. Pat. No. 7,247,596, and PCT International Publication No. 2007044735. An organoborane initiator can be referred to as an organoborane-amine complex.

An organoborane-amine complex includes a complex formed between an organoborane and a suitable amine that renders the organoborane-amine complex stable at ambient conditions. Any suitable organoborane-amine complex known in the art may be used. An organoborane-amine complex can be capable of initiating polymerization or cross-linking of the radical curable organic compound through introduction of an amine-reactive compound, and/or by heating. For example, an organoborane-amine complex can be destabilized at ambient temperatures through exposure to suitable amine-reactive compounds. Heat may be applied if needed or desired. An organoborane-amine complex can have the structure of Formula (11):

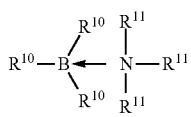

(11)

where $R^{11}$ can independently be selected from hydrogen, $C_{1-12}$ alkyl, $C_{1-12}$ heteroalkyl, $C_{5-12}$ cycloalkyl, $C_{5-12}$ heterocycloalkyl, $C_{6-12}$, alkylaryl, an organosilane group, an organosiloxane group, a $C_{1-12}$ alkanediyl group capable of functioning as a covalent bridge to the boron, a divalent organosiloxane group capable of functioning as a covalent bridge to the boron, and halogen substituted homologues thereof, such that at least one of $R^{10}$ includes one or more silicon atoms and is covalently bonded to boron. In $C_{1-12}$ heteroalkyl and $C_{5-12}$ heterocycloalkyl the one or more heteroatoms can be O. Each $R^{11}$ can have the structure —$(CH_2)_{n1}$—O—$(CH_2)_{n2}$, where n1 is an integer from 1 to 10, from 1 to 8, from 1 to 6, or from 1 to 4; and each n2 can be an integer from 1 to 8, from 1 to 6, from 1 to 4, or from 1 to 2.

Any suitable amine ligand can be used to form the organoborane-amine complex. Examples of suitable amines include at least one of an alkyl group, an alkoxy group, an imidazole group, an amidine group, an ureido group, and combinations thereof. Suitable amines include, for example, 1,3 propane diamine, 1,6-hexanediamine, methoxypropylamine, pyridine, isophorone diamine, 3-aminopropyltrimethoxysilane, aminomethyltrimethoxysilane, 3-aminopropyltriethoxysilane, aminomethyltriethoxysilane, 2-(trimethoxysilylethyl)pyridine, aminopropylsilanetriol, 3-(m-aminophenoxy)propyltrimethoxysilane, 3-aminopropyldiisopropylmethoxysilane, aminophenyltrimethoxysilane, 3-aminopropyltris(methoxyethoxethoxy)silane, tert-4-(2-aminoethyl)-3-aminopropyltrimethoxysilane, $N_1$-(6-aminohexyl)aminomethyltrimethoxysilane, N-(2-aminoethyl)-11-aminoundecyltrimethoxysilane, aminoethylaminomethylphenethyltrimethoxysilane, N-(2-aminoethyl)-3-aminopropylmethyldimethoxysilane, N-(2-aminoethyl)-3-aminoisobutylmethyldimethoxysilane, (3-trimethoxysilylpropyl)diethylene-triamine, 1,1,2,4-tetramethyl-1-sila-2-azacyclopentane, amine functional organopolysiloxanes including at least one amine functional group such as 3-aminopropyl, 6-aminohexyl, 11-aminoundecyl, 3-(N-allylamino)propyl, N-(2-aminoethyl)-3-aminopropyl, aminomethyl, N-(2-aminoethyl)-3-aminoisobutyl, p-aminophenyl, 2-ethylpyridine, and 3-propylpyrrole, nitrogen compounds including N-(3-triethyoxysilylpropyl)-4,5-dihydroimidazole, ureidopropyltriethoxysilane, and combinations of any of the foregoing. An amine ligand can be selected from amine-functional alkoxysilanes, amine-functional organopolysiloxanes, and combinations thereof. In another embodiment, the amine includes N-(2-aminoethyl)-3-aminopropyltrimethoxysilane. An amine ligand can be selected from 2-methoxyethyl amine, 3-methoxypropyl amine, 4-methoxybutyl amine, and combinations of any of the foregoing.

An organoborane complex can be physically and/or chemically attached (bound) to a solid particle such as a phase support or an inorganic particle to control working times, as well as to stabilize liquid phase organoborane-amine complexes against separating during storage.

Organoborane-amine complexes are capable of being deblocked in an acidic environment.

Examples of suitable organoborane complexes include trialkylborane-amine complexes such as tris(n-butyl)borane-3-methoxypropylamine, triethylborane-1,3-diaminopropane, and triethylborane-diethylenetriamine, available, for example, from Callery.

Adhesion-promoting compositions provided by the present disclosure can comprise a radical oxidizing agent or a combination of radical oxidizing agents. A suitable radical oxidizing agent is capable of forming free radicals at room temperature and can serve as a source of oxygen for the generation of free radicals by the organoborane.

Adhesion-promoting compositions provided by the present disclosure can comprise, for example, from 0.1 wt % to 4 wt %, from 0.5 wt % to 3.5 wt %, from 1 wt % to 3 wt % or from 1.5 wt % to 2.5 wt %, of a radical oxidizing agent, where wt % is based on the total weight of the adhesion-promoting composition.

Examples of suitable radical oxidizing agents include bis(tetrabutylammonium) persulfate (TBAPS), and other bis(tetraalkylammonium) persulfates such as bis(tetramethylammonium) persulfate, bis(tetraethylammonium) persulfate, bis(tributylmethylammonium) persulfate, and combinations of any of the foregoing.

In certain adhesion-promoting compositions the radical oxidizing agent comprises tetrabutylammonium persulfate (TBAPS) and the organoborane complex comprises the tri-n-butylborane-3-methoxypropylamine complex (TnBB-MOPA).

A chemically initiated free radical generator can comprise a peroxide and an amine where the peroxide and amine form a peroxide-amine redox initiator. The amine can comprise, for example, dihydroxyethyl-p-toluidine, N,N-diisopropylethylamine, and N,N,N',N'',N''-pentamethyl-diethylenetriamine. The peroxide can comprise, for example, di-tert-butyl peroxide, methyl ethyl ketone peroxide, and benzoyl peroxide.

Adhesion-promoting compositions provided by the present disclosure can comprise a solvent or combination of solvents. The solvent can comprise an organic solvent or a combination of organic solvents. An organic solvent can comprise a volatile organic solvent that facilitates the ability of the adhesion-promoting composition to dry when applied to an underlying sealant layer and/or substrate.

A suitable volatile organic solvent can have a high vapor pressure at 25° C. such as greater than 10 mm Hg, greater than 25 Hg, greater than 50 mm Hg, greater than 150 mm Hg, or greater than 200 mm Hg.

Examples of suitable solvents include acetone, methylethyl ketone, methyl acetate, diethyl ether, isopropanol and combinations of any of the foregoing.

Adhesion-promoting compositions provided by the present disclosure can comprise a polymerization moderator or a combination of polymerization moderators. A polymerization moderator can minimize the formation of any distortions or defects, e.g., striations and or cracks/fissures, in a polymerized adhesion-promoting composition.

Examples of suitable polymerization moderators include dilauryl thiodipropionate, 1-isopropyl-4-methyl-1,4-cyclohexadiene (γ-terpinene); 1-isopropyl-4-methyl-1,3-cyclohexadiene (α-terpinene); 1-methyl-4-(propan-2-ylidene)cyclohex-1-ene, (terpinolene); and α-methyl styrene dimer, 1,1-diphenylethylene, cis-1,2-diphenylethylene, 3,7,7-trimethylbicyclo[4.1.0]hept-3-ene (3-carene), 4-isopropenyl-1-methylcyclohexene (dipentene), (S)-(+4-isopropenyl-1-methylcyclohexene ((S)-limonene), 2,6-dimethyl-2,4,6-octatriene, 4-tert-butylpyrocatechol, triphenylmethane, and combinations of any of the foregoing.

A polymerization moderator can comprise 1-isopropyl-4-methyl-1,4-cyclohexadiene; 1-isopropyl-4-methyl-1,3-cyclohexadiene; 1-methyl-4-(propan-2-ylidene)cyclohex-1-ene; 2,6-dimethyl-2,4,6-octatriene, α-methyl styrene dimer, or a combination of any of the foregoing. An α-methyl styrene dimer refers to a polymerization moderator such as 2,4-diphenyl-4-methyl-1-pentene, and optionally at least one of 2,4-diphenyl-4-methyl-2-pentene and/or 2-phenyl-1-propene (which is also referred to as, α-methyl styrene). An α-methyl styrene dimer polymerization moderator can include 90 wt % to 93 wt % of 2,4-diphenyl-4-methyl-1-pentene, from 6 wt % to 8 wt % of 2,4-diphenyl-4-methyl-2-pentene, and from 0.25 wt % to 0.75 wt % of 2-phenyl-1-propene, wherein wt % is based on the weight of the α-methyl styrene dimer.

An adhesion-promoting composition provided by the present disclosure can comprise, for example, from 0.01 wt % to 15 wt %, or from 0.1 wt % to 8 wt %, or from 0.3 wt % to 5 wt %, of a polymerization moderator, wherein wt % is based on the total weight of the adhesion-promoting composition.

Adhesion-promoting compositions provided by the present disclosure can comprise colorants such as pigments, dyes, or a combination thereof. An adhesion-promoting composition can comprise, for example, from 0.5 wt % to 10 wt % from 1 wt % to 8 wt %, or from 2 wt % to 6 wt %, or less than 10 wt %, less than 8 wt %, less than 6 wt %, less than 4 wt %, less than 2 wt %, or less than 1 wt % of the adhesion-promoting composition, where wt % is based on the total weight of the adhesion-promoting composition.

A colorant such as a pigment and/or dye can be included in an adhesion-promoting composition to facilitate the ability of an operator to visually inspect a surface to determine whether an adhesion-promoting composition has been applied to a surface and/or whether a sufficient amount of an adhesion-promoting composition has been applied to a surface. In this way, an operator can determine that a homogeneous adhesion-promoting composition has been uniformly applied across the surface before applying an overlying sulfur-containing sealant.

Examples of suitable inorganic pigments include metal-containing inorganic pigments such as those containing cadmium, carbon, chromium, cobalt, copper, iron oxide, lead, mercury, titanium, tungsten, and zinc. Examples further include ultramarine blue, ultramarine violet, reduced tungsten oxide, cobalt aluminate, cobalt phosphate, manganese ammonium pyrophosphate and/or metal-free inorganic pigments. In particular embodiments the inorganic pigment nanoparticles comprise ultramarine blue, ultramarine violet, Prussian blue, cobalt blue and/or reduced tungsten oxide. Examples of specific organic pigments include indanthrone, quinacridone, phthalocyanine blue, copper phthalocyanine blue, and perylene anthraquinone.

Additional examples of suitable pigments include iron oxide pigments, in all shades of yellow, brown, red and black; in all their physical forms and grain categories; titanium oxide pigments in all the different inorganic surface treatments; chromium oxide pigments also co-precipitated with nickel and nickel titanates; black pigments from organic combustion (e.g., carbon black); blue and green pigments derived from copper phthalocyanine, also chlorinated and brominated, in the various α, β and ε crystalline forms; yellow pigments derived from lead sulfochromate; yellow pigments derived from lead bismuth vanadate; orange pigments derived from lead sulfochromate molybdate; yellow pigments of an organic nature based on arylamides; orange pigments of an organic nature based on naphthol; orange pigments of an organic nature based on diketo-pyrrolo-pyrrole; red pigments based on manganese salts of azo dyes; red pigments based on manganese salts of beta-oxynaphthoic acid; red organic quinacridone pigments; and red organic anthraquinone pigments.

Examples of suitable dyes include acridines, anthraquinones, arylmethane dyes, azo dyes, phthalocyanine dyes, quinone-imine dyes including azin dyes, indamins, indophenyls, oxazins, oxazones, and thiazines, thiazole dyes, saffranin dyes, xanthene dyes including fluorene dyes. Examples of suitable dyes include Alcian blue, Alcian yellow, Alizarin, Alizarin red, Alizarin yellow, Azophloxin, Bismarck brown R, Bismarck brown Y, Brilliant cresyl blue, Chrysoidine R, Crisoidine Y, Congo red, Crystal violet, Ethyl green, Fuchsin acid, Gentian violet, Janus green, Lissamine fast yellow, Malachite green, Martius yellow, Meldola blude, Metanil yellow, Methyl orange, Methyl red, Naphthalene black, Naphthol green, Naphthol yellow, Orange G, Purpurin, Rose bengal, Sudan II, Titan yellow, Tropaeolin O, Tropaeolin OO, Tropaeolin OOO, Victoria blue, and Xylene cyanol.

The amount of dye or pigment added to an adhesion-promoting composition can be sufficient to facilitate visual inspection and not compromise the ability to of the adhesion-promoting interlayer to provide sufficient adhesion between the adjoining sulfur-containing sealants.

Adhesion-promoting compositions provided by the present disclosure can comprise a photochromic material or a combination of photochromic materials. A photochromic material can be a reversible photochromic material or a non-reversable photochromic material.

In certain applications it can be desirable that a photochromic agent that is sensitive to the degree of cure be used. Such agents can provide a visual indication that the adhesion-promoting composition has been exposed to a desired amount of actinic radiation, or example, to cure the coreactive composition. Certain photochromic agents can be used as cure indicators. A cure indicator can facilitate the ability to assess the extent of cure of a sealant by visual inspection.

Adhesion-promoting compositions provided by the present disclosure can comprise a photochromic material or a combination of photochromic materials. A photochromic material can be a reversible photochromic material or a non-reversable photochromic material. A photochromic material can be a thermally reversible photochromic material or a thermally non-reversable photochromic material.

A photochromic material can be a compound that is activated by absorbing actinic radiation having a particular wavelength, such as UV radiation, which causes a change in a feature of the photochromic material. A feature change is an identifiable change in a feature of the photochromic material which can be detected using an instrument or visually. Examples of feature changes include a change of color or color intensity and a change in structure or other interactions with energy in the visible UV, infrared (IR), near IR or far IR portions of the electromagnetic spectrum such as absorption and/or reflectance. A color change at visible wavelengths refers to a color change at wavelengths within a range from 400 nm to 800 nm.

A photochromic material can be activated by absorbing radiation energy (visible and non-visible light) having a particular wavelength, such as UV light, to undergo a feature change such as a color change. The feature change can be a change of feature of the photochromic material alone or it can be a change of feature of a coreactive composition. Examples of suitable photochromic materials include spiropyrans, spiropyrimidines, spirooxazines, diarylethenes, photochromic quinones, azobenzenes, other photochromic dyes and combinations thereof. These photochromic materials can undergo a reversible or irreversible feature change when exposed to radiation where the first and second states can be different colors or different intensities of the same color.

Examples of suitable photochromic agents include spiropyrans. Spiropyrans are photochromic molecules that change color and/or fluoresce under different wavelength light sources. Examples of suitable photochromic spiropyrans include 1',3'-dihydro-8-methoxy-1',3',3'-trimethyl-6-nitrospiro[2H-1benzopyran-2,2'-(2H)-indole]; 1',3'-dihydro-1',3',3'-trimethyl-6-nitrospiro[2H-1-benzopyran-2,2'-(2H)-1-indole]; 1,3-dihydro-1,3,3-trimethylspiro[2H-indole-2,3'-[3H]naphth[2,1-b][1,4]oxazine]; 6,8-dibromo-1',3'-dihydro-1',3',3'-trimethylspiro[2H-1-benzopyran-2,2'-(2H)-indole]; 5-chloro-1,3-dihydro-1,3,3-trimethylspiro[2H-indole-2,3'-[3H]phenanthr[9,10-b][1,4]oxazine]; 6-bromo-1',3'-dihydro-1',3',3'-trimethyl-8-nitrospiro[2H-1-benzopyran-2,2'-(2H)-indole]; 5-chloro-1,3-dihydro-1,3,3-trimethylspiro[2H-indole-2,3'-[3H]naphth[2,1-b-][1,4]oxazine]; 1',3'-dihydro-5'-methoxy-1',3,3-trimethyl-6-nitrospiro[2H-1-benzopyran-2,2'(2H)-indole]; 1,3-dihydro-1,3,3-trimethylspiro[2H-indole-2,3'-[3H]phenanthr[9,10-b][1,4-]oxazine]; 5-methoxy-1,3,3-trimethylspiro[indoline-2,3'-[3H]naphtha[2,1-b]-pyran]; 8'-methacryloxymethyl-3-methyl-6'-nitro-1-selenaspiro-[2H-1'-benzopyran-2,2'-benzoselenenazoline]; 3-isopropyl-8'-methacryloxymethyl-5-methoxy-6'-nitro-1-selenaspiro[2H-1'-benzopyran-2,2'-benzoselenazoline]; 3-isopropyl-8'-methacryloxymethyl-5-methoxy-6'-nitro-1-selenaspiro[2H-1 benzopyran-2,2'-benzoselenazoline]; 8'-methacryloxymethyl-5-methoxy-2-methyl-6'-nitro-1-selenaspiro[2H-1'-ben-zopyran-2,2'-benzoselenazoline]; 2,5-dimethyl-8'-methacryloxymethyl-6'-nitro-1-selenaspiro[2H-1'-benzopyran-2,2'-benzoselenazoline]; 8'-methacryloxymethyl-5-methoxy-3-methyl-6'-nitrospiro[benzoselenazoline-2,2'(2'H)-1'-benzothiopyran]; 8-methacryloxymethyl-6-nitro-1',3',3'-trimethylspiro[2H-1-benzothiopyran-2,2'-indoline]; 3,3-dimethyl-1-isopropyl-8'-methacryloxymethyl-6'-nitrospiro-[indoline-2,-2'(2'H)-1'-benzothiopyran]; 3,3-dimethyl-8'-methacryloxymethyl-6'-nitro-1-octadecylspiro[indoline-2,2'(2'H)-1'-benzothiopyran] and combinations of any of the foregoing.

Azobenzenes are capable of photoisomerization between trans- and cis-isomers. Examples of suitable photochromic azobenzenes include azobenzene; 4-[bis(9,9-dimethylfluoren-2-yl)amino]azobenzene; 4-(N,N-dimethylamino) azobenzene-4'-isothiocyanate; 2,2'-dihydroxyazobenzene; 1,1'-dibenzyl-4,4'-bipyridinium dichloride; 1,1'-diheptyl-4, 4'-bipyridinium dibromide; 2,2',4'-trihydroxy-5-chloroazobenzene-3-sulfonic acid, and combinations of any of the foregoing.

Examples of suitable photochromic spirooxazines include 1,3-dihydro-1,3,3-trimethylspiro[2H-indole-2,3'-[3H] phenanthr[9,10-b](1,4-)oxazine]; 1,3,3-trimethyl spiro(indoline-2,3'-(3H)naphth(2,1-b)(1,4)oxazine); 3-ethyl-9'-methoxy-1,3-dimethylspiro(indoline-2,3'-(3H)naphth(2,1-b)(1,4)-oxazine); 1,3,3-trimethylspiro(indoline-2,3'-(3H) pyrido(3,2-f)-(1,4)benzox-azine); 1,3-dihydrospiro (indoline-2,3'-(3H)pyrido(3,2-f)-(1,4)benzoxazine), and combinations of any of the foregoing.

Examples of suitable photochromic spiropyrimidines include 2,3-dihydro-2-spiro-4'-[8'-aminonaphthalen-1'(4'H)-one]pyrimidine; 2,3-dihydro-2-spiro-7'-[8'-imino-7',8'-dihydronaphthalen-1'-amine]pyrimidine, and combinations of any of the foregoing.

Examples of suitable photochromic diarylethenes include 2,3-bis(2,4,5-trimethyl-3-thienyl)maleic anhydride; 2,3-bis (2,4,5-trimethyl-3-thienyl)maleimide; cis-1,2-dicyano-1,2-bis(2,4,5-trimethyl-3-thienyl)ethane; 1,2-bis[2-methylbenzo [b]thiophen-3-yl]-3,3,4,4,5,5-hexafluoro-1-cyclopentene; 1,2-bis(2,4-dimethyl-5-phenyl-3-thienyl)-3,3,4,4,5,5-hexafluoro-1-cyclopentene; stilbene; dithienylethenes, and combinations of any of the foregoing.

Examples of suitable photochromic quinones include 1-phenoxy-2,4-dioxyanthraquinone; 6-phenoxy-5,12-naphthacenequinone; 6-phenoxy-5,12-pentacenequinone; 1,3-dichloro-6-phenoxy-7,12-phthaloylpyrene, and combinations of any of the foregoing.

Other examples of suitable photochromic agents that can be used as cure indicators include ethylviolet and Disperse Red 177.

An adhesion-promoting composition provided by the present disclosure can include, for example, from 0.1 wt % to 10 wt % of a photochromic agent, such as from 0.1 wt % to 5 wt % or from 0.1 wt % to 2 wt %, where wt % is based on the total weight of the adhesion-promoting composition.

An adhesion-promoting composition provided by the present disclosure can be used to provide an interlayer that enhances adhesion between an underlying sulfur-containing sealant and an overlying sulfur-containing sealant.

An adhesion-promoting interlayer can be, for example, from 1 μm to 20 μm thick, from 1 μm to 10 μm, from 2 μm to 8 μm, or from 4 μm to 6 μm thick. An adhesion-promoting interlayer can have a thickness, for example, less than 10 μm, less than 8 μm, less than 6 μm, less than 4 μm, or less than 2 μm. An adhesion-promoting interlayer can have a thickness, for example, greater than 10 μm, greater than 8 μm, greater than 6 μm, greater than 4 μm, or greater than 2 μm.

After an adhesion-promoting composition provided by the present disclosure is applied to an underlying sulfur-containing sealant, the applied adhesion-promoting composition is dried to remove the solvent. Thus, the adhesion-promoting interlayer comprises the radical polymerization product of the free radical polymerizable compounds within the applied adhesion-promoting composition.

An underlying sulfur-containing sealant can be a freshly applied sealant, which can be uncured, partially cured, or fully cured.

An underlying sulfur-containing sealant can be an incumbent sulfur-containing sealant, meaning that the sulfur-containing sealant, has been cured and used for its intended purpose for a period of time. The incumbent sulfur-containing sealant can be undamaged, damaged, or aged. A damaged and/or aged surface can be weathered, abraded, cut, delaminated, pitted, dented, and/or impacted.

Sulfur-containing sealants can be based on polythioether prepolymers, polysulfide prepolymers, sulfur-containing polyformal prepolymers, or monosulfides. Sulfur-containing sealants can be prepared by reacting a sulfur-containing prepolymer with a suitable curing agent that is reactive with the sulfur-containing prepolymer. For example, thiol-terminated sulfur-containing prepolymers can be reacted with a polyepoxide or polyalkenyl curing agent. In other sealants thiol-terminated sulfur-containing prepolymers can be condensed in the presence of a metal oxide to provide a cured sulfur-containing sealant. In other sealants, a thiol-terminated prepolymer can be reacted with a polyalkenyl via a free radical mechanism.

In general, a sulfur-containing sealant has a sulfur content of greater than 10 wt %, such as greater than 15 wt %, or greater than 20 wt %, where wt % is based on the total weight of the sulfur-containing sealant.

An underlying sulfur-containing sealant can comprise any sealant chemistry.

An overlying sulfur-containing sealant can be a free radical polymerizable sulfur-containing sealant, such as a sulfur-containing sealant that is curable upon exposure to actinic radiation, such as UV radiation.

An overlying sulfur-containing sealant can be transmissive to actinic radiation that after the sulfur-containing sealant is applied to a dried adhesion-promoting interlayer, both the sulfur-containing sealant and the adhesion-promoting interlayer are exposed to the actinic radiation and cure via free radical polymerization. In this way, free radical polymerizable groups in the overlying sulfur-containing sealant layer can react with free radical polymerizable groups in the adhesion-promoting interlayer thereby covalently bonding the overlying sulfur-containing sealant and the adhesion-promoting interlayer.

With respect to adhesion between the incumbent sulfur-containing sealant and the adhesion-promoting interlayer, for polysulfides, it is believed that the generation of free radicals causes chain-scission of disulfide bonds that subsequently react with (meth)acryloyl, alkenyl, and/or alkynyl groups of the adhesion-promoting interlayer. For polythioethers it is believed that hydrogens on the αcarbon adjacent a sulfur atom can be extracted to free radicals to create a reactive center on a polythioether backbone that can react with (meth)acryloyl, alkenyl, and/or alkynyl groups of the adhesion-promoting interlayer. Also, any unreacted thiol groups in the incumbent sealant can react with the (meth)acryloyl, alkenyl, and/or alkynyl groups of the adhesion-promoting interlayer.

An underlying or incumbent sulfur-containing sealant can be derived from any suitable curing chemistry. Examples of suitable curing chemistries include, thiol/thiol, thiol/alkenyl, thiol/alkynyl, thiol/isocyanate, thiol/epoxy, and thiol/Michael acceptor curing chemistries.

The sulfur-containing precursor compounds can comprise monomers, oligomers, prepolymers, and combinations thereof. For example, a sulfur-containing compound can comprise a sulfur-containing oligomer, such as a thiol-terminated sulfur-containing oligomer. For example, a sulfur-containing compound can comprise a sulfur-containing prepolymer, such as a thiol-terminated sulfur-containing prepolymer. Examples of suitable prepolymers include polythioethers, polysulfides, sulfur-containing polyformals, monosulfides, and combinations of any of the foregoing.

Examples of sulfur-containing sealants include thiol-terminated polythioether prepolymers cured with polyepoxides, thiol-terminated polythioether prepolymers cured with polyalkenyls, and polysulfides cured with metal oxides.

Specific examples of sulfur-containing sealants include PR2001, PR1828, PR1750, PR1776 and PR2007, each of which is commercially available from PPG Aerospace.

A sulfur-containing prepolymer can comprise a thiol-terminated polythioether prepolymer or combinations of thiol-terminated polythioether prepolymers. Examples of suitable thiol-terminated polythioether prepolymers are disclosed, for example, in U.S. Pat. No. 6,172,179. A thiol-terminated polythioether prepolymer can comprise Permapol® P3.1E, Permapol® P3.1E-2.8, Permapol® L56086, or a combination of any of the foregoing, each of which is available from PPG Aerospace. These Permapol® products are encompassed by the thiol-terminated polythioether prepolymers of Formula (12)-(12c). Thiol-terminated polythioethers include prepolymers described in U.S. Pat. No. 7,390,859 and urethane-containing polythiols described in U.S. Application Publication Nos. 2017/0369757 and 2016/0090507.

A thiol-terminated polythioether prepolymer can comprise a thiol-terminated polythioether prepolymer comprising at least one moiety having the structure of Formula (12):

—[S—(CH$_2$)$_2$—O—(R$^2$—O—)$_m$(CH$_2$)$_2$—S—R$^1$]$_n$—    (12)

where,
each R$^1$ can independently be selected from C$_{2-10}$ n-alkanediyl, C$_{3-6}$ branched alkanediyl, C$_{6-8}$ cycloalkanediyl, C$_{6-10}$ alkanecycloalkanediyl, and —[(CHR$^3$)$_p$—X—]$_q$(CHR$^3$)$_r$—, wherein each R$^3$ can be selected from hydrogen and methyl;
each R$^2$ can independently be selected from C$_{2-10}$ n-alkanediyl, C$_{3-6}$ branched alkanediyl, C$_{6-8}$ cycloalkanediyl, C$_{6-14}$ alkanecycloalkanediyl, and —[(CH$_2$)$_p$—X—]$_q$(CH$_2$)$_r$—;
each X can independently be selected from O, S, and NR, wherein R can be selected from hydrogen and methyl;
m ranges from 0 to 50;
n can be an integer ranging from 1 to 60;
p can be an integer ranging from 2 to 6;
q can be an integer ranging from 1 to 5; and
r can be an integer ranging from 2 to 10.

In moieties of Formula (12), R$^1$ can be —[(CHR$^3$)$_p$—X—]$_q$(CHR$^3$)$_r$— wherein each X can independently be can be selected from O and S.

In moieties of Formula (12), R$^1$ can be —[(CHR$^3$)$_p$—X—]$_q$(CHR$^3$)$_r$—, each X can be O or each X can be S.

In moieties of Formula (12), R$^1$ can be —[(CH$_2$)$_p$—X—]$_q$(CH$_2$)$_r$—, where p can be 2, X can be O, q can be 2, r can be 2, R$^2$ can be ethanediyl, m can be 2, and n can be 9.

In moieties of Formula (12), each R$^1$ can be derived from 1,8-dimercapto-3,6-dioxaoctane (DMDO), each R$^1$ can be derived from dimercaptodiethylsulfide (DMDS), or a combination thereof.

In moieties of Formula (12), each m can independently be an integer from 1 to 3. Each m can be the same and can be 1, 2, or 3.

In moieties of Formula (12), n can be an integer from 1 to 30, an integer from 1 to 20, an integer from 1 to 10, or an integer from 1 to 5. In addition, n may be any integer from 1 to 60.

In moieties of Formula (12), each p can independently be 2, 3, 4, 5, and 6. Each p can be the same and can be 2, 3, 4, 5, or 6.

In moieties of Formula (12), each q can independently be 1, 2, 3, 4, or 5. Each q can be the same and can be 1, 2, 3, 4, or 5.

In moieties of Formula (12), each r can independently be 2, 3, 4, 5, 6, 7, 8, 9, or 10.

In moieties of Formula (12), each r can be the same and can be 2, 3, 4, 5, 6, 7, 8, 9, or 10.

In moieties of Formula (12), each r can independently be an integer from 2 to 4, from 2 to 6, or from 2 to 8.

In moieties of Formula (12), each $R^2$ can independently be selected from a $C_{2-10}$ n-alkanediyl group, a $C_{3-6}$ branched alkanediyl group, and a —[(CH$_2$)$_p$—X—]$_q$(CH$_2$)$_r$— group.

In moieties of Formula (12), each $R^2$ can independently be a $C_{2-10}$ n-alkanediyl group.

In moieties of Formula (12), each $R^2$ can independently comprise a —[(CH$_2$)$_p$—X—]$_q$(CH$_2$)$_r$— group, where each X can be O or S.

Thiol-terminated sulfur-containing prepolymer of Formula (12) can comprise a thiol-terminated polythioether prepolymer or combination of thiol-terminated polythioether prepolymers, where E comprises the backbone of a polythioether prepolymer.

A thiol-terminated polythioether prepolymer can have the structure of Formula (13):

HS-(E-SH)W—SH            (13)

wherein, each E can comprise a moiety having the structure of Formula (14):

—S—R$^1$—[S-A-S—R$^1$—]$_n$—S—            (14)

wherein,
n can be an integer from 1 to 60;
each $R^1$ can independently be selected from $C_{2-10}$ alkanediyl, $C_{6-8}$ cycloalkanediyl, $C_{6-14}$ alkanecycloalkanediyl, $C_{5-8}$ heterocycloalkanediyl, and —[(CHR$^3$)$_p$—X—]$_q$(CHR$^3$)$_r$—, where,
p can be an integer from 2 to 6;
q can be an integer from 1 to 5;
r can be an integer from 2 to 10;
each $R^3$ can independently be selected from hydrogen and methyl; and
each X can independently be selected from O, S, S—S, and NR, wherein R can be selected from hydrogen and methyl; and
each A can independently be a moiety derived from a polyvinyl ether of Formula (15) and a polyalkenyl polyfunctionalizing agent of Formula (16):

CH$_2$=CH—O—(R$^2$—O)$_m$—CH=CH$_2$            (15)

B(—R$^{70}$—CH=CH$_2$)$_z$            (16)

wherein,
m can be an integer from 0 to 50;
each $R^2$ can independently be selected from $C_{1-10}$ alkanediyl, $C_{6-8}$ cycloalkanediyl, $C_{6-14}$ alkanecycloalkanediyl, and —[(CHR$^3$)$_p$—X—]$_q$(CHR$^3$)$_r$—, wherein p, q, r, $R^3$, and X are as defined as for $R^1$;
B represents a core of a z-valent, polyalkenyl polyfunctionalizing agent B(—R$^{70}$—CH=CH$_2$)$_z$ wherein,
z can be an integer from 3 to 6; and
each $R^{70}$ can independently be selected from $C_{1-10}$ alkanediyl, $C_{1-10}$ heteroalkanediyl, substituted $C_{1-10}$ alkanediyl, and substituted $C_{1-10}$ heteroalkanediyl.

In moieties of Formula (14), $R^1$ can be $C_{2-10}$ alkanediyl.

In moieties of Formula (14), $R^1$ can be —[(CHR$^3$)$_p$—X—]$_q$(CHR$^3$)$_r$—.

In moieties of Formula (14), X can be selected from O and S, and thus —[(CHR$^3$)$_p$—X—]$_q$(CHR$^3$)$_r$— in Formula (14) can be —[(CHR$^3$)$_p$—O—]$_q$(CHR$^3$)$_r$— or —[(CHR$^3$)$_p$—S—]$_q$(CHR$^3$)$_r$—. P and r can be equal, such as where p and r can both be two.

In moieties of Formula (14), $R^1$ can be selected from $C_{2-6}$ alkanediyl and —[(CHR$^3$)$_p$—X—]$_q$(CHR$^3$)$_r$—.

In moieties of Formula (14), $R^1$ can be —[(CHR$^3$)$_p$—X—]$_q$(CHR$^3$)$_r$—, and X can be O, or X can be S.

In moieties of Formula (14) where $R^1$ can be —[(CHR$^3$)$_p$—X—]$_q$(CHR$^3$)$_r$—, p can be 2, r can be 2, q can be 1, and X can be S; or p can be 2, q can be 2, r can be 2, and X can be O; or p can be 2, r can be 2, q can be 1, and X can be O.

In moieties of Formula (14) where $R^1$ can be —[(CHR$^3$)$_p$—X—]$_q$(CHR$^3$)$_r$—, each $R^3$ can be hydrogen, or at least one $R^3$ can be methyl.

In moieties of Formula (14), $R^1$ can be —[(CH$_2$)$_p$—X—]$_q$(CH$_2$)$_r$— wherein each X can independently be selected from O and S. In polythioethers of Formula (5), $R^1$ can be —[(CH$_2$)$_p$—X—]$_q$(CH$_2$)$_r$— each X can be O or each X can be S.

In moieties of Formula (14), $R^1$ can be —[(CH$_2$)$_p$—X—]$_q$(CH$_2$)$_r$—, where p can be 2, X can be O, q can be 2, r can be 2, $R^2$ can be ethanediyl, m can be 2, and n can be 9.

In moieties of Formula (14), each $R^1$ can be derived from 1,8-dimercapto-3,6-dioxaoctane (DMDO; 2,2-(ethane-1,2-diylbis(sulfanyl))bis(ethan-1-thiol)), or each $R^1$ can be derived from dimercaptodiethylsulfide (DMDS; 2,2'-thiobis(ethan-1-thiol)), and combinations thereof.

In moieties of Formula (14), each p can independently be selected from 2, 3, 4, 5, and 6. Each p can be the same and can be 2, 3, 4, 5, or 6.

In moieties of Formula (14) each q can independently be 1, 2, 3, 4, or 5. Each q can be the same and can be 1, 2, 3, 4, or 5.

In moieties of Formula (14), each r can independently be 2, 3, 4, 5, 6, 7, 8, 9, or 10. Each r can be the same and can be 2, 3, 4, 5, 6, 7, 8, 9, or 10.

In moieties of Formula (14), each r can independently be an integer from 2 to 4, from 2 to 6, or from 2 to 8.

In moieties of Formula (14), each A can be derived from a polyvinyl ether such as a divinyl ether. A divinyl ether can comprise a divinyl ether having the structure of Formula (15).

In divinyl ethers of Formula (15), m can bean integer from 0 to 50, such as from 0 to 40, from 0 to 20, from 0 to 10, from 1 to 50, from 1 to 40, from 1 to 20, from 1 to 10, from 2 to 50, from 2 to 40, from 2 to 20, or from 2 to 10.

In divinyl ethers of Formula (15), each $R^2$ can independently be selected from a $C_{2-10}$ n-alkanediyl group, a $C_{3-6}$ branched alkanediyl group, and a —[(CH$_2$)$_p$—X—]$_q$(CH$_2$)$_r$— group.

In divinyl ethers of Formula (15), each $R^2$ can independently be a $C_{2-10}$ n-alkanediyl group, such as methanediyl, ethanediyl, n-propanediyl, or n-butanediyl.

In divinyl ethers of Formula (15), each $R^2$ can independently comprise a —[(CH$_2$)$_p$—X—]$_q$(CH$_2$)$_r$— group, where each X can be O or S.

In divinyl ethers of Formula (15), each $R^2$ can independently comprise a —[(CH$_2$)$_p$—X—]$_q$(CH$_2$)$_r$— group.

In divinyl ethers of Formula (15), each m can be independently an integer from 1 to 3. Each m can be the same and can be 1, 2, or 3.

In divinyl ethers of Formula (15), each $R^2$ can independently be selected from a $C_{2-10}$ n-alkanediyl group, a $C_{3-6}$ branched alkanediyl group, and a —[$(CH_2)_p$—X—]$_q$—$(CH_2)_r$— group.

In divinyl ethers of Formula (15), each $R^2$ can independently be a $C_{2-10}$ n-alkanediyl group.

In divinyl ethers of Formula (15), each $R^2$ can independently be a —[$(CH_2)_p$—X—]$_q$$(CH_2)_r$— group, where each X can be O or S.

In divinyl ethers of Formula (15), each $R^2$ can independently be a —[$(CH_2)_p$—X—]$_q$$(CH_2)_r$— group, where each X can be O or S, and each p can independently be 2, 3, 4, 5, and 6.

In divinyl ethers of Formula (15), each p can be the same and can be 2, 3, 4, 5, or 6.

In divinyl ethers of Formula (15), each $R^2$ can independently be a —[$(CH_2)_p$—X—]$_q$$(CH_2)_r$— group, where each X can be O or S, and each q can independently be 1, 2, 3, 4, or 5.

In divinyl ethers of Formula (15), each q can be the same and can be 1, 2, 3, 4, or 5.

In divinyl ethers of Formula (15), each $R^2$ can independently be a —[$(CH_2)_p$—X—]$_q$$(CH_2)_r$— group, where each X can be O or S, and each r can independently be 2, 3, 4, 5, 6, 7, 8, 9, or 10.

In divinyl ethers of Formula (15), each r can be the same and can be 2, 3, 4, 5, 6, 7, 8, 9, or 10. In divinyl ethers of Formula (15), each r can independently be an integer from 2 to 4, from 2 to 6, or from 2 to 8.

Examples of suitable divinyl ethers include ethylene glycol divinyl ether (EG-DVE) butanediol divinyl ether (BD-DVE) hexanediol divinyl ether (HD-DVE), diethylene glycol divinyl ether (DEG-DVE), triethylene glycol divinyl ether, tetraethylene glycol divinyl ether, polytetrahydrofuryl divinyl ether, cyclohexane dimethanol divinyl ether, and combinations of any of the foregoing.

A divinyl ether can comprise a sulfur-containing divinyl ether. Examples of suitable sulfur-containing divinyl ethers are disclosed, for example, in PCT Publication No. WO 2018/085650.

In moieties of Formula (14) each A can independently be derived from a polyalkenyl polyfunctionalizing agent. A polyalkenyl polyfunctionalizing agent can have the structure of Formula (16), where z can be 3, 4, 5, or 6.

In polyalkenyl polyfunctionalizing agents of Formula (16), each $R^{70}$ can independently be selected from $C_{1-10}$ alkanediyl, $C_{1-10}$ heteroalkanediyl, substituted $C_{1-10}$ alkanediyl, or substituted $C_{1-10}$ heteroalkanediyl. The one or more substituent groups can be selected from, for example, —OH, =O, $C_{1-4}$ alkyl, and $C_{1-4}$ alkoxy. The one or more heteroatoms can be selected from, for example, O, S, and a combination thereof.

Examples of suitable polyalkenyl polyfunctionalizing agents include triallyl cyanurate (TAC), triallylisocyanurate (TAIC), 1,3,5-triallyl-1,3,5-triazinane-2,4,6-trione), 1,3-bis (2-methylallyl)-6-methylene-5-(2-oxopropyl)-1,3,5-triazinone-2,4-dione, tris(allyloxy)methane, pentaerythritol triallyl ether, 1-(allyloxy)-2,2-bis((allyloxy)methyl)butane, 2-prop-2-ethoxy-1,3,5-tris(prop-2-enyl)benzene, 1,3,5-tris (prop-2-enyl)-1,3,5-triazinane-2,4-dione, and 1,3,5-tris(2-methylallyl)-1,3,5-triazinane-2,4,6-trione, 1,2,4-trivinylcyclohexane, trimethylolpropane trivinyl ether, and combinations of any of the foregoing.

In moieties of Formula (14) the molar ratio of vinyl ether moieties derived from a divinyl ether to alkenyl moieties derived from a polyalkenyl polyfunctionalizing agent can be, for example, from 10:1 to 1,000:1, from 10:1 to 100:1, or from 20:1 to 100:1.

In moieties of Formula (14), each $R^1$ can be —$(CH_2)_2$—O—$(CH_2)_2$—O—$(CH_2)_2$—; each $R^2$ can be —$(CH_2)_2$—; and m can be an integer from 1 to 4.

In moieties of Formula (14), $R^2$ can be derived from a divinyl ether such a diethylene glycol divinyl ether, a polyalkenyl polyfunctionalizing agent such as triallyl cyanurate, or a combination thereof.

In moieties of Formula (14), each A can independently be selected from a moiety of Formula (15a) and a moiety of Formula (16a):

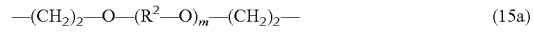

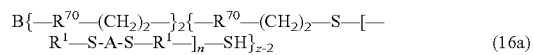

where m, $R^1$, $R^2$, $R^{70}$, A, B, m, n, and z are defined as in Formula (14), Formula (15), and Formula (16).

In moieties of Formula (14),
each $R^1$ can be —$(CH_2)_2$—O—$(CH_2)_2$—O—$(CH_2)_2$—;
each $R^2$ can be —$(CH_2)_2$—;
m can be an integer from 1 to 4; and
the polyfunctionalizing agent B(—$R^{70}$—CH=$CH_2$)$_z$ comprises triallyl cyanurate where z is 3 and each $R^{70}$ is —O—$CH_2$—CH=$CH_2$.

A thiol-terminated polythioether prepolymer can have the structure of Formula (14a):

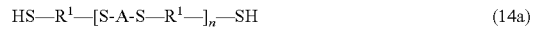

wherein,
n can be an integer from 1 to 60;
each $R^1$ can independently be selected from $C_{2-10}$ alkanediyl, $C_{6-8}$ cycloalkanediyl, $C_{6-14}$ alkanecycloalkanediyl, $C_{5-8}$ heterocycloalkanediyl, and —[$(CHR^3)_p$—X—]$_q$$(CHR^3)_r$—, wherein,
p can be an integer from 2 to 6;
q can be an integer from 1 to 5;
r can be an integer from 2 to 10;
each $R^3$ can independently be selected from hydrogen and methyl; and
each X can independently be selected from O, S, and NR, wherein R can be selected from hydrogen and methyl; and
each A can independently be selected from a moiety derived from a polyvinyl ether of Formula (15) and a moiety derived from a polyalkenyl polyfunctionalizing agent of Formula (16):

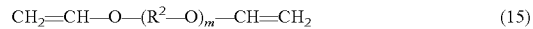

wherein,
each $R^2$ can independently be selected from $C_{1-10}$ alkanediyl, $C_{6-8}$ cycloalkanediyl, $C_{6-14}$ alkanecycloalkanediyl, and —[$(CHR^3)_p$—X—]$_q$$(CHR^3)_r$—, wherein p, q, r, $R^3$, and X are as defined as for $R^1$;
m can be an integer from 0 to 50;
B represents a core of a z-valent, polyalkenyl polyfunctionalizing agent B(—R—CH=$CH_2$)$_z$ wherein,
z can be an integer from 3 to 6; and
each $R^{70}$ can independently be selected from $C_{1-10}$ alkanediyl, $C_{1-10}$ heteroalkanediyl, substituted $C_{1-10}$ alkanediyl, and substituted $C_{1-10}$ heteroalkanediyl.

In thiol-terminated polythioether prepolymers of Formula (14a), $R^1$ can be $C_{2-10}$ alkanediyl.

In thiol-terminated polythioether prepolymers of Formula (14a), $R^1$ can be —$[(CHR^3)_p$—X-$]_q(CHR^3)_r$—.

In thiol-terminated polythioether prepolymers of Formula (14a), X can be selected from O and S, and thus —$[(CHR^3)_p$—X—$]_q(CHR^3)_r$— in Formula (14a) can be —$[(CHR^3)_p$—O-$]_q(CHR^3)_r$— or —$[(CHR^3)_p$—S-$]_q(CHR^3)_r$—. P and r can be equal, such as where p and r can be both two.

In thiol-terminated polythioether prepolymers of Formula (14a), $R^1$ can be selected from $C_{2-6}$ alkanediyl and —$[(CHR^3)_p$—X—$]_q(CHR^3)_r$—.

In thiol-terminated polythioether prepolymers of Formula (14a), $R^1$ can be —$[(CHR^3)_p$—X-$]_q(CHR^3)_r$—, and X can be O, or X can be S.

In thiol-terminated polythioether prepolymers of Formula (14a), where $R^1$ can be —$[(CHR^3)_p$—X-$]_q(CHR^3)_r$—, p can be 2, r can be 2, q can be 1, and X can be S; or p can be 2, q can be 2, r can be 2, and X can be O; or p can be 2, r can be 2, q can be 1, and X can be O.

In thiol-terminated polythioether prepolymers of Formula (14a), where $R^1$ can be —$[(CHR^3)_p$—X-$]_q(CHR^3)_r$—, each $R^3$ can be hydrogen, or at least one $R^3$ can be methyl.

In thiol-terminated polythioether prepolymers of Formula (14a), $R^1$ can be —$[(CH_2)_p$—X—$]_q(CH_2)_r$— wherein each X can independently be selected from O and S. In thiol-terminated polythioethers of Formula (5a), $R^1$ can be —$[(CH_2)_p$—X—$]_q(CH_2)_r$— each X can be O or each X can be S.

In thiol-terminated polythioether prepolymers of Formula (14a), $R^1$ can be —$[(CH_2)_p$—X—$]_q(CH_2)_r$—, where p can be 2, X can be O, q can be 2, r can be 2, $R^2$ can be ethanediyl, m can be 2, and n can be 9.

In thiol-terminated polythioether prepolymers of Formula (14a), each $R^1$ can be derived from 1,8-dimercapto-3,6-dioxaoctane (DMDO; 2,2-(ethane-1,2-diylbis(sulfanyl))bis (ethan-1-thiol)), or each $R^1$ can be derived from dimercaptodiethylsulfide (DMDS; 2,2'-thiobis(ethan-1-thiol)), and combinations thereof.

In thiol-terminated polythioether prepolymers of Formula (14a), each p can independently be selected from 2, 3, 4, 5, and 6. Each p can be the same and can be 2, 3, 4, 5, or 6.

In thiol-terminated polythioether prepolymers of Formula (14a), each q can independently be 1, 2, 3, 4, or 5. Each q can be the same and can be 1, 2, 3, 4, or 5.

In thiol-terminated polythioether prepolymers of Formula (14a), each r can independently be 2, 3, 4, 5, 6, 7, 8, 9, or 10. Each r can be the same and can be 2, 3, 4, 5, 6, 7, 8, 9, or 10.

In thiol-terminated polythioether prepolymers of Formula (14a), each r can independently be an integer from 2 to 4, from 2 to 6, or from 2 to 8.

In thiol-terminated polythioether prepolymers of Formula (14a), each A can independently be selected from a moiety of Formula (15a) and a moiety of Formula (16a):

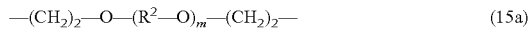

—$(CH_2)_2$—O—$(R^2$—O$)_m$—$(CH_2)_2$— (15a)

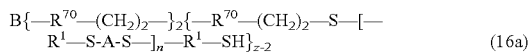

B{—$R^{70}$—$(CH_2)_2$—}$_2${—$R^{70}$—$(CH_2)_2$—S—[—$R^1$—S-A-S—$]_n$—$R^1$—SH}$_{z-2}$ (16a)

where m, $R^1$, $R^2$, $R^{70}$, A, B, m, n, and z are defined as in Formula (14), Formula (15), and Formula (16).

In thiol-terminated polythioether prepolymers of Formula (14a) the molar ratio of moieties derived from a divinyl ether to moieties derived from a polyalkenyl polyfunctionalizing agent can be, for example, of 200:1, 150:1, 100:1, 50:1, or 25:1.

A thiol-terminated polythioether prepolymer can comprise a thiol-terminated polythioether prepolymer of Formula (12a), a thiol-terminated polythioether prepolymer of Formula (12b), a thiol-terminated polythioether prepolymer of Formula (12c), or a combination of any of the foregoing:

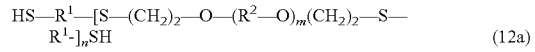

HS—$R^1$—[S—$(CH_2)_2$—O—$(R^2$—O$)_m(CH_2)_2$—S—$R^1$-$]_n$SH (12a)

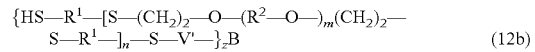

{HS—$R^1$—[S—$(CH_2)_2$—O—$(R^2$—O—$)_m(CH_2)_2$—S—$R^1$—$]_n$—S—V'—$\}_z$B (12b)

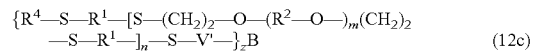

{$R^4$—S—$R^1$—[S—$(CH_2)_2$—O—$(R^2$—O—$)_m(CH_2)_2$—S—$R^1$—$]_n$—S—V'—$\}_z$B (12c)

wherein,
each $R^1$ can independently be selected from $C_{2-10}$ alkanediyl, $C_{6-8}$ cycloalkanediyl, $C_{6-14}$ alkanecycloalkanediyl, $C_{5-8}$ heterocycloalkanediyl, and —$[(CHR^3)_p$—X—$]_q(CHR^3)_r$—, wherein,
p can be an integer from 2 to 6;
q can be an integer from 1 to 5;
r can be an integer from 2 to 10;
each $R^3$ can independently be selected from hydrogen and methyl; and
each X can independently be selected from O, S, and NR, wherein R can be selected from hydrogen and methyl;
each $R^2$ can independently be selected from $C_{1-10}$ alkanediyl, $C_{6-8}$ cycloalkanediyl, $C_{6-14}$ alkanecycloalkanediyl, and —$[(CHR^3)_p$—X—$]_q(CHR^3)_r$—, wherein p, q, r, $R^3$, and X are as defined as for $R^1$;
m can be an integer from 0 to 50;
n can be an integer from 1 to 60;
B represents a core of a z-valent, polyfunctionalizing agent B(—V)$_z$ wherein,
z can be an integer from 3 to 6; and
each V can be a moiety comprising a terminal group reactive with a thiol;
each —V'— can be derived from the reaction of —V with a thiol; and
each $R^4$ can independently be selected from hydrogen and a moiety of Formula (12), which is bound to a prepolymer of Formula (12c).

In prepolymers of Formula (12a)-(12c), $R^1$ can be —$[(CH_2)_p$—X—$]_q(CH_2)_r$—, where p can be 2, X can be O, q can be 2, r can be 2, $R^2$ can be ethanediyl, m can be 2, and n can be 9.

In prepolymers of Formula (12a)-(12c), $R^1$ can be selected from $C_{2-6}$ alkanediyl and —$[(CHR^3)_p$—X—$]_q(CHR^3)_r$—.

In prepolymers of Formula (12a)-(12c), $R^1$ can be —$[(CHR^3)_p$—X—$]_q(CHR^3)_r$—, X can be O or X can be S.

In prepolymers of Formula (12a)-(12c), where $R^1$ can be —$[(CHR^3)_p$—X—$]_q(CHR^3)_r$—, p can be 2, r can be 2, q can be 1, and X can be S; or wherein p can be 2, q can be 2, r can be 2, and X can be O; or p can be 2, r can be 2, q can be 1, and X can be O.

In prepolymers of Formula (12a)-(12c), $R^1$ can be —$[(CHR^3)_p$—X—$]_q(CHR^3)_r$—, and each $R^3$ can be hydrogen or at least one $R^3$ can be methyl.

In prepolymers of Formula (12a)-(12c), each $R^1$ can be the same, or at least one $R^1$ can be different.

In prepolymers of Formula (12a)-(12c), each m can be independently an integer from 1 to 3. Each m can be the same and can be 1, 2, or 3.

In prepolymers of Formula (12a)-(12c), n can be an integer from 1 to 30, an integer from 1 to 20, an integer from 1 to 10, or an integer from 1 to 5. The variable n may be any integer from 1 to 60.

In prepolymers of Formula (12a)-(12c), each p can independently be 2, 3, 4, 5, and 6. Each p can be the same and can be 2, 3, 4, 5, or 6.

In prepolymers of Formula (12a)-(12c), each q can independently be 1, 2, 3, 4, or 5. Each q can be the same and can be 1, 2, 3, 4, or 5.

In prepolymers of Formula (12a)-(12c), each r can independently be 2, 3, 4, 5, 6, 7, 8, 9, or 10.

In prepolymers of Formula (12a)-(12c), each r can independently be an integer from 2 to 4, from 2 to 6, or from 2 to 8.

Various methods can be used to prepare thiol-terminated polythioether prepolymers of Formula (12a)-(12c). Examples of suitable thiol-terminated polythioether prepolymers, and methods for their production, are described in U.S. Pat. Nos. 6,172,179, 6,232,401, and 8,932,685. Such thiol-terminated polythioether prepolymers may be difunctional, that is, linear prepolymers having two terminal thiol groups, or can be polyfunctional, that is, branched prepolymers having three or more terminal thiol groups.

Thiol-terminated polythioether prepolymers are liquid at room temperature and can have a glass transition temperature $T_g$, for example, less than −20° C., less than −30° C., or less than −40° C., where the glass transition temperature $T_g$ is determined by Dynamic Mass Analysis (DMA) using a TA Instruments Q800 apparatus with a frequency of 1 Hz, an amplitude of 20 microns, and a temperature ramp of −80° C. to 25° C., with the $T_g$ identified as the peak of the tan δ curve.

Thiol-terminated polythioether prepolymers can exhibit a viscosity, for example, within a range from 20 poise to 500 poise (2 Pa-sec to 50 Pa-sec), from 20 poise to 200 poise (2 Pa-sec to 20 Pa-sec) or from 40 poise to 120 poise (4 Pa-sec to 12 Pa-sec), measured using a Brookfield CAP 2000 viscometer, with a No. 6 spindle, at speed of 300 rpm, and a temperature of 25° C.

Thiol-terminated polythioether prepolymers can be characterized by a number average molecular weight and/or a molecular weight distribution. Thiol-terminated polythioether prepolymers can exhibit a number average molecular weight, for example, from 500 Da to 20,000 Da, from 2,000 Da to 5,000 Da, or from 1,000 Da to 4,000 Da. Thiol-terminated polythioether prepolymers can exhibit a polydispersity (Mw/Mn; weight average molecular weight/number average molecular weight), for example, from 1 to 20, or from 1 to 5. The backbone of a thiol-terminated polythioether prepolymer can be modified to improve the properties such as adhesion, tensile strength, elongation, UV resistance, hardness, and/or flexibility of sealants and coatings prepared using polythioether prepolymers. For example, adhesion-promoting groups, antioxidants, metal ligands, and/or urethane linkages can be incorporated into the backbone of a polythioether prepolymer to improve one or more performance attributes. Examples of backbone-modified polythioether prepolymers are disclosed, for example, in U.S. Pat. No. 8,138,273 (urethane containing), U.S. Pat. No. 9,540,540 (sulfone-containing), U.S. Pat. No. 8,952,124 (bis(sulfonyl)alkanol-containing), U.S. Pat. No. 9,382,642 (metal-ligand containing), U.S. Application Publication No. 2017/0114208 (antioxidant-containing), PCT International Publication No. WO 2018/085650 (sulfur-containing divinyl ether), and PCT International Publication No. WO 2018/031532 (urethane-containing).

Thiol-terminated polythioether prepolymers include prepolymers described in U.S. Application Publication Nos. 2017/0369737 and 2016/0090507.

A thiol-terminated urethane-containing prepolymer can comprise a thiol-terminated urethane-containing prepolymer of Formula (17a), a thiol-terminated urethane-containing prepolymer of Formula (17b), or a combination thereof:

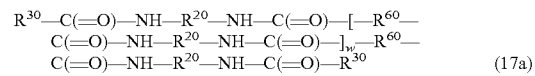

(17a)

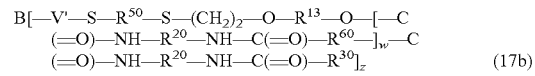

(17b)

wherein,
w is an integer from 1 to 100;
each $R^{13}$ independently be selected from $C_{2-10}$ alkanediyl;
each $R^{20}$ independently comprises a core of a diisocyanate;
each $R^{30}$ independently is a moiety comprising at least one terminal thiol group;
each $R^{50}$ independently comprises a core of a sulfur-containing prepolymer;
each $R^{60}$ independently comprises a moiety having the structure of Formula (18):

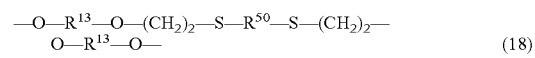

(18)

B represents a core of a z-valent, polyfunctionalizing agent B(—V)$_z$ wherein,
z is an integer from 3 to 6; and
each V is a moiety comprising a terminal group reactive with a thiol group; and
each —V'— is derived from the reaction of —V with a thiol.

A moiety —C(=O)—NH—R$^{20}$—NH—C(=O)— can be derived from a diisocyanate of Formula (19):

(19)

In moieties of Formula (19), $R^{20}$ can be a core of an aliphatic diisocyanate such as 4,4'-methylene dicyclohexyl diisocyanate and has the structure of Formula (20):

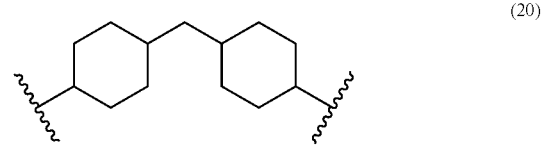 [SMILES: *C1CCC(CC2CCC(*)CC2)CC1]

(20)

An isocyanate-terminated urethane-containing prepolymer can comprise an isocyanate-terminated urethane-containing prepolymer of Formula (21a), an isocyanate-terminated urethane-containing prepolymer of Formula (21b), or a combination thereof:

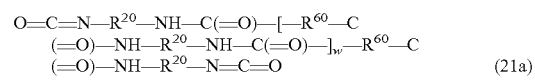

(21a)

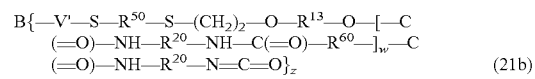

(21b)

wherein,
w is an integer from 1 to 100;
each $R^{13}$ independently can be selected from $C_{2-10}$ alkanediyl;
each $R^{20}$ independently comprises a core of a diisocyanate;

each $R^{50}$ independently comprises a core of a sulfur-containing prepolymer;

each $R^{60}$ independently comprises a moiety having the structure of Formula (18):

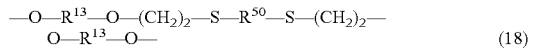

$$—O—R^{13}—O—(CH_2)_2—S—R^{50}—S—(CH_2)_2—O—R^{13}—O— \qquad (18)$$

B represents a core of a z-valent, polyfunctionalizing agent $B(—V)_z$ wherein, z is an integer from 3 to 6; and each V is a moiety comprising a terminal group reactive with a thiol group; and each —V'— is derived from the reaction of —V with a thiol.

In prepolymers of Formula (21a) and Formula (21b), each $R^{50}$ can be derived from a polythioether. For example, each $R^{50}$ can haves the structure of Formula (22):

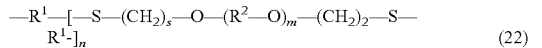

$$—R^1—[—S—(CH_2)_s—O—(R^2—O)_m—(CH_2)_2—S—R^1—]_n \qquad (22)$$

wherein, each $R^1$ independently is selected from $C_{2-10}$ alkanediyl, $C_{6-8}$ cycloalkanediyl, $C_{6-14}$ alkanecycloalkanediyl, $C_{5-8}$ heterocycloalkanediyl, and $-[(—CHR^3—)_p—X—]_q(—CHR^3—)_r-$, wherein:

p is an integer from 2 to 6;

q is an integer from 1 to 5;

r is an integer from 2 to 10;

each $R^3$ is independently selected from hydrogen and methyl; and each X is independently selected from —O—, —S—, and —NR—, wherein R is selected from hydrogen and methyl;

each $R^2$ is independently selected from $C_{1-10}$ alkanediyl, $C_{6-8}$ cycloalkanediyl, $C_{6-14}$ alkanecycloalkanediyl, and $-[(—CHR^3—)_p—X—]_q-(—CHR^3—)_r-$, wherein p, q, r, $R^3$, and X are as defined as for $R^1$;

m is an integer from 0 to 50;

n is an integer from 1 to 60; and s is an integer from 2 to 6.

In prepolymers of Formula (21a) and Formula (21b), w can bean integer from 1 to 50, from 2 to 50, or from 1 to 20 or from 2 to 20.

An isocyanate-terminated urethane-containing adduct can comprise the reaction product of reactants comprising a hydroxyl-terminated sulfur-containing adduct and a diisocyanate.

Thiol-terminated urethane-containing prepolymers can comprise a backbone of Formula (23):

$$—S—R^1—[S-A-S—R^1-]_sS- \qquad (23)$$

wherein, s is an integer from 1 to 60;

each $R^1$ is selected from $C_{2-10}$ alkanediyl, $C_{6-8}$ cycloalkanediyl, $C_{6-10}$ alkanecycloalkanediyl, and $—[(CHR—)_p—X—]_q—(CHR)_r—$, wherein each R is independently selected from hydrogen and methyl, wherein, each X is independently selected from —O— and —S— each p is independently an integer from 2 to 6;

q is an integer from 1 to 5; and r is an integer from 2 to 10;

each A independently is selected from a moiety of Formula (24) and a moiety of Formula (25):

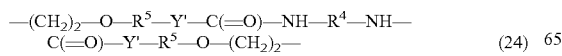

$$—(CH_2)_2—O—R^5—Y'—C(=O)—NH—R^4—NH—C(=O)—Y'—R^5—O—(CH_2)_2— \qquad (24)$$

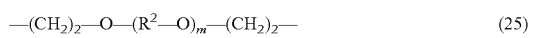

$$—(CH_2)_2—O—(R^2—O)_m—(CH_2)_2— \qquad (25)$$

wherein, m is an integer from 0 to 50;

each Y' is independently selected from —NH— and —O—; and each $R^2$ is selected from $C_{2-6}$ n-alkanediyl, $C_{3-6}$ branched alkanediyl, $C_{6-8}$ cycloalkanediyl, $C_{6-10}$ alkanecycloalkanediyl, and $—[(CH_2-)_pO-]_q(CH_2-)_r$, wherein, each p is independently an integer ranging from 2 to 6;

q is an integer from 1 to 5; and r is an integer from 2 to 10;

$R^4$ comprises a core of a diisocyanate;

each $R^5$ is independently selected from $C_{1-10}$ alkanediyl; and at least one A comprises a moiety of Formula (24).

Thiol-terminated urethane-containing prepolymers can comprise reaction products of reactants comprising:

(a) a polythiol comprising a dithiol of Formula (3):

$$HS—R^1—SH \qquad (3)$$

wherein $R^1$ is selected from $C_{2-10}$ alkanediyl, $C_{6-8}$ cycloalkanediyl, $C_{6-10}$ alkanecycloalkanediyl, $C_{5-8}$ heterocycloalkanediyl, and $—[(CHR—)_pX—]_q—(CHR)_r—$, wherein:

each p is independently an integer from 2 to 6;

q is an integer from 1 to 5;

r is an integer from 2 to 10;

each R is independently selected from hydrogen and methyl; and each X is independently selected from —O—, —S—, and —NR—, wherein $R^5$ is selected from hydrogen and methyl;

(b) a urethane/urea-containing bis(alkenyl) ether of Formula (26):

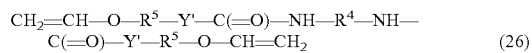

$$CH_2=CH—O—R^5—Y'—C(=O)—NH—R^4—NH—C(=O)—Y'—R^5—O—CH=CH_2 \qquad (26)$$

wherein, each Y' is independently selected from —NH— and —O—;

$R^4$ comprises a core of a diisocyanate; and each $R^5$ independently is selected from $C_{1-10}$ alkanediyl; and (c) a divinyl ether of Formula (4):

$$CH_2=CH—O—(R^2—O—)_m—CH=CH_2 \qquad (4)$$

wherein, m is 0 to 50; and each $R^2$ is independently selected from $C_{2-6}$ n-alkanediyl, $C_{3-6}$ branched alkanediyl, $C_{6-8}$ cycloalkanediyl, $C_{6-10}$ alkanecycloalkanediyl, and $—[(CH_2—)_p—O—]_q(—CH_2—)_r-$, wherein, each p is independently an integer ranging from 2 to 6;

q is an integer from 1 to 5; and r is an integer from 2 to 10.

A dithiol and a urethane/urea-containing bis(alkenyl) ether can include any of those disclosed herein.

A polythiol can further comprise a polythiol of Formula (1d):

$$B(—V)_z \qquad (1d)$$

wherein,

B represents a core of a z-valent polyfunctionalizing agent $B(—V)_z$, z is an integer from 3 to 6; and each —V is a moiety comprising terminal thiol group.

A thiol-terminated sulfur-containing prepolymer can comprise a thiol-terminated polysulfide prepolymer or a combination of thiol-terminated polysulfide prepolymers.

A polysulfide prepolymer refers to a prepolymer that contains one or more polysulfide linkages, i.e., $-S_x-$ linkages, where x is from 2 to 4, in the prepolymer backbone. A polysulfide prepolymer can have two or more sulfur-sulfur linkages. Suitable thiol-terminated polysulfide prepolymers are commercially available, for example, from AkzoNobel and Toray Industries, Inc. under the tradenames Thioplast® and from Thiokol-LP®, respectively.

Examples of suitable polysulfide prepolymers are disclosed, for example, in U.S. Pat. Nos. 4,623,711; 6,172,179; 6,509,418; 7,009,032; and 7,879,955.

Examples of suitable thiol-terminated polysulfide prepolymers include are liquid polysulfide prepolymers that are blends of di- and tri-functional molecules where the difunctional polysulfide prepolymers have the structure of Formula (27a) and E in the thiol-terminated prepolymer of Formula (13) can be a moiety of Formula (27):

(27)

(27a)

and the trifunctional polysulfide polymers can have the structure of Formula (28a) and E in the thiol-terminated prepolymer of Formula (13) can be a moiety of Formula (28):

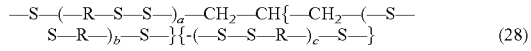

(28)

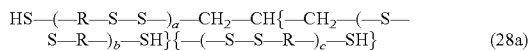

(28a)

where each R is $-(CH_2)_2O-CH_2-O-(CH_2)_2-$, and n=a+b+c, where the value for n may be from 7 to 38 depending on the amount of the trifunctional cross-linking agent (1,2,3,-trichloropropane; TCP) used during synthesis of the polysulfide prepolymer. Such thiol-terminated polysulfide prepolymers include Thioplast™ G polysulfides/resins such as Thioplast™ G1, Thioplast™ G4, Thioplast™ Gb, Thioplast™ G12, Thioplast™ G21, Thioplast™ G22, Thioplast™ G44, Thioplast™ G122, and Thioplast™ G131, which are commercially available from AkzoNobel. Thioplast™ G polysulfides can have a number average molecular weight from 1,000 Da to 6,500 Da, a SH content from 1% to greater than 5.5%, and a cross-linking density from 0% to 2.0%.

Examples of suitable thiol-terminated polysulfide prepolymers also include Thiokol™ LP polysulfides available from Toray Industries, Inc. such as Thiokol™ LP2, Thiokol™ LP3, Thiokol™ LP12, Thiokol™ LP23, Thiokol™ LP33, and Thiokol™ LP55. Thiokol™ LP polysulfides have a number average molecular weight from 1,000 Da to 7,500 Da, a —SH content from 0.8% to 7.7%, and a cross-linking density from 0% to 2%. Thiokol™ LP polysulfide prepolymers have the general structure of Formula (29a) and E in the thiol-terminated prepolymer of Formula (13) can be a moiety of Formula (29):

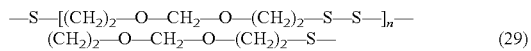

(29)

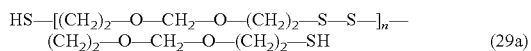

(29a)

where n can be such that the number average molecular weight from 1,000 Da to 7,500 Da, such as, for example an integer from 8 to 80.

A thiol-terminated sulfur-containing prepolymer can comprise a Thiokol-LP® polysulfide, a Thioplast® G polysulfide, or a combination thereof.

A thiol-terminated polysulfide prepolymer can comprise a thiol-terminated polysulfide prepolymer of Formula (30a) and E in the thiol-terminated prepolymer of Formula (13) can be a moiety of Formula (30):

(30)

(30a)

where,
t can be an integer from 1 to 60;
q can be an integer from 1 to 8;
p can be an integer from 1 to 10;
r can be an integer from 1 to 10;
y has an average value within a range from 1.0 to 1.5; and
each R can independently be selected from branched alkanediyl, branched arenediyl, and a moiety having the structure $-(CH_2)_p-O-(CH_2)_q-O-(CH_2)_r-$.

In thiol-terminated polysulfide prepolymers of Formula (30a) and moieties of Formula (30a), t can be, for example, an integer from 2 to 60, from 1 to 40, or from 1 to 20.

In thiol-terminated polysulfide prepolymers of Formula (30a) and moieties of Formula (30a), q can be, for example, an integer from 1 to 6, or an integer from 1 to 4. For example, q can be 1, 2, 3, 4, 5 or 6.

In thiol-terminated polysulfide prepolymers of Formula (30a) and moieties of Formula (30a), each p can be, for example, an integer from 1 to 6 or from 1 to 4. For example, each p can be 1, 2, 3, 4, 5, 6, 7, 8, 9, or 10.

In thiol-terminated polysulfide prepolymers of Formula (30a) and moieties of Formula (30a), each r can be, for example, an integer from 1 to 6 or from 1 to 4. For example, each p can be 1, 2, 3, 4, 5, 6, 7, 8, 9, or 10.

In thiol-terminated polysulfide prepolymers of Formula (30a) and moieties of Formula (30a), y can have a value of 1.

In thiol-terminated polysulfide prepolymers of Formula (30a) and moieties of Formula (30a), y can have an average value, for example, of 1, such as from 1.05 to 2, or from 1.1 to 1.8.

In thiol-terminated polysulfide prepolymers of Formula (30a) and moieties of Formula (30a), R can be $-(CH_2)_p-O-(CH_2)_q-O-(CH_2)_r$.

In thiol-terminated polysulfide prepolymers of Formula (30a) and moieties of Formula (30a), R can be $-(CH_2)_p-O-(CH_2)_q-O-(CH_2)_r-$, each q can be 1, 2, 3, or 4, and each p and r can be 1 or 2.

In thiol-terminated polysulfide prepolymers of Formula (30a) and moieties of Formula (30a), 0% to 20% of the R groups can comprise branched alkanediyl or branched arenediyl, and 80% to 100% of the R groups can be $-(CH_2)_p-O-(CH_2)_q-O-(CH_2)_r-$.

In thiol-terminated polysulfide prepolymers of Formula (30a) and moieties of Formula (30a), a branched alkanediyl or a branched arenediyl can be $-R^1(-A)_n-$ where $R^1$ is a hydrocarbon group, n is 1 or 2, and A is a branching point. A branched alkanediyl can have the structure $-CH_2-CH(-CH_2-)-$.

Thiol-terminated polysulfide prepolymers of Formula (30a) and moieties of Formula (30a) can be prepared by reacting an α,ω-dihalo organic compounds, a metal hydrosulfide, a metal hydroxide, and an optional polyfunctionalizing agent. Examples of suitable α,ω-dihalo organic compounds include bis(2-chloroethyl)formal. Examples of suitable metal hydrosulfides and metal hydroxides include sodium hydrosulfide and sodium hydroxide. Examples of suitable polyfunctionalizing agents include 1,2,3-trichloropropane, 1,1,1-tris(chloromethyl)propane, 1,1,1-tris(chloromethyl)ethane, and 1,3,5-tris(chloromethyl)benzene.

Examples of thiol-terminated polysulfide prepolymers of Formula (30) and (30a) are disclosed, for example, in U.S. Application Publication No. 2016/0152775, in U.S. Pat. No. 9,079,833, and in U.S. Pat. No. 9,663,619.

A thiol-terminated polysulfide prepolymer can comprise a thiol-terminated polysulfide prepolymer of Formula (31a) and E in the thiol-terminated prepolymer of Formula (13) can be a moiety of Formula (31):

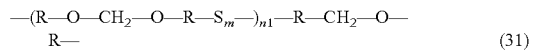
(31)

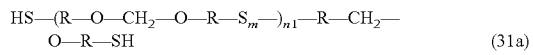
(31a)

where R is $C_{2-4}$ alkanediyl, m is an integer from 1 to 8, and n is an integer from 2 to 370.

In thiol-terminated polysulfide prepolymers of Formula (31) and (31a), m can have an average value, for example, greater than 1, such as from 1.05 to 2, or from 1.1 to 1.8.

In thiol-terminated polysulfide prepolymers of Formula (31) and (31a), m can be, for example, an integer from 1 to 6, and integer from 1 to 4, or the integer 1, 2, 3, 4, 5, 6, 7, or 8.

In thiol-terminated polysulfide prepolymers of Formula (31) and (31a), n can be, for example, an integer from 2 to 200 or an integer from 2 to 100.

In thiol-terminated polysulfide prepolymers of Formula (31) and (31a), each R can independently be selected from ethanediyl, 1,3-propanediyl, 1,1-propanediyl, 1,2-propanediyl, 1,4-butanediyl, 1,1-butanediyl, 1,2-butanediyl, and 1,3-butanediyl.

Examples of thiol-terminated polysulfide prepolymers of Formula (31) and (31a) are disclosed, for example, in JP 62-53354.

Thiol-terminated polysulfide prepolymers can be liquid at room temperature. Thiol-terminated monosulfide prepolymers can have a viscosity of no more than 1,500 poise (150 Pa-sec), such as 40 poise to 500 poise (4 Pa-sec to 50 Pa-sec), at a temperature of about 25° C. and a pressure of about 760 mm Hg (101 kPa) determined according to ASTM D-2849 § 79-90 using a Brookfield CAP 2000 viscometer with a No. 6 spindle, at speed of 300 rpm, and a temperature of 23° C.

Thiol-terminated polysulfide prepolymers can have a number average molecular weight within a range from 300 Da to 10,000 Da, such as within a range 1,000 Da to 8,000 Da. Thiol-terminated polysulfide prepolymers can have a glass transition temperature $T_g$ less than −40° C., less than −55° C., or less than −60° C. The glass transition temperature $T_g$ is determined by Dynamic Mass Analysis (DMA) using a TA Instruments Q800 apparatus with a frequency of 1 Hz, an amplitude of 20 microns, and a temperature ramp of −80° C. to 25° C., with the $T_g$ identified as the peak of the tan δ curve.

A thiol-terminated sulfur-containing prepolymer can comprise a thiol-terminated sulfur-containing polyformal prepolymer or a combination of thiol-terminated sulfur-containing polyformal prepolymers. Sulfur-containing polyformal prepolymers useful in sealant applications are disclosed, for example, in U.S. Pat. No. 8,729,216 and in U.S. Pat. No. 8,541,513.

A thiol-terminated sulfur-containing prepolymer can comprise a thiol-terminated sulfur-containing polyformal prepolymer comprising a moiety of Formula (32):

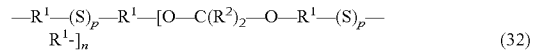
(32)

where n can be an integer from 1 to 50; each p can independently be selected from 1 and 2; each $R^1$ can be $C_{2-6}$ alkanediyl; and each $R^2$ can independently be selected from hydrogen, $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, and substituted $C_{6-12}$ aryl.

A thiol-terminated sulfur-containing polyformal prepolymer can have the structure of Formula (32a):

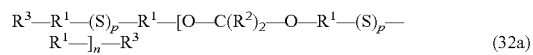
(32a)

where n can be an integer from 1 to 50; each p can independently be selected from 1 and 2; each $R^1$ can be $C_{2-6}$ alkanediyl; each $R^2$ can independently be selected from hydrogen, $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, and substituted $C_{6-12}$ aryl; and each $R^3$ comprises a thiol-terminated group.

In sulfur-containing polyformal moieties of Formula (32) and prepolymers of Formula (32a), each $R^1$ can independently be selected from $C_{2-6}$ alkanediyl, $C_{2-4}$ alkanediyl, $C_{2-3}$ alkanediyl, and ethane-1,2-diyl. In sulfur-containing polyformal moieties of Formula (32) and prepolymers of Formula (32a), each $R^1$ can be ethane-1,2-diyl.

In sulfur-containing polyformal moieties of Formula (32) and prepolymers of Formula (32a), each $R^2$ can independently be selected from hydrogen, $C_{1-6}$ alkyl, $C_{1-4}$ alkyl, $C_{1-3}$ alkyl, and $C_{1-2}$ alkyl. In sulfur-containing polyformal moieties of Formula (32) and prepolymers of Formula (32a), each $R^2$ can be selected from hydrogen, methyl, and ethyl.

In sulfur-containing polyformal moieties of Formula (32) and prepolymers of Formula (32a), each $R^1$ is the same and can be selected from $C_{2-3}$ alkanediyl such as ethane-1,2-diyl and propane-1,3-diyl; and each $R^2$ is the same and can be selected from hydrogen and $C_{1-3}$ alkyl such as methyl, ethyl, or propyl. In sulfur-containing polyformal moieties of Formula (32) and prepolymers of Formula (32a), each $R^1$ can be ethane-1,2-diyl.

In sulfur-containing polyformal moieties of Formula (32) and prepolymers of Formula (32a), each $R^2$ can be hydrogen. In sulfur-containing polyformal moieties of Formula (32) and prepolymers Formula (32a), each $R^1$ can be ethane-1,2-diyl and each $R^2$ can be hydrogen.

In sulfur-containing polyformal moieties of Formula (32) and prepolymers of Formula (32a), n can be an integer selected from 1 to 50, an integer from 2 to 40, an integer from 4 to 30, or n can be an integer from 7 to 30.

In sulfur-containing polyformal moieties of Formula (32) and prepolymers of Formula (32a), each p is the same and can be 1, and each p is the same and can be 2.

In sulfur-containing polyformal moieties of Formula (32) and prepolymers of Formula (32a) can have a number average molecular weight from 200 Da to 6,000 Da, from 500 Da to 5,000 Da, from 1,000 Da to 5,000 Da, from 1,500 Da to 4000 Da, or from 2,000 Da to 3,600 Da.

In sulfur-containing polyformal prepolymers of Formula (32a), each $R^3$ can be a thiol-terminated group and can be a group of Formula (a), Formula (b), Formula (c), Formula (d), Formula (e), or Formula (f):

$$HS-R^7-R^6-O- \quad (a)$$

$$HS-R^7-O- \quad (b)$$

$$HS-R^7-NH-C(=O)-O- \quad (c)$$

$$HS-R^7-C(=O)-O-R^9-NH-C(=O)-O- \quad (d)$$

$$HS-R^7-C(=O)-NH-R^9-NH-C(=O)-O- \quad (e)$$

$$HS-R^7-C(=O)-O- \quad (f)$$

where each $R^6$ comprises a moiety derived from a diisocyanate or a moiety derived from an ethylenically unsaturated monoisocyanate; each $R^7$ can be selected from $C_{2-14}$ alkanediyl and $C_{2-14}$ heteroalkanediyl; and each $R^9$ can be selected from $C_{2-6}$ alkanediyl, $C_{2-6}$ heteroalkanediyl, $C_{6-12}$ arenediyl, substituted $C_{6-12}$ arenediyl, $C_{6-12}$ heteroarenediyl, substituted $C_{6-12}$ heteroarenediyl, $C_{3-12}$ cycloalkanediyl, substituted $C_{3-12}$ cycloalkanediyl, $C_{3-12}$ heterocycloalkanediyl, substituted $C_{3-12}$ heterocycloalkanediyl, $C_{7-18}$ alkanearenediyl, substituted $C_{7-18}$ heteroalkanearenediyl, $C_{4-18}$ alkanecycloalkanediyl, and substituted $C_{4-18}$ alkanecycloalkanediyl.

Sulfur-containing polyformal prepolymers can have the structure of Formula (32b):

$$\{R^3-R^1-(S)_p-R^1-[O-C(R^2)_2-O-R^1-(S)_p-R^1-]_n-O-C(R^2)_2-O-\}_m Z \quad (32b)$$

where each n can be an integer selected from 1 to 50; m can be an integer selected from 3 to 6; p can independently be selected from 1 and 2; each $R^1$ can independently be $C_{2-6}$ alkanediyl; each $R^2$ can independently be selected from hydrogen, $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, and substituted $C_{6-12}$ aryl; each $R^3$ comprises a thiol-terminated group; and Z can be derived from the core of an m-valent parent polyol $Z(OH)_m$.

In sulfur-containing polyformal prepolymers of Formula (32b), each $R^1$ can independently be selected from $C_{2-6}$ alkanediyl, $C_{2-4}$ alkanediyl, $C_{2-3}$ alkanediyl, and ethane-1,2-diyl. In sulfur-containing polyformal prepolymers of Formula (24b), each $R^1$ can be ethane-1,2-diyl.

In sulfur-containing polyformal prepolymers of Formula (32b), each $R^2$ can independently be selected from hydrogen, $C_{1-6}$ alkyl, $C_{1-4}$ alkyl, $C_{1-3}$ alkyl, and $C_{1-2}$ alkyl. In sulfur-containing polyformal prepolymers of Formula (24b), each $R^2$ can be selected from hydrogen, methyl, and ethyl.

In sulfur-containing polyformal prepolymers of Formula (32b), each $R^1$ can be the same and can be selected from $C_{2-3}$ alkanediyl such as ethane-1,2-diyl or propane-1,3-diyl; and each $R^2$ can be the same and can be selected from hydrogen and $C_{1-3}$ alkyl such as methyl, ethyl, or propyl. In sulfur-containing polyformal prepolymers of Formula (32b), each $R^1$ can be ethane-1,2-diyl. In sulfur-containing polyformal prepolymers of Formula (32b), each $R^2$ can be hydrogen. In sulfur-containing polyformal prepolymers of Formula (32b), each $R^1$ can be ethane-1,2-diyl and each $R^2$ can be hydrogen.

In sulfur-containing polyformal prepolymers of Formula (32b), m can be 3, m can be 4, m can be 5, or m can be 6.

In sulfur-containing polyformal prepolymers of Formula (32b) where m is 3, the parent polyol $Z(OH)_m$ is a triol of Formula (33):

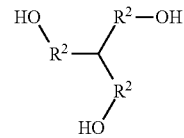
(33)

where each $R^2$ can independently be $C_{1-6}$alkanediyl, or a triol of Formula (34):

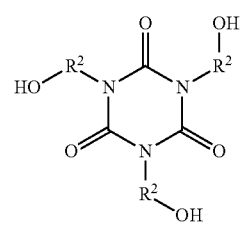
(34)

where each $R^2$ can independently be $C_{1-6}$ alkanediyl. Accordingly, in these embodiments Z can have the structure of Formula (33a) or Formula (34b):

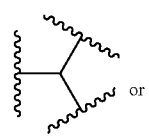
(33a)

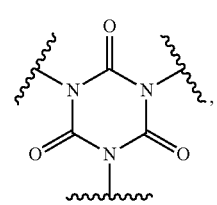
(34b)

respectively, where each $R^2$ can independently be $C_{1-6}$ alkanediyl.

In sulfur-containing polyformal prepolymers of Formula (32b), each n can be an integer selected from 1 to 50, an integer selected from 2 to 40, an integer selected from 4 to 30, or an integer selected from 7 to 30.

In sulfur-containing polyformal prepolymers of Formula (32b) has a number average molecular weight from 200 Da to 6,000 Da, from 500 Da to 5,000 Da, from 1,000 Da to 5,000 Da, from 1,500 Da to 4000 Da, or from 2,000 Da to 3,600 Da.

In sulfur-containing polyformal prepolymers of Formula (32b), $R^3$ can be bonded to a polyfunctionalizing agent $B(V)_z$ through a moiety of Formula (32).

In sulfur-containing polyformal prepolymers of Formula (32b), each $R^3$ can be the same.

A thiol-terminated sulfur-containing prepolymer can comprise a thiol-terminated monosulfide prepolymer or a combination of thiol-terminated monosulfide prepolymers.

A thiol-terminated monosulfide prepolymer can comprise a thiol-terminated monosulfide prepolymer comprising a moiety of Formula (35):

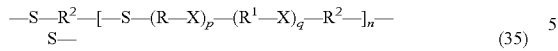

wherein, each R can independently be selected from $C_{2-10}$ alkanediyl, such as $C_{2-6}$ alkanediyl; $C_{2-10}$ branched alkanediyl, such as $C_{3-6}$ branched alkanediyl or a $C_{3-6}$ branched alkanediyl having one or more pendant groups which can be, for example, alkyl groups, such as methyl or ethyl groups; $C_{6-8}$ cycloalkanediyl; $C_{6-14}$ alkylcycloalkyanediyl, such as $C_{6-10}$ alkylcycloalkanediyl; and $C_{8-10}$ alkylarenediyl;

each $R^1$ can independently be selected from $C_{1-10}$ n-alkanediyl, such as $C_{1-6}$ n-alkanediyl, $C_{2-10}$ branched alkanediyl, such as $C_{3-6}$ branched alkanediyl having one or more pendant groups which can be, for example, alkyl groups, such as methyl or ethyl groups; $C_{6-8}$ cycloalkanediyl; $C_{6-14}$ alkylcycloalkanediyl, such as $C_{6-10}$ alkylcycloalkanediyl; and $C_{8-10}$ alkylarenediyl;

each $R^2$ can independently be selected from $C_{1-10}$ n-alkanediyl, such as $C_{1-6}$ n-alkanediyl, $C_{2-10}$ branched alkanediyl, such as $C_{3-6}$ branched alkanediyl having one or more pendant groups which can be, for example, alkyl groups, such as methyl or ethyl groups; $C_{6-8}$ cycloalkanediyl group; $C_{6-14}$ alkylcycloalkanediyl, such as a $C_{6-10}$ alkylcycloalkanediyl; and $C_{8-10}$ alkylarenediyl;

each X can independently be selected from O or S;

p can be an integer from 1 to 5;

q can be an integer from 0 to 5; and n can be an integer from 1 to 60, such as from 2 to 60, from 3 to 60, or from 25 to 35.

In moieties of Formula (35), each X can independently be selected from S, O, and $NR^3$, where $R^3$ comprises $C_{1-4}$ alkyl; p can be an integer from 1 to 5; q can be an integer from 0 to 5; n can be an integer from 1 to 60; each R can independently be selected from $C_{2-10}$ alkanediyl, $C_{6-8}$ cycloalkanediyl, $C_{1-4}$ alkylcycloalkanediyl, and $C_{8-10}$ alkylarenediyl; each $R^1$ can independently be selected from $C_{1-10}$ alkanediyl, $C_{6-8}$ cycloalkanediyl, $C_{1-4}$ alkylcycloalkanediyl, and $C_{8-10}$ alkylarenediyl; and each $R^2$ can independently be selected from $C_{2-10}$ alkanediyl, $C_{6-8}$ cycloalkanediyl, $C_{1-4}$ alkylcycloalkanediyl, and $C_{8-10}$ alkylarenediyl.

A thiol-terminated monosulfide prepolymer can comprise a thiol-terminated monosulfide prepolymer of Formula (35a), a thiol-terminated monosulfide prepolymer of Formula (35b), a thiol-terminated monosulfide prepolymer of Formula (35c), or a combination of any of the foregoing:

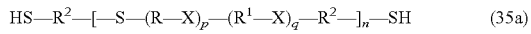

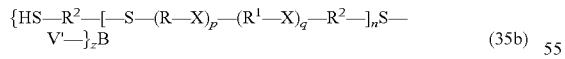

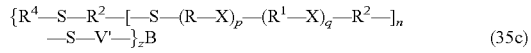

wherein, each R can independently be selected from $C_{2-10}$ alkanediyl, such as $C_{2-6}$ alkanediyl; $C_{2-10}$ branched alkanediyl, such as $C_{3-6}$ branched alkanediyl or a $C_{3-6}$ branched alkanediyl having one or more pendant groups which can be, for example, alkyl groups, such as methyl or ethyl groups; $C_{6-8}$ cycloalkanediyl; $C_{6-14}$ alkylcycloalkyanediyl, such as $C_{6-10}$ alkylcycloalkanediyl; and $C_{8-10}$ alkylarenediyl;

each $R^1$ can independently be selected from $C_{1-10}$ n-alkanediyl, such as $C_{1-6}$ n-alkanediyl, $C_{2-10}$ branched alkanediyl, such as $C_{3-6}$ branched alkanediyl having one or more pendant groups which can be, for example, alkyl groups, such as methyl or ethyl groups; $C_{6-8}$ cycloalkanediyl; $C_{6-14}$ alkylcycloalkanediyl, such as $C_{6-10}$ alkylcycloalkanediyl; and $C_{8-10}$ alkylarenediyl;

each $R^2$ can independently be selected from $C_{1-10}$ n-alkanediyl, such as $C_{1-6}$ n-alkanediyl, $C_{2-10}$ branched alkanediyl, such as $C_{3-6}$ branched alkanediyl having one or more pendant groups which can be, for example, alkyl groups, such as methyl or ethyl groups; $C_{6-8}$ cycloalkanediyl group; $C_{6-14}$ alkylcycloalkanediyl, such as a $C_{6-10}$ alkylcycloalkanediyl; and $C_{8-10}$ alkylarenediyl;

each X can independently be selected from O and S;

p can be an integer from 1 to 5;

q can be an integer from 0 to 5; and n can be an integer from 1 to 60, such as from 2 to 60, from 3 to 60, or from 25 to 35 and B represents a core of a z-valent polyfunctionalizing agent $B(-V)_z$ wherein:

z can be an integer from 3 to 6; and each V can be a moiety comprising a terminal group reactive with a thiol group;

each —V'— can be derived from the reaction of —V with a thiol; and each $R^4$ can independently be selected from hydrogen and a bond to a polyfunctionalizing agent $B(-V)_z$ through a moiety of Formula (35).

In thiol-terminated monosulfide prepolymers of Formula (35)-(35c):

each X can independently be selected from S, O, and $NR^3$, where $R^3$ be selected from $C_{1-4}$ alkyl;

p can be an integer from 1 to 5;

q can be an integer from 0 to 5;

n can be an integer from 1 to 60;

each R can independently be selected from $C_{2-10}$ alkanediyl, $C_{6-8}$ cycloalkanediyl, $C_{1-4}$ alkylcycloalkanediyl, and $C_{8-10}$ alkylarenediyl;

each $R^1$ can independently be selected from $C_{10}$ alkanediyl, $C_{6-8}$ cycloalkanediyl, $C_{1-4}$ alkylcycloalkanediyl, and $C_{8-10}$ alkylarenediyl;

each $R^2$ can independently be selected from $C_{2-10}$ alkanediyl, $C_{6-8}$ cycloalkanediyl, $C_{1-4}$ alkylcycloalkanediyl, and $C_{8-10}$ alkylarenediyl;

B represents a core of a z-valent polyfunctionalizing agent $B(-V)_z$ wherein:

z can be an integer from 3 to 6; and each V can be a moiety comprising a terminal group reactive with a thiol group;

each —V'— can be derived from the reaction of —V with a thiol; and each $R^4$ can independently be selected from hydrogen and a bond to a polyfunctionalizing agent $B(-V)_z$ through a moiety of Formula (35).

In thiol-terminated monosulfide moieties or prepolymers of Formula (35)-(35c), each X can independently be S or O, each X can be S, or each X can be O.

In thiol-terminated monosulfide moieties or prepolymers of Formula (35)-(35c), p can be an integer from 2 to 6, or p can be 1, 2, 3, 4, 5, or 6.

In thiol-terminated monosulfide moieties or prepolymers of Formula (35)-(35c), q can be an integer from 1 to 5, q can be an integer from 2 to 5, or q can be 0, 1, 2, 3, 4, or 5.

In thiol-terminated monosulfide moieties or prepolymers of Formula (35)-(35c), n can be an integer from 2 to 60, from 3 to 60, or from 25 to 35.

In thiol-terminated monosulfide moieties or prepolymers of Formula (35)-(35c), each R can independently be selected from $C_{2-10}$ alkanediyl and $C_{6-8}$ cycloalkanediyl, each R can be $C_{2-10}$ alkanediyl, or each R can be $C_{6-8}$ cycloalkanediyl.

In thiol-terminated monosulfide moieties or prepolymers of Formula (35)-(35c), each R can be selected from $C_{2-8}$alkanediyl, $C_{2-4}$ alkanediyl, $C_{3-10}$ alkanediyl, and $C_{3-6}$alkanediyl.

In thiol-terminated monosulfide moieties or prepolymers of Formula (35)-(35c), each R can be selected from ethanediyl, 1,3-propanediyl, 1,2-propanediyl, 1,4-butanediyl, and 1,3-butanediyl.

In thiol-terminated monosulfide moieties or prepolymers of Formula (35)-(35c), each $R^1$ can independently be selected from $C_{1-10}$ alkanediyl and $C_{6-8}$ cycloalkanediyl, each R can be $C_{1-10}$ alkanediyl, or each $R^1$ can be $C_{6-8}$ cycloalkanediyl.

In thiol-terminated monosulfide moieties or prepolymers of Formula (35)-(35c), each $R^1$ can be selected from $C_{1-6}$ alkanediyl, $C_{1-4}$ alkanediyl, $C_{2-10}$ alkanediyl, and $C_{2-6}$ alkanediyl.

In thiol-terminated monosulfide moieties or prepolymers of Formula (35)-(35c), each $R^1$ can be selected from methanediyl, ethanediyl, 1,3-propanediyl, 1,2-propanediyl, 1,4-butanediyl, and 1,3-butanediyl.

In thiol-terminated monosulfide moieties or prepolymers of Formula (35)-(35c), each $R^2$ can independently be selected from $C_{2-10}$ alkanediyl and $C_{6-8}$ cycloalkanediyl, each $R^2$ can be $C_{2-10}$ alkanediyl, or each $R^2$ can be $C_{6-8}$ cycloalkanediyl.

In thiol-terminated monosulfide moieties or prepolymers of Formula (35)-(35c), each $R^2$ can be selected from $C_{2-6}$alkanediyl, $C_{2-4}$ alkanediyl, $C_{3-10}$ alkanediyl, and $C_{3-6}$alkanediyl.

In thiol-terminated monosulfide moieties or prepolymers of Formula (35)-(35c), each $R^2$ can be selected from ethanediyl, 1,3-propanediyl, 1,2-propanediyl, 1,4-butanediyl, and 1,3-butanediyl.

In thiol-terminated monosulfide moieties or prepolymers of Formula (35)-(35c), p can be 1 or 2, q can be 1 or 2, n can be an integer from 1 to 60 or an integer from 25 to 35, each X can be O or S, each R can be $C_{2-4}$ alkanediyl, each $R^1$ can be $C_{1-4}$ alkanediyl, and each $R^2$ can be $C_{2-4}$ alkanediyl.

In thiol-terminated monosulfide moieties or prepolymers of Formula (35)-(35c), p can be 1 or 2, q can be 1 or 2, n can be an integer from 1 to 60 or an integer from 25 to 35, each X can be O or S, each R can be $C_2$ alkanediyl, each $R^1$ can be $C_1$ alkanediyl, and each $R^2$ can be $C_2$ alkanediyl.

In thiol-terminated monosulfide moieties or prepolymers of Formula (35)-(35c), p can be 1 or 2, q can be 1 or 2, n can be an integer from 1 to 60 or an integer from 25 to 35, each X can be O, each R can be $C_2$ alkanediyl, each $R^1$ can be $C_1$ alkanediyl, and each $R^2$ can be $C_2$ alkanediyl.

In thiol-terminated monosulfide moieties or prepolymers of Formula (35)-(35c), $B(-V)_z$ can be selected from 1,2,3-trichloropropane, 1,1,1-tris(chloromethyl)propane, 1,1,1-tris(chloromethyl)ethane, 1,3,5-tris(chloromethyl)benzene, and a combination of any of the foregoing.

In thiol-terminated monosulfide moieties or prepolymers of Formula (35c) each $R^4$ can independently selected from hydrogen and a bond to a polyfunctionalizing agent $B(V)_z$ through a moiety of Formula (35). A thiol-terminated monosulfide moiety or prepolymer can have an average thiol functionality, for example, from 2.05 to 2.9, such as from 2.1 to 2.8, or from 2.2 to 2.6.

Thiol-terminated monosulfide moieties or prepolymers of Formula (35)-(35c) can be prepared by reacting an α,ω-dihalo organic compounds, a metal hydrosulfide, a metal hydroxide, and an optional polyfunctionalizing agent. Examples of suitable α,ω-dihalo organic compounds include bis(2-chloroethyl)formal. Examples of suitable metal hydrosulfides and metal hydroxides include sodium hydrosulfide and sodium hydroxide. Examples of suitable polyfunctionalizing agents include 1,2,3-trichloropropane, 1,1,1-tris(chloromethyl)propane, 1,1,1-tris(chloromethyl)ethane, and 1,3,5-tris(chloromethyl)benzene. Methods of synthesizing thiol-terminated monosulfide moieties or prepolymers of Formula (35)-(35c) are disclosed, for example, in U.S. Pat. No. 7,875,666.

A thiol-terminated monosulfide prepolymer can comprise a thiol-terminated monosulfide prepolymer comprising a moiety of Formula (36) and E in the thiol-terminated prepolymer of Formula (13) can be a moiety of Formula (36a):

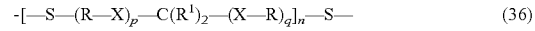

$$-[-S-(R-X)_p-C(R^1)_2-(X-R)_q]_n-S- \quad (36)$$

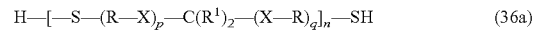

$$H-[-S-(R-X)_p-C(R^1)_2-(X-R)_q]_n-SH \quad (36a)$$

wherein, each R can independently be selected from $C_{2-10}$ alkanediyl, such as $C_{2-6}$ alkanediyl; a $C_{3-10}$ branched alkanediyl, such as a $C_{3-6}$ branched alkanediyl or a $C_{3-6}$ branched alkanediyl having one or more pendant groups which can be, for example, alkyl groups, such as methyl or ethyl groups; a $C_{6-8}$ cycloalkanediyl; a $C_{6-14}$ alkylcycloalkyanediyl, such as a $C_{6-10}$alkylcycloalkanediyl; and a $C_{8-10}$ alkylarenediyl;

each $R^1$ can independently be selected from hydrogen, $C_{1-10}$ n-alkyl, such as a $C_{1-6}$ n-alkyl, $C_{3-10}$ branched alkyl, such as a $C_{3-6}$ branched alkyl having one or more pendant groups which can be, for example, alkyl groups, such as methyl or ethyl groups; a $C_{6-8}$ cycloalkyl group; a $C_{6-14}$ alkylcycloalkyl, such as a $C_{6-10}$alkylcycloalkyl; and a $C_{8-10}$ alkylaryl;

each X can independently be selected from O and S;

p can be an integer from 1 to 5;

q can be an integer from 1 to 5; and n can be an integer from 1 to 60, such as from 2 to 60, from 3 to 60, or from 25 to 35.

A thiol-terminated monosulfide prepolymer can comprise a thiol-terminated monosulfide prepolymer of Formula (36a), a thiol-terminated monosulfide prepolymer of Formula (36b), a thiol-terminated monosulfide prepolymer of Formula (36c), or a combination of any of the foregoing:

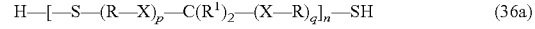

$$H-[-S-(R-X)_p-C(R^1)_2-(X-R)_q]_n-SH \quad (36a)$$

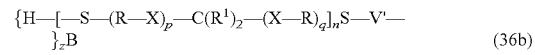

$$\{H-[-S-(R-X)_p-C(R^1)_2-(X-R)_q]_nS-V'-\}_zB \quad (36b)$$

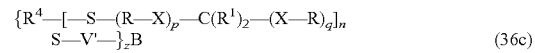

$$\{R^4-[-S-(R-X)_p-C(R^1)_2-(X-R)_q]_nS-V'-\}_zB \quad (36c)$$

wherein, each R can independently be selected from $C_{2-10}$ alkanediyl, such as $C_{2-6}$ alkanediyl; a $C_{3-10}$ branched alkanediyl, such as a $C_{3-6}$ branched alkanediyl or a $C_{3-6}$ branched alkanediyl having one or more pendant groups which can be, for example, alkyl groups, such as methyl or ethyl groups; a $C_{6-8}$ cycloalkanediyl; a $C_{6-14}$ alkylcycloalkyanediyl, such as a $C_{6-10}$ alkylcycloalkanediyl; and a $C_{8-10}$ alkylarenediyl;

each $R^1$ can independently be selected from hydrogen, $C_{1-10}$ n-alkyl, such as a $C_{1-6}$ n-alkyl, $C_{3-10}$ branched alkyl, such as a $C_{3-6}$ branched alkyl having one or more pendant groups which can be, for example, alkyl groups, such as methyl or ethyl groups; a $C_{6-8}$ cycloalkyl group; a $C_{6-14}$ alkylcycloalkyl, such as a $C_{6-10}$ alkylcycloalkyl; and a $C_{8-10}$ alkylaryl;

each X can independently be selected from O and S;

p can be an integer from 1 to 5;

q can be an integer from 1 to 5;

n can be an integer from 1 to 60, such as from 2 to 60, from 3 to 60, or from 25 to 35;

B represents a core of a z-valent polyfunctionalizing agent $B(-V)_z$ wherein:

z can be an integer from 3 to 6; and each V can be a moiety comprising a terminal group reactive with a thiol group;

each —V'— can be derived from the reaction of —V with a thiol; and each $R^4$ can independently be selected from hydrogen and a bond to a polyfunctionalizing agent $B(-V)_z$ through a moiety of Formula (36).

In thiol-terminated monosulfide moieties or prepolymers of Formula (36)-(36c), each X can independently be selected from S and O; p can be an integer from 1 to 5; q can be an integer from 1 to 5; n can be an integer from 1 to 60; each R can independently be $C_{2-10}$ alkanediyl; each $R^1$ can independently be selected from hydrogen and $C_{1-10}$ alkanediyl; B represents a core of a z-valent polyfunctionalizing agent $B(-V)_z$ wherein: z can be an integer from 3 to 6; and each V can be a moiety comprising a terminal group reactive with a thiol group; each —V'— can be derived from the reaction of —V with a thiol; and each $R^4$ can independently be hydrogen or can be bonded to a polyfunctionalizing agent $B(-V)_z$ through a moiety of Formula (36).

In thiol-terminated monosulfide moieties or prepolymers of Formula (36)-(36c), each X can be S, or each X can be O.

In thiol-terminated monosulfide moieties or prepolymers of Formula (36)-(36c), p can be an integer from 2 to 5, or q can be 1, 2, 3, 4, or 5.

In thiol-terminated monosulfide moieties or prepolymers of Formula (36)-(36c), p can be an integer from 2 to 5, or q can be 1, 2, 3, 4, or 5.

In thiol-terminated monosulfide moieties or prepolymers of Formula (36)-(36c), n can be an integer from 2 to 60, from 3 to 60, or from 25 to 35.

In thiol-terminated monosulfide moieties or prepolymers of Formula (36)-(36c), each R can independently be selected from $C_{2-6}$ alkanediyl and $C_{2-4}$ alkanediyl.

In thiol-terminated monosulfide moieties or prepolymers of Formula (36)-(36c), each R can be selected from ethanediyl, 1,3-propanediyl, 1,2-propanediyl, 1,4-butanediyl, and 1,3-butanediyl.

In thiol-terminated monosulfide moieties or prepolymers of Formula (36)-(36c), each R can be selected from $C_{2-10}$ n-alkanediyl, $C_{2-10}$ branched alkanediyl, and a combination thereof.

In thiol-terminated monosulfide moieties or prepolymers of Formula (36)-(36c), each $R^1$ can independently be selected from hydrogen and $C_{2-6}$ alkyl.

In thiol-terminated monosulfide moieties or prepolymers of Formula (36)-(36c), each $R^1$ can independently be selected from hydrogen, ethanediyl, 1,3-propyl, 1,2-propyl, 1,4-butyl, and 1,3-butyl.

In thiol-terminated monosulfide moieties or prepolymers of Formula (36)-(36c), each $R^1$ can be selected from $C_{1-10}$ n-alkyl, $C_{1-10}$ branched alkyl, and a combination thereof.

In thiol-terminated monosulfide moieties or prepolymers of Formula (36)-(36c), each X can be O, p can be 1 or 2, q can be 1 or 2, n can be 1 to 60 such as 2 to 60, each R can be $C_{2-4}$ alkanediyl such as ethanediyl, and each $R^1$ can be hydrogen.

In thiol-terminated monosulfide moieties or prepolymers of Formula (36)-(36c), each X can be O, p can be 1, q can be 1, n can be 1 to 60 such as 2 to 60, each R can be $C_{2-4}$ alkanediyl such as ethanediyl, and each $R^1$ can be hydrogen.

In thiol-terminated monosulfide moieties or prepolymers of Formula (36)-(36c), each X can be O, p can be 2, q can be 2, n can be 1 to 60 such as 2 to 60, each R can be $C_{2-4}$ alkanediyl such as ethanediyl, and each $R^1$ can be hydrogen.

In thiol-terminated monosulfide moieties or prepolymers of Formula (36)-(36c), $B(-V)_z$ can be selected from 1,2,3-trichloropropane, 1,1,1-tris(chloromethyl)propane, 1,1,1-tris(chloromethyl)ethane, 1,3,5-tris(chloromethyl)benzene, and a combination of any of the foregoing.

Thiol-terminated monosulfide moieties or prepolymers of Formula (36)-(36c) can be prepared by reacting an α,ω-dihalo organic compounds, a metal hydrosulfide, a metal hydroxide, and an optional polyfunctionalizing agent. Examples of suitable α,ω-dihalo organic compounds include bis(2-chloroethyl)formal. Examples of suitable metal hydrosulfides and metal hydroxides include sodium hydrosulfide and sodium hydroxide. Examples of suitable polyfunctionalizing agents include 1,2,3-trichloropropane, 1,1,1-tris(chloromethyl)propane, 1,1,1-tris(chloromethyl)ethane, and 1,3,5-tris(chloromethyl)benzene. Methods of synthesizing thiol-terminated monosulfides of Formula (36)-(36c) are disclosed, for example, in U.S. Pat. No. 8,466,220.

Thiol-terminated monosulfide moieties and prepolymers can have a number average molecular weight within a range from 300 Da to 10,000 Da, such as within a range 1,000 Da to 8,000 Da, where the molecular weight is determined by gel-permeation chromatography using a polystyrene standard. Thiol-terminated monosulfide prepolymers can have a glass transition temperature $T_g$ less than −40° C., less than −55° C., or less than −60° C. The glass transition temperature $T_g$ is determined by Dynamic Mass Analysis (DMA) using a TA Instruments Q800 apparatus with a frequency of 1 Hz, an amplitude of 20 microns, and a temperature ramp of −80° C. to 25° C., with the $T_g$ identified as the peak of the tan δ curve.

A sulfur-containing prepolymer can comprise a sulfur-containing perfluoroether prepolymer, a perfluorosilicone prepolymer, or a combination thereof.

An overlying sulfur-containing sealant can be a free radical polymerizable sulfur-containing sealant including sealants actinic radiation-curable sulfur-containing sealants such as UV-curable sealants.

Actinic radiation can be used to initiate free radical polymerization mechanisms. Free radical polymerization can proceed via the absorption by a photoinitiator of actinic radiation such as ultraviolet (UV) light to generate free radicals, which react with double bonds to cause chain reaction and polymerization. For example, in a thiol/ene reaction, a free radical generated by the photoinitiator abstracts a hydrogen from a thiol group creating a thienyl radical that can add to an alkylene group or an alkynyl group, creating a sulfur-carbon bond and a β-carbon radical, which initiates chain propagation. Cationic polymerization proceeds the absorption of a photoinitiator of actinic radiation to generate a Lewis acid which reacts with functional groups such as epoxy groups resulting in polymerization.

In free radical e-beam curing; electrons open double bonds initiating polymerization, and in cationic e-beam curing electrons decompose photoinitiator to form an acid.

Energy curable chemistries include reactions through double bonds including groups such as acryloyl groups (R—O—C(=O)—CH=CH$_2$), methacryloyl groups (R—O—C(=O)—C(—CH$_3$)=CH$_2$), allyl groups (R—CH=CHR), alkenyl groups (R—CH$_2$—CH=CH$_2$), and alkynyl groups (R—CH$_2$—C≡CH).

An overlying sealant can comprise a polythiol and a polyalkenyl and/or a polyalkynyl. The polythiol, polyalkenyl, and polyalkynyl can independently comprise a monomer, an oligomer, a prepolymer, or a combination of any of the foregoing.

For example, a polythiol can comprise a thiol-terminated sulfur-containing prepolymer and the polyalkenyl and/or polyalkynyl can comprise a monomer.

A thiol-terminated sulfur-containing prepolymer can comprise a thiol-terminated polythioether, a thiol-terminated polysulfide, a thiol-terminated sulfur-containing polyformal prepolymer, a thiol-terminated monosulfide, or a combination of any of the foregoing.

Examples of free radical polymerizable sulfur-containing sealant compositions are disclosed, for example, in U.S. Application Publication No. 2015/0086726 and in U.S. Pat. No. 10,280,348.

Free radical polymerizable sealant compositions can comprise a polythiol or combination of polythiols. A polythiol can be a polythiol prepolymer, a small molecule polythiol, a thiol-terminated polyfunctionalizing agent, or a combination of any of the foregoing.

A polythiol prepolymer can comprise, or example, any suitable thiol-terminated prepolymer.

A polythiol prepolymer can comprise, for example, a thiol-terminated sulfur-containing prepolymer.

Free radical polymerizable sealant compositions can comprise a thiol-terminated sulfur-containing prepolymer such as a thiol-terminated polythioether prepolymer, a thiol-terminated polysulfide prepolymer, a thiol-terminated sulfur-containing polyformal prepolymer, a thiol-terminated monosulfide prepolymer, or a combination of any of the foregoing. A sulfur-containing prepolymer refers to a prepolymer that has one or more thioether —S$_n$— groups, where n can be, for example, 1 to 6, in the backbone of the prepolymer. Prepolymers that contain only thiol or other sulfur-containing groups either as terminal groups or as pendent groups of the prepolymer are not encompassed by sulfur-containing prepolymers. The prepolymer backbone refers to the portion of the prepolymer having repeating segments. Thus, a prepolymer having the structure HS—R—R(—CH$_2$—SH)—[—R—(CH$_2$)$_2$—S(O)$_2$—(CH$_2$)—S(O)$_2$]$_n$—CH=CH$_2$ where each R is a moiety that does not contain a thioether group, is not encompassed by a sulfur-containing prepolymer. A prepolymer having the structure HS—R—R(—CH$_2$—SH)—[—R—(CH$_2$)$_2$—S(O)$_2$—(CH$_2$)—S(O)$_2$]$_n$—CH=CH$_2$ where at least one R is a moiety that contains a thioether group is encompassed by a sulfur-containing prepolymer.

A thiol-terminated sulfur-containing prepolymer can comprise a thiol-terminated sulfur-containing prepolymer or a combination of thiol-terminated sulfur-containing prepolymers. The thiol-terminated sulfur-containing prepolymers may have the same or different functionality. A thiol-terminated sulfur-containing prepolymer can have an average functionality, for example, from 2 to 6, from 2 to 4, from 2 to 3, from 2.3 to 2.8, or from 2.05 to 2.5. For example, a thiol-terminated sulfur-containing prepolymer can comprise a difunctional thiol-terminated sulfur-containing prepolymer, a trifunctional thiol-terminated sulfur-containing prepolymer, or a combination thereof.

Free radical polymerizable sealant compositions can comprise, for example, from 40 wt % to 80 wt %, from 40 wt % to 75 wt %, from 45 wt % to 70 wt %, or from 50 wt % to 70 wt % of a thiol-terminated sulfur-containing prepolymer or combination of thiol-terminated sulfur-containing prepolymers, such as a thiol-terminated polythioether prepolymer, a thiol-terminated polysulfide prepolymer, a thiol-terminated sulfur-containing polyformal prepolymer, a thiol-terminated monosulfide prepolymer, or a combination of any of the foregoing, where wt % is based on the total weight of the composition.

A sulfur-containing prepolymer can comprise a thiol-terminated polythioether prepolymer or combinations of thiol-terminated polythioether prepolymers. Examples of suitable thiol-terminated polythioether prepolymers are disclosed, for example, in U.S. Pat. No. 6,172,179. A thiol-terminated polythioether prepolymer can comprise Permapol® P3.1E, Permapol® P3.1E-2.8, Permapol® L56086, or a combination of any of the foregoing, each of which is available from PPG Aerospace. These Permapol® products are encompassed by the thiol-terminated polythioether prepolymers of Formula (12)-(12c). Thiol-terminated polythioethers include prepolymers described in U.S. Pat. No. 7,390,859 and urethane-containing polythiols described in U.S. Application Publication Nos. 2017/0369757 and 2016/0090507.

A thiol-terminated polythioether prepolymer can comprise a thiol-terminated polythioether prepolymer comprising at least one moiety having the structure of Formula (12):

—[S—(CH$_2$)$_2$—O—(R$^2$—O—)$_m$(CH$_2$)$_2$—S—R$^1$]$_n$ (12)

where, each R$^1$ can independently be selected from C$_{2-10}$ n-alkanediyl, C$_{3-6}$ branched alkanediyl, C$_{6-8}$ cycloalkanediyl, C$_{6-10}$ alkanecycloalkanediyl, and —[(CHR$^3$)$_p$—X—]$_q$(CHR$^3$)$_r$, wherein each R$^3$ can be selected from hydrogen and methyl;

each R$^2$ can independently be selected from C$_{2-10}$ n-alkanediyl, C$_{3-6}$ branched alkanediyl, C$_{6-8}$ cycloalkanediyl, C$_{6-14}$ alkanecycloalkanediyl, and —[(CH$_2$)$_p$—X—]$_q$(CH$_2$)$_r$—;

each X can independently be selected from O, S, and NR, wherein R can be selected from hydrogen and methyl;

m ranges from 0 to 50;

n can be an integer ranging from 1 to 60;

p can be an integer ranging from 2 to 6;

q can be an integer ranging from 1 to 5; and r can be an integer ranging from 2 to 10.

In addition to free radical polymerizable compounds, a sealant composition can include filler, reactive diluents, rheology agents, plasticizers, antioxidants, thermal stabilizers, adhesion promoters, colorants, and combinations of any of the foregoing.

An overlying sealant composition can be transmissive to actinic radiation such that the underlying adhesion-promoting layer can be exposed to actinic radiation incident on the overlying sealant at an energy or range of energies sufficient to activate free radical initiator within the adhesion-promoting interlayer. For example, the overlying sealant composition can transmit greater than 1%, greater than 10%, greater than 25%, greater than 75%, or greater than 90% of the relevant energy or range of energies.

The transmissibility of the overlying sulfur-containing sealant can depend, for example, on the composition of the organic materials, on the type and amount of filler, and/or of the thickness of the sealant layer.

Adhesion-promoting interlayers can be applied to a damaged and/or layer of a sulfur-containing sealant to enhance adhesion of an overlying layer of a fresh, newly applied, sulfur-containing sealant.

The two layers of sulfur-containing sealant can be the same or different. For example, the underlying or damaged layer of sealant can be based on a polythioether and the overlying or layer of fresh sealant can be based on a polysulfide.

The two layers of sulfur-containing sealant can be based on the same type of sulfur-containing prepolymer but can have different compositions. For example, both sealants can comprise polythioethers, but can have a different content of an additive, such as a filler, or a different type of additive such as different types of filler.

The underlying sulfur-containing sealant can be cured be cured using any suitable curing chemistry. For example, the underlying sulfur-containing sealant can comprise the reaction product of a polythiol and a curing agent such as a polyepoxide, polyalkenyl, polyalkynyl, polyfunctional Michael acceptor, or polyisocyanate curing agent. An underlying sealant can comprise the condensation reaction product of polythiols.

An underlying sealant can be a freshly applied sealant that can be uncured, partially cured, or fully cured.

An underlying sealant can be an incumbent sealant meaning that the sealant has been used for its intended purpose. An incumbent sealant can be used, i.e., aged, or can be damaged such as abraded, scraped, delaminated, impacted, and/or cut.

Before applying an adhesion-promoting composition provided by the present disclosure to provide an adhesion-promoting interlayer overlying a sulfur-containing sealant layer, the underlying sealant layer can be abraded. The surface can be abraded by hand sanding using, for example, a very fine grade aluminum oxide abrasive pad such as a Scotch-Brite™ 7447 hand pad available from 3M. The objective of the abrasion is to remove particulates and loose portions of the damage/weathered surface.

In certain applications, an underlying sulfur-containing surface is not abraded.

After the surface has been abraded, the surface can be wiped with a cleaning solvent to remove the particulates and oils from the sealant surface. A cleaning solvent can comprise a volatile organic solvent such as methylethyl ketone or ethyl lactate such as DS-108 available from Socomore.

The adhesion-promoting composition can be applied to an untreated or treated sulfur-containing sealant layer by wiping, spraying, or brushing the adhesion-promoting composition across the surface, for example, using a saturated gauze. The amount of the adhesion-promoting composition can result in a dried thickness, for example, from 1 µm to 20 µm or from 1 µm to 10 µm.

The applied adhesion-promoting composition can then be dried. The adhesion-promoting composition can be dried by heating or by leaving at ambient conditions (25° C./50% RH) until the solvent has evaporated. For example, at a temperature of about 25° C. the applied adhesion-promoting composition can be left to dry for about 10 minutes.

In certain applications, the dried adhesion-promoting composition can be partially cured or fully cured, for example by exposing the dried adhesion-promoting composition to actinic radiation for a period of time.

After the applied adhesion-promoting composition is dried or cured, a layer of a free radical polymerizable sulfur-containing sealant composition can be applied over the dried or cured adhesion-promoting composition.

The free radical polymerization reaction of the sulfur-containing sealant composition and the underlying adhesion-promoting composition can then be initiated. For example, the sulfur-containing sealant composition and the underlying adhesion-promoting composition can be exposed to actinic radiation, such as UV radiation sufficient to initiate the free radical reaction. Initiating the free radical polymerization reaction can included activating the free radical initiator in the overlying sulfur-containing sealant only, in the case where the adhesion-promoting interlayer has been fully cured or activating the free radical initiator in both the overlying sulfur-containing sealant and in the adhesion-promoting interlayer to simultaneously cure both the overlying sulfur-containing sealant and the adhesion-promoting interlayer.

Multilayer sealant systems provided by the present disclosure comprise an underlying sulfur-containing sealant, and adhesion-promoting interlayer contacting the underlying sulfur-containing sealant, and a sulfur-containing sealant overlying and contacting the adhesion-promoting interlayer. The first, underlying sulfur-containing sealant layer can be coated on a substrate such as a metal substrate. The substrate can be part of a vehicle such as a vehicular, marine, transport, or aerospace vehicle.

Multilayer sealant systems provided by the present disclosure can be used as sealants or coatings such as for a vehicle and aerospace, and in particular, as sealants or coatings where resistance to hydraulic fluid is desired. A sealant refers to a curable composition that has the ability when cured to resist atmospheric conditions such as moisture (e.g., from 5% RH to 100% RH) and temperature (e.g., from -30° C. to 40° C.) and at least partially block the transmission of materials such as water, water vapor, fuel, solvents, and/or liquids and gases.

Multilayer sealant systems provided by the present disclosure can be used to seal surfaces and can be used to repair and/or restore damaged and/or aged surfaces to reseal a surface or maintain the integrity of a sealed surface.

Multilayer sealant systems can be provided as kits, such as kits for repairing damaged sealant surfaces. A kit can include, for example, a container comprising an adhesion-promoting composition provided by the present disclosure and a container comprising a free radical polymerizable sulfur-containing sealant composition. A kit can further include, for example, an abrasion pad, a cleaning solvent, an applicator such as a gauze pad for applying the adhesion-promoting composition, and an applicator such as a brush for applying the free radical polymerizable sulfur-containing sealant composition. A repair kit can include a polymerization initiator such as UV or visible source for curing of the adhesion promoting composition and the free radical polymerizable sulfur-containing sealant composition.

Compositions, including sealants and adhesion-promoting compositions provided by the present disclosure may be applied to any of a variety of substrates. Examples of substrates to which a composition may be applied include metals such as titanium, stainless steel, steel alloy, aluminum, and aluminum alloy, any of which may be anodized, primed, organic-coated or chromate-coated; epoxy; urethane; graphite; fiberglass composite; Kevlar®; acrylics; and polycarbonates. Compositions provided by the present disclosure may be applied to a substrate such as aluminum and aluminum alloy.

Sealant systems provided by the present disclosure may be formulated as Class A, Class B, or Class C sealants. A Class A sealant refers to a brushable sealant having a viscosity of 1 poise to 500 poise (0.1 Pa-sec to 50 Pa-sec) and is designed for brush application. A Class B sealant refers to an extrudable sealant having a viscosity from 4,500 poise to 20,000 poise (450 Pa-sec to 2,000 Pa-sec) and is designed for application by extrusion via a pneumatic gun. A Class B sealant can be used form fillets and sealing on vertical surfaces or edges where low slump/slag is required. A Class C sealant has a viscosity from 500 poise to 4,500 poise (50 Pa-sec to 450 Pa-sec) and is designed for application by a roller or combed tooth spreader. A Class C sealant can be used for fay surface sealing. Viscosity can be measured according to Section 5.3 of SAE Aerospace Standard AS5127/1C published by SAE International Group.

Sealant systems including an adhesion-promoting interlayer provided by the present disclosure can be used to seal and/or reseal apertures, surfaces, joints, fillets, fay surfaces, and fasteners including apertures, surfaces, fillets, joints, fay surfaces fasteners of vehicles including aerospace vehicles. Surfaces including vehicular surfaces such as aerospace surfaces, sealed with a sealant system including an adhesion-promoting interlayer are included within the scope of the disclosure.

A cured sealant system can have a thickness, for example, from 5 mils to 25 mils (127 μm to 635 μm) such as from 10 mils to 20 mils (254 μm to 508 μm).

The free radical photopolymerization reaction can be initiated by exposing a composition provided by the present disclosure to actinic radiation such as UV radiation, for example, for less than 180 seconds, less 120 seconds, less than 90 seconds, less than 60 seconds, or less than 30 seconds.

The free radical photopolymerization reaction can be initiated by exposing a composition provided by the present disclosure to actinic radiation such as UV radiation, for example, for from 5 seconds to 180 seconds, from 15 seconds to 120 seconds, from 15 seconds to 90 seconds, or from 15 seconds to 60 seconds.

The UV radiation can include radiation at a wavelength at 394 nm.

The total power of the UV exposure can be, for example, from 50 mW/cm$^2$ to 50 W/cm$^2$, from 100 mW/cm$^2$ to 20 W/cm$^2$, from 150 mW/cm$^2$ to 10 W/cm$^2$, from 200 mW/cm$^2$ to 5 W/cm$^2$, or from 250 mW/cm$^2$ to 2 W/cm$^2$.

In certain applications provided by the present disclosure a sealant system can be curable without exposure to actinic radiation such as UV radiation. Composition can be at least partly curable upon exposure to actinic radiation and such compositions can include a photoionization. The actinic radiation such as UV radiation can be applied to at least a portion of an applied sealant. The sealant can be accessible to the actinic radiation and the portion of sealant exposed to the UV radiation can be cured to a certain depth below the surface. For example, the actinic radiation can be initiated the photopolymerization reaction to a depth, for example, of at least 4 mm, at least 6 mm, at least 8 mm, or at least 10 mm. A portion of the sealant may not be accessible to actinic radiation either because of absorption or scattering of the actinic radiation of the sealant which prevents the actinic radiant from interacting with the full thickness of the sealant. A portion of the sealant may be obscured by the geometry of the part being sealed or may be obscured by an overlying structure.

Cured sealant systems, such as cured sealants, exhibit properties acceptable for use in vehicle and aerospace sealant applications. In general, it is desirable that sealants used in aviation and aerospace applications exhibit the following properties: peel strength greater than 20 pounds per linear inch (pli) on Aerospace Material Specification (AMS) 3265B substrates determined under dry conditions, following immersion in JRF Type I for 7 days, and following immersion in a solution of 3% NaCl according to AMS 3265B test specifications; tensile strength between 300 pounds per square inch (psi) and 400 psi (2.75 MPa); tear strength greater than 50 pounds per linear inch (pli) (8.75 N/mm); elongation between 250% and 300%; and hardness greater than 40 Durometer A. These and other cured sealant properties appropriate for aviation and aerospace applications are disclosed in AMS 3265B. It is also desirable that, when cured, compositions of the present disclosure used in aviation and aircraft applications exhibit a percent volume swell not greater than 25% following immersion for one week at 60° C. (140° F.) and ambient pressure in Jet Reference Fluid (JRF) Type 1. Other properties, ranges, and/or thresholds may be appropriate for other sealant applications.

Cured sealant systems can be fuel-resistant. The term "fuel resistant" means that a composition, when applied to a substrate and cured, can provide a cured product, such as a sealant, that exhibits a percent volume swell of not greater than 40%, in some cases not greater than 25%, in some cases not greater than 20%, and in other cases not more than 10%, after immersion for one week at 140° F. (60° C.) and ambient pressure in JRF Type I according to methods described in ASTM D792 (American Society for Testing and Materials) or AMS 3269 (Aerospace Material Specification). JRF Type I, as employed for determination of fuel resistance, has the following composition: toluene: 28±1% by volume; cyclohexane (technical): 34±1% by volume; isooctane: 38±1% by volume; and tertiary dibutyl disulfide: 1±0.005% by volume (see AMS 2629, issued Jul. 1, 1989, § 3.1.1 etc., available from SAE (Society of Automotive Engineers)).

Sealant systems can exhibit a tensile elongation of at least 200% and a tensile strength of at least 200 psi when measured in accordance with the procedure described in AMS 3279, § 3.3.17.1, test procedure AS5127/1, § 7.7. In general, for a Class A sealant there is no tensile and elongation requirement. For a Class B sealant, as a general requirement, tensile strength is equal to or greater than 200 psi (1.38 MPa) and elongation is equal to or greater than 200%. Acceptable elongation and tensile strength can be different depending on the application.

Sealant systems can exhibit a lap shear strength of greater than 200 psi (1.38 MPa), such as at least 220 psi (1.52 MPa), at least 250 psi (1.72 MPa), and, in some cases, at least 400 psi (2.76 MPa), when measured according to the procedure described in SAE AS5127/1 paragraph 7.8.

A cured sealant system prepared from a composition meets or exceeds the requirements for aerospace sealants as set forth in AMS 3277.

A cured sealant system provided by the present disclosure can exhibit a peel strength greater than 10 pli and 100% cohesive failure or greater than 20 pli/100% cf.

Sealant systems including an adhesion-promoting interlayer provided by the present disclosure can meet the requirements of AMS draft specification G9-16AA.

Apertures, surfaces, joints, fillets, fay surfaces including apertures, surfaces, fillets, joints, and fay surfaces of aerospace vehicles, sealed with compositions are also disclosed.

Sealant systems including an adhesion-promoting interlayer provided by the present disclosure can be used to seal a part including a surface of a vehicle.

The term "vehicle" is used in its broadest sense and includes all types of aircraft, spacecraft, watercraft, and ground vehicles. For example, a vehicle can include, aircraft such as airplanes including private aircraft, and small, medium, or large commercial passenger, freight, and military aircraft; helicopters, including private, commercial, and military helicopters; aerospace vehicles including, rockets and other spacecraft. A vehicle can include a ground vehicle such as, for example, trailers, cars, trucks, buses, vans, construction vehicles, golf carts, motorcycles, bicycles, trains, and railroad cars. A vehicle can also include watercraft such as, for example, ships, boats, and hovercraft.

A sealant system can be used in a F/A-18 jet or related aircraft such as the F/A-18E Super Hornet and F/A-18F; in the Boeing 787 Dreamliner, 737, 747, 717 passenger jet aircraft, a related aircraft (produced by Boeing Commercial Airplanes); in the V-22 Osprey; VH-92, S-92, and related aircraft (produced by NAVAIR and Sikorsky); in the G650, G600, G550, G500, G450, and related aircraft (produced by Gulfstream); and in the A350, A320, A330, and related aircraft (produced by Airbus). Compositions provided by the present disclosure can be used in any suitable commercial, military, or general aviation aircraft such as, for example, those produced by Bombardier Inc. and/or Bombardier Aerospace such as the Canadair Regional Jet (CRJ) and related aircraft; produced by Lockheed Martin such as the F-22 Raptor, the F-35 Lightning, and related aircraft; produced by Northrop Grumman such as the B-2 Spirit and related aircraft; produced by Pilatus Aircraft Ltd.; produced by Eclipse Aviation Corporation; or produced by Eclipse Aerospace (Kestrel Aircraft).

Sealant systems provided by the present disclosure can be used to seal parts and surfaces of vehicles such as fuel tank surfaces and other surfaces exposed to or potentially exposed to aerospace solvents, aerospace hydraulic fluids, and aerospace fuels.

The present invention includes parts sealed with a sealant system provided by the present disclosure, and assemblies and apparatus comprising a part sealed with a composition provided by the present disclosure.

The present invention includes vehicles comprising a part such as a surface sealed with a sealant system provided by the present disclosure. For example, an aircraft comprising a fuel tank or portion of a fuel tank sealed with a sealant system provided by the present disclosure is included within the scope of the invention.

Aspects of the Invention

The invention is further defined by the following aspects.

Aspect 1. A multilayer sealant comprising: a first sulfur-containing sealant layer, wherein the first sulfur-containing sealant layer comprises a cross-linked first sulfur-containing prepolymer; an adhesion-promoting interlayer overlying the first sulfur-containing sealant layer; and a second sulfur-containing sealant layer overlying the adhesion-promoting interlayer, wherein the second sulfur-containing sealant layer comprises a free radical polymerized second sulfur-containing prepolymer, wherein the adhesion-promoting interlayer comprises a crosslinked free radical polymerized compound.

Aspect 2. The multilayer sealant of aspect 1, wherein the free radical polymerized compound is derived from a multifunctional (meth)acrylate.

Aspect 3. The multilayer sealant of aspect 1, wherein the free radical polymerized compound comprises a reaction product of: a polythiol; and an ethylenically unsaturated free radical polymerizable compound.

Aspect 4. The multilayer sealant of aspect 3, wherein the ethylenically unsaturated free radical polymerizable compound comprises a polyalkenyl, a polyalkynyl, or a combination thereof.

Aspect 5. The multilayer sealant of any one of aspects 3 to 4, wherein the free radical polymerizable compound comprises a monomer, an oligomer, a prepolymer, or a combination thereof.

Aspect 6. The multilayer sealant of any one of aspects 1 to 5, wherein the first sulfur-containing sealant layer comprises a damaged and/or aged sealant layer.

Aspect 7. The multilayer sealant of aspect 6, wherein the damaged and/or aged sealant layer is abraded.

Aspect 8. The multilayer sealant of any one of aspects 1 to 7, wherein each of the first sulfur-containing prepolymer and the second sulfur-containing prepolymer independently comprises a polythioether prepolymer, a polysulfide prepolymer, a sulfur-containing polyformal prepolymer, a monosulfide prepolymer, or a combination of any of the foregoing.

Aspect 9. The multilayer sealant of any one of aspects 1 to 7, wherein each of the first sulfur-containing sealant layer and the second sulfur-containing sealant layer has a sulfur content greater than 10 wt %, where wt % is based on the total weight of the respective sealant layers.

Aspect 10. The multilayer sealant of any one of aspects 1 to 7, wherein each of the first sulfur-containing sealant layer and the second sulfur-containing sealant independently comprises the reaction product of reactants comprising: a sulfur-containing prepolymer and a curing agent; the reaction product of a thiol/thiol condensation reaction; or the reaction product of a free radical initiated thiol/alkenyl reaction and/or thiol/alkynyl reaction.

Aspect 11. The multilayer sealant of aspect 10, wherein the curing agent comprises a polyepoxide, a polyalkenyl, a polyalkynyl, a polyfunctional Michael acceptor, a polythiol, or a combination of any of the foregoing.

Aspect 12. The multilayer sealant of any one of aspects 10 to 11, wherein the sulfur-containing prepolymer comprises a thiol-terminated polythioether prepolymer, a thiol-terminated polysulfide prepolymer, a thiol-terminated sulfur-containing polyformal prepolymer, a thiol-terminated monosulfide prepolymer, or a combination of any of the foregoing.

Aspect 13. The multilayer sealant of any one of aspects 1 to 12, wherein the adhesion-promoting interlayer comprises a polymerized epoxy (meth)acrylate monomer, a polymerized epoxy (meth)acrylate oligomer, a polymerized urethane (meth)acrylate monomer such as a difunctional epoxy (meth)acrylate monomer, a polymerized urethane (meth)acrylate oligomer such as a difunctional epoxy (meth)acrylate oligomer, a polymerized trifunctional (meth)acrylate monomer, a polymerized trifunctional (meth)acrylate oligomer, or a combination of any of the foregoing.

Aspect 14. The multilayer sealant of any one of aspects 1 to 12, wherein the adhesion-promoting interlayer comprises a polymerized bisphenol A type epoxy (meth)acrylate oligomer, such as a polymerized difunctional bisphenol A type epoxy (meth)acrylate oligomer.

Aspect 15. The multilayer sealant of any one of aspects 1 to 12, wherein the adhesion-promoting interlayer comprises a polymerized urethane di(meth)acrylate monomer or a polymerized urethane di(meth)acrylate oligomer.

Aspect 16. The multilayer sealant of any one of aspects 1 to 15, wherein the adhesion-promoting interlayer comprises a free radical catalyzed reaction product of the adhesion-promoting composition of any one of aspects 32 to 49.

Aspect 17. The multilayer sealant of any one of aspects 1 to 16, wherein the adhesion-promoting interlayer has a thickness from 1 µm to 20 µm, such as from 1 µm to 10 µm.

Aspect 18. The multilayer sealant of any one of aspects 1 to 17, wherein the second sulfur-containing sealant layer comprises the free radical catalyzed reaction product of reactants comprising: a polythiol; and a polyalkenyl and/or a polyalkynyl.

Aspect 19. The multilayer sealant of aspect 18, wherein, the polythiol comprises a sulfur-containing prepolymer and/or the polyalkenyl and/or the polyalkynyl comprises a sulfur-containing prepolymer.

Aspect 20. The multilayer sealant of aspect 18, wherein, the polythiol comprises a monomer, an oligomer, a prepolymer, or a combination of any of the foregoing; and the polyalkenyl and/or the polyalkynyl independently comprises a monomer, an oligomer, a prepolymer, or a combination of any of the foregoing.

Aspect 21. The multilayer sealant of aspect 18, wherein the polythiol comprises a thiol-terminated polythioether prepolymer.

Aspect 22. The multilayer sealant of aspect 18, wherein the polythiol comprises a thiol-terminated polythioether prepolymer and the polyalkenyl and/or a polyalkynyl comprises a monomeric polyalkenyl and/or polyalkynyl.

Aspect 23. The multilayer sealant of any one of aspects 1 to 22, wherein the second sulfur-containing sealant layer is transmissive to actinic radiation.

Aspect 24. The multilayer sealant of any one of aspects 1 to 23, wherein the first sulfur-containing sealant layer overlies a substrate.

Aspect 25. The multilayer sealant of aspect 24, wherein the substrate comprises a surface of a vehicle.

Aspect 26. The multilayer sealant of aspect 24, wherein the substrate comprises a surface of an aerospace vehicle.

Aspect 27. The multilayer sealant of aspect 24, wherein the substrate comprises a surface of a part.

Aspect 28. The multilayer sealant of aspect 27, wherein the part comprises a vehicle part.

Aspect 29. The multilayer sealant of aspect 27, wherein the part comprises an aerospace vehicle part.

Aspect 30. A vehicle comprising the multilayer sealant of any one of aspects 1 to 29.

Aspect 31. An aerospace vehicle comprising the multilayer sealant of any one of aspects 1 to 29.

Aspect 32. An adhesion-promoting composition, comprising: a free radical polymerizable compound; a free radical initiator; and a volatile organic solvent.

Aspect 33. The adhesion-promoting composition of aspect 32, comprising:
from 10 wt % to <99.9 wt % of the free radical polymerizable compound;
from 0.1 wt % to 20 wt % of the free radical initiator; and
from 0 wt % to 89.9 wt % of the volatile organic solvent,
wherein wt % is based on the total weight of the composition.

Aspect 34. The adhesion-promoting composition of aspect 32, comprising:
from 15 wt % to 89.8 wt % of the free radical polymerizable compound;
from 0.2 wt % to 18 wt % of the free radical initiator; and
from 10 wt % to 84.8 wt % of the volatile organic solvent,
wherein wt % is based on the total weight of the composition.

Aspect 35. The adhesion-promoting composition of aspect 32, comprising:
from 20 wt % to 89.6 wt % of the free radical polymerizable compound;
from 0.4 wt % to 15 wt % of the free radical initiator; and
from 10 wt % to 79.6 wt % of the volatile organic solvent,
wherein wt % is based on the total weight of the composition.

Aspect 36. The adhesion-promoting composition of aspect 32, comprising:
from 15 wt % to 45 wt % of the free radical polymerizable compound;
from 0.2 wt % to 2 wt % of the free radical initiator; and
from 55 wt % to 85 wt % of the volatile organic solvent,
wherein wt % is based on the total weight of the composition.

Aspect 37. The adhesion-promoting composition of aspect 32, comprising:
from 15 wt % to 25 wt % of the free radical polymerizable compound;
from 0.2 wt % to 0.6 wt % of the free radical initiator; and
from 75 wt % to 85 wt % of the volatile organic solvent,
wherein wt % is based on the total weight of the composition.

Aspect 38. The adhesion-promoting composition of aspect 32, comprising:
from 35 wt % to 45 wt % of the free radical polymerizable compound;
from 0.6 wt % to 1.0 wt % of the free radical initiator; and
from 55 wt % to 65 wt % of the volatile organic solvent,
wherein wt % is based on the total weight of the composition.

Aspect 39. The adhesion-promoting composition of any one of aspects 32 to 38, wherein the free radical polymerizable compound has a reactive functionality of two or more.

Aspect 40. The adhesion-promoting composition of any one of aspects 32 to 39, wherein the free radical polymerizable compound comprises a multifunctional (meth)acrylate or a combination of multifunctional (meth)acrylates.

Aspect 41. The adhesion-promoting composition of any one of aspects 32 to 39, wherein the free radical polymerizable compound comprises: a polythiol or a combination of polythiols; and an ethylenically unsaturated free radical polymerizable compound or a combination of ethylenically unsaturated free radical polymerizable compounds.

Aspect 42. The adhesion-promoting composition of any one of aspects 32 to 39, wherein the ethylenically unsaturated free radical polymerizable compound or compounds comprise a polyalkenyl, a polyalkynyl, or a combination thereof.

Aspect 43. The adhesion-promoting composition of any one of aspects 32 to 42, wherein the free radical polymerizable compound comprises a monomer, an oligomer, a prepolymer, or a combination thereof.

Aspect 44. The adhesion-promoting composition of any one of aspects 32 to 43, wherein the free radical polymerizable compound has a molecular weight of at least 150 Da.

Aspect 45. The adhesion-promoting composition of any one of aspects 32 to 44, wherein the free radical initiator comprises a radiation activated free radical initiator, a thermally activated free radical initiator, a chemically-activated free radical initiator, or a combination of any of the foregoing.

Aspect 46. The adhesion-promoting composition of any one of aspects 32 to 44, wherein the free radical initiator is one or more free radical photoinitiators.

Aspect 47. The adhesion-promoting composition of any one of aspects 32 to 46, wherein the volatile organic solvent has a vapor pressure greater than 10 mm Hg at 25° C.

Aspect 48. The adhesion-promoting composition of any one of aspects 32 to 47, wherein the composition comprises a colorant.

Aspect 49. The adhesion-promoting composition of any one of aspects 32 to 48, wherein the adhesion-promoting composition consists of: the free radical polymerizable compound; the free radical initiator; and the volatile organic solvent or the free radical polymerizable compound; the free radical initiator; the volatile organic solvent, and a colorant.

Aspect 50. A method of sealing a surface, comprising: applying the adhesion-promoting composition of any one of aspects 32 to 49 to a sulfur-containing sealant layer; drying the applied adhesion-promoting composition; applying a free radical polymerizable sulfur-containing sealant composition to the dried adhesion-promoting composition; and initiating free radical polymerization of the sulfur-containing sealant composition to cure the sulfur-containing sealant composition, and thereby seal the surface.

Aspect 51. The method of aspect 50, wherein initiating free radical polymerization further comprises initiating free radical polymerization of the dried adhesion-promoting composition, such as exposing the dried adhesion-promoting composition to actinic radiation.

Aspect 52. The method of aspect 50, wherein initiating free radical polymerization comprises exposing the applied free radical polymerizable sulfur-containing sealant composition and the dried adhesion-promoting composition to actinic radiation.

Aspect 53. The method of any one of aspects 50 to 52, further comprising, after drying the adhesion-promoting composition, initiating free radical polymerization of the dried adhesion-promoting composition to provide an at least partially cured adhesion-promoting composition; and applying the free radical polymerizable sulfur-containing sealant composition comprises applying to the at least partially cured adhesion-promoting composition.

Aspect 54. The method of any one of aspects 50 to 53, wherein applying the adhesion-promoting composition comprises applying a layer of the adhesion-promoting composition that, when dried, has a thickness from 1 µm to 20 µm, such as from 1 µm to 10 µm.

Aspect 55. The method of any one of aspects 50 to 54, wherein applying the adhesion-promoting composition comprises wiping, spraying, or brushing the adhesion-promoting composition onto the sulfur-containing sealant layer.

Aspect 56. The method of any one of aspects 50 to 55, wherein the sulfur-containing sealant composition comprises a polythiol and a polyalkenyl and/or a polyalkynyl.

Aspect 57. The method of claim 56, wherein the polythiol comprises a thiol-terminated polythioether prepolymer.

Aspect 58. The method of any one of aspects 50 to 57, further comprising, before applying the adhesion-promoting composition, applying a first sulfur-containing sealant composition to a substrate to provide the first sulfur-containing sealant layer.

Aspect 59. The method of any one of aspects 50 to 58, further comprising, before applying the adhesion-promoting composition, cleaning the surface of a sulfur-containing sealant layer with a volatile organic solvent.

Aspect 60. The method of claim 59, further comprising, before cleaning the surface, abrading the surface of the first sulfur-containing sealant layer.

Aspect 61. The method of any one of aspects 50 to 60, wherein sealing a surface comprises repairing a sealed surface.

Aspect 62. The method of any one of aspects 50 to 51, wherein the first sulfur-containing sealant layer comprises an incumbent sulfur-containing sealant layer.

Aspect 63. The method of aspect 62, wherein the incumbent sulfur-containing sealant layer comprises a damaged and/or aged sulfur-containing sealant layer.

Aspect 64. The method of aspect 63, wherein the method comprises repairing the damaged and/or aged sulfur-containing sealant layer.

Aspect 65. The method of any one of aspects 63 to 64, wherein the incumbent sulfur-containing sealant layer comprises the reaction product of reactants comprising: a thiol-terminated sulfur-containing prepolymer; and a curing agent.

Aspect 66. The method of aspect 65, wherein the thiol-terminated sulfur-containing prepolymer comprises a thiol-terminated polythioether, a thiol-terminated polysulfide, a thiol-terminated sulfur-containing polyformal, a thiol-terminated monosulfide, or a combination of any of the foregoing.

Aspect 67. The method of any one of aspects 65, 60, 66, wherein the curing agent comprises a polyepoxide, a polyalkenyl, a polyalkynyl, a polyfunctional Michael acceptor, a polythiol, or a combination of any of the foregoing.

Aspect 68. The method of any one of aspects 50 to 67, wherein the sulfur-containing sealant layer comprises the condensation reaction products of a thiol-terminated sulfur-containing prepolymer.

Aspect 69. The method of any one of aspects 50 to 68, wherein the sulfur-containing sealant layer comprises the free radical polymerization product of a polythiol and a polyalkenyl and/or polyalkynyl.

Aspect 70. The method of aspect 69, wherein the polythiol comprises a thiol-terminated sulfur-containing prepolymer.

Aspect 71. The method of any one of aspects 69 to 70, wherein, the polythiol comprises a sulfur-containing prepolymer; and/or the polyalkenyl and/or the polyalkynyl comprises a sulfur-containing prepolymer.

Aspect 72. The method of aspect 71, wherein, the polythiol comprises a monomer, an oligomer, a prepolymer, or a combination of any of the foregoing; and a polyalkenyl and/or the polyalkynyl independently comprises a monomer, an oligomer, a prepolymer, or a combination of any of the foregoing.

Aspect 73. The method of any one of aspects 50 to 72, wherein each of the sulfur-containing sealant layer and the sulfur-containing sealant composition independently have a sulfur-content greater than 10 wt %, wherein wt % is based on the total weight of the sulfur-containing sealant layer or the sulfur-containing sealant composition, respectively.

Aspect 74. The method of any one of aspects 50 to 73, wherein the sulfur-containing sealant layer overlies a substrate.

Aspect 75. The method of aspect 74, wherein the substrate comprises a surface of a vehicle.

Aspect 76. The method of aspect 74, wherein the substrate comprises a surface of an aerospace vehicle.

Aspect 77. The method of aspect 74, wherein the substrate comprises a surface of a part.

Aspect 78. The method of aspect 77, wherein the part comprises a vehicle part.

Aspect 79. The method of aspect 77, wherein the part comprises an aerospace vehicle part.

Aspect 80. A vehicle comprising a surface sealed using the method of any one of aspects 50 to 79.

Aspect 81. An aerospace vehicle comprising a surface sealed using the method of any one of aspects 50 to 79.

Aspect 82. A damaged and/or aged sulfur-containing sealant layer repaired using the method of any one of aspects 50 to 79.

Aspect 83. A vehicle comprising the repaired sulfur-containing sealant layer of aspect 82.

Aspect 84. An aerospace vehicle comprising the repaired sulfur-containing sealant layer of aspect 82.

Aspect 85. A sealant repair kit comprising: a container comprising an adhesion-promoting composition of claim 1; and a container comprising a free radical polymerizable sulfur-containing sealant composition.

Aspect 86. The sealant repair kit of aspect 85, further comprising an abrasion pad, a cleaning solvent, an applicator for the adhesion-promoting composition, an applicator for the free radical polymerizable sulfur-containing sealant composition, a source for initiating a free radical reaction, or a combination of any of the foregoing.

Aspect 87. Use of the adhesion promoting composition of any one of claims 32 to 49 to promote adhesion between a first sulfur-containing sealant layer and a second sulfur-containing sealant layer, wherein, the first sulfur-containing sealant layer comprises a cross-linked first sulfur-containing prepolymer; and wherein the second sulfur-containing sealant layer comprises a free radical polymerized second sulfur-containing prepolymer.

Aspect 88. The use of aspect 87, wherein the adhesion-promoting composition comprises a crosslinked free radical polymerized compound.

Aspect 89. The use of aspect 88, wherein the free radical polymerized compound is derived from a multifunctional (meth)acrylate.

Aspect 90. The use of aspect 88, wherein the free radical polymerized compound comprises the reaction product of: a polythiol; and an ethylenically unsaturated free radical polymerizable compound.

Aspect 91. The use of aspect 90, wherein the ethylenically unsaturated free radical polymerizable compound comprises a polyalkenyl, a polyalkynyl, or a combination thereof.

Aspect 92. The use of aspect 88, wherein the free radical polymerizable compound comprises a monomer, an oligomer, or a combination thereof.

Aspect 93. The use of any one of aspects 87 to 92, wherein the adhesion-promoting composition further comprises a free radical initiator.

Aspect 94. The use of aspect 93, wherein the free radical initiator comprises a radiation-activated free radical initiator, a thermally activated free radical initiator, a chemically-activated free radical initiator, or a combination of any of the foregoing.

Aspect 95. The use of any one of aspects 87 to 94, wherein the first sulfur-containing sealant layer comprises a damaged and/or aged sealant layer.

Aspect 96. The use of aspect 95, wherein the damaged and/or aged sealant layer is abraded.

Aspect 97. The use of any one of aspects 87 to 96, wherein each of the first sulfur-containing prepolymer and the second sulfur-containing prepolymer independently comprises a polythioether prepolymer, a polysulfide prepolymer, a sulfur-containing polyformal prepolymer, a monosulfide prepolymer, or a combination of any of the foregoing.

Aspect 98. The use of any one of aspects 87 to 97, wherein each of the first sulfur-containing sealant layer and the second sulfur-containing sealant layer has a sulfur content greater than 10 wt %, where wt % is based on the total weight of the respective sealant layers.

Aspect 99. The use of any one of aspects 87 to 97, wherein each of the first sulfur-containing sealant layer and the second sulfur-containing sealant independently comprises the reaction product of reactants comprising a sulfur-containing prepolymer and a curing agent; the reaction product of a thiol/thiol condensation reaction; or the reaction product of a free radical initiated thiol/alkenyl reaction and/or thiol/alkynyl reaction.

Aspect 100. The use of aspect 99, wherein the curing agent comprises a polyepoxide, a polyalkenyl, a polyalkynyl, a polyfunctional Michael acceptor, a polythiol, or a combination of any of the foregoing.

Aspect 101. The use of any one of aspects 99 to 100, wherein the sulfur-containing prepolymer comprises a thiol-terminated polythioether prepolymer, a thiol-terminated polysulfide prepolymer, a thiol-terminated sulfur-containing polyformal prepolymer, a thiol-terminated monosulfide prepolymer, or a combination of any of the foregoing.

Aspect 102. The use of any one of aspects 87 to 101, wherein the adhesion-promoting composition comprises a polymerized epoxy (meth)acrylate monomer such as a difunctional epoxy (meth)acrylate monomer, a polymerized epoxy (meth)acrylate oligomer, such as a difunctional epoxy (meth)acrylate oligomer, a polymerized urethane (meth)acrylate monomer, a polymerized urethane (meth)acrylate oligomer, a polymerized trifunctional (meth)acrylate monomer, a polymerized trifunctional (meth)acrylate oligomer, or a combination of any of the foregoing.

Aspect 103. The use of any one of aspects 87 to 101, wherein the adhesion-promoting composition comprises a polymerized bisphenol A type epoxy (meth)acrylate oligomer, such as a polymerized difunctional bisphenol A type epoxy (meth)acrylate oligomer.

Aspect 104. The use of any one of aspects 87 to 101, wherein the adhesion-promoting composition comprises a polymerized urethane di(meth)acrylate monomer or a polymerized urethane di(meth)acrylate oligomer.

Aspect 105. The use of any one of aspects 87 to 101, wherein the adhesion-promoting composition comprises a free radical catalyzed reaction product of the adhesion-promoting composition of any one of claims 32 to 49.

Aspect 106. The use of any one of aspects 87 to 105, wherein the adhesion-promoting composition has a thickness from 1 µm to 20 µm, such as from 1 µm to 10 µm.

Aspect 107. The use of any one of aspects 87 to 106, wherein the second sulfur-containing sealant layer comprises the free radical catalyzed reaction product of reactants comprising: a polythiol; and a polyalkenyl and/or a polyalkynyl.

Aspect 108. The use of any one of aspects 87 to 107, wherein the polythiol comprises a sulfur-containing prepolymer and/or the polyalkenyl and/or the polyalkynyl comprises a sulfur-containing prepolymer.

Aspect 109. The use of any one of aspects 87 to 107, wherein, the polythiol comprises a monomer, an oligomer, a prepolymer, or a combination of any of the foregoing; and the polyalkenyl and/or the polyalkynyl independently comprises a monomer, an oligomer, a prepolymer, or a combination of any of the foregoing.

Aspect 110. The use of any one of aspects 87 to 107, wherein the polythiol comprises a thiol-terminated polythioether prepolymer.

Aspect 111. The use of any one of aspects 87 to 107, wherein the polythiol comprises a thiol-terminated polythioether prepolymer and the polyalkenyl and/or a polyalkynyl comprises a monomeric polyalkenyl and/or polyalkynyl.

Aspect 112. The use of any one of aspects 87 to 111, wherein the second sulfur-containing sealant layer is transmissive to actinic radiation.

Aspect 113. The use of any one of aspects 87 to 112, wherein the first sulfur-containing sealant layer overlies a substrate.

Aspect 114. The use of claim 113, wherein the substrate comprises a surface of a vehicle.

Aspect 115. The use of aspect 113, wherein the substrate comprises a surface of an aerospace vehicle.

Aspect 116. The use of aspect 113, wherein the substrate comprises a surface of a part.

Aspect 117. The use of aspect 116, wherein the part comprises a vehicle part.

Aspect 118. The use of aspect 116, wherein the part comprises an aerospace vehicle part.

EXAMPLES

Embodiments provided by the present disclosure are further illustrated by reference to the following examples, which describe the compositions provided by the present disclosure and uses of such compositions. It will be apparent to those skilled in the art that many modifications, both to materials, and methods, may be practiced without departing from the scope of the disclosure.

Example 1

Bisphenol A-Based Epoxy Acrylate
Adhesion-Promoting Interlayer

The ability of an adhesion-promoting interlayer was tested on a variety of sulfur-containing sealants. The experiments were carried out according to AMS draft specification G9-16AA.

Test panels were prepared and tested according to AS5127/1 (8.2).

AMS4045 aluminum alloy panels measuring 0.025 to 0.040×2.75×6 inches (0.64 to 1.02×69.8×152 mm) were anodized with sulfuric acid according to AS5127 (6.3) and overcoated with AMS-C-22725 (see 8.5).

At least two test panels were used to qualify the adhesion system to AMS3277 and to AMS3276.

PR2001 and PR1828 were selected from the AMS3277 qualified product list and PR1750 was selected for testing from the AMS3276 product list.

AS5127/1 also requires that the sealant adhere to itself. PR1776 and PR2007 are not required to be tested for G9-16AA qualification but were included to evaluate the robustness of the adhesion-promoting interlayer to enhance adhesion between a variety of different sulfur-containing sealant compositions.

A summary of the sulfur-containing sealants used is provided in Table 1.

TABLE 1

Composition of sulfur-containing sealants.

| Sealant[1] | Description | Thiol-terminated Prepolymer | Curing Agent |
|---|---|---|---|
| PR-2001 | Class B rapid curing fuel tank sealant | polythioether | polyepoxide |
| PR-1828 | Class B rapid curing fuel tank sealant | polythioether | polyepoxide |
| UV SCOD | Class B UV-cured fuel tank sealant | polythioether | polyalkenyl |

TABLE 1-continued

Composition of sulfur-containing sealants.

| Sealant[1] | Description | Thiol-terminated Prepolymer | Curing Agent |
|---|---|---|---|
| PR-1750 | Class B fuel tank sealant | polysulfide | $MnO_2$ cured |
| PR-1776 | Class B, high temperature fuel tank sealant | polysulfide | $MnO_2$ cured |
| PR-2007 | Class B light weight (SG 1.1) fuel tank sealant | polysulfide | $MnO_2$ cured |

[1]All sealants except for UV SCOD are commercially available from PPG Aerospace.

A 0.25 in-thick (6.4 mm-thick) layer of each sulfur-containing sealant was applied to the test panels and fully cured according to specification. For each sealant, one set of test panels was evaluated after standard curing (dry) and another set of test panels was evaluated after standard curing (dry) and conditioning by immersing the sealant-containing test panels in JRF Type I for 3 days at 140° F. (60° C.); followed by 3 days in dry air at 120° F. (49° C.); and followed by 7 days thermal aging at 250° F. (121° C.) (conditioned).

The as-cured or conditioned sealants were abraded with a Scotch-Brite™ 7447 pad (available from 3M) and then wiped with methyl ethyl ketone before applying an overlying layer of the UV-curable sealant.

An adhesion-promoting composition was applied to the abraded and solvent cleaned sealants with a gauze pad. The constituents of the adhesion-promoting composition are provided in Table 2.

TABLE 2

Adhesion-promoting composition.

| Product | Material | Content (wt %) |
|---|---|---|
| Sartomer ® CN110[1] | difunctional bisphenol A-based epoxy acrylate oligomer | 40.0 |
| Irgacure ® TPO[2] | diphenyl(2,4,6-trimethylbenzoyl)phosphine oxide | 0.8 |
| Acetone | solvent | 59.2 |

[1]Sartomer ® CN-110, 4,4'-isopropylidenediphenol, oligomeric reaction products with 1-chloro-2,3-epoxy propane, ester with acrylic acid, available from Arkema.
[2]Irgacure ® TPO, diphenyl(2,4,6-trimethylbenzoyl)phosphine oxide, available from Ciba.

After drying for 10 min at 25° C./50% RH, the thickness of the adhesion-promoting layer was about 3 µm. A UV SCOD sealant was then applied over the adhesion-promoting layer to a thickness of 0.125 in (3.175 mm). A pre-primed peel medium, for example, a 30-mesh stainless steel screen, was placed on top of the UV SCOD sealant, before an overcoat of the UV SCOD sealant was applied with a thickness of 0.03 in (0.762 mm). The UV SCOD sealant and adhesion-promoting interlayer were exposed to UV at 395 nm (LED source) for 2 min at 0.26 W/cm² using an Omni-Cure® AC475 8W UV LED lamp (Excelitas Technologies). The adhesion of the cured sealant system was evaluated within 24 hours.

The peel strength (pli) and percentage cohesive failure (% cf) for the different sealant systems is provided in Table 3. Specification G9-16AA requires the peel strength to be at least 10 pli (113 N-cm) and 100% cohesive strength.

TABLE 3

Adhesion test results.

|  | PR-2001 pli, % cf[5] | PR-1828 pli, % cf | UV SCOD pli, % cf | PR-1750 pli, % cf | PR-1776 pli, % cf | PR-2007 pli, % cf |
|---|---|---|---|---|---|---|
| Dry[1] | | | | | | |
| BI[3] - 18 h[6] | 56, 100[6] | 48, 100 | 37, 100 | 51, 100 | 55, 100[1] | 34, 100[1] |
| AI[4] | 48, 100 | 37, 100 | 43, 100 | 47, 100[1] | 47, 100[1] | 37, 100 |
| BI - 1 h | 60, 100 | 53, 100 | 48, 100 | 34, 100 | — | — |
| BI - 2 h | 78, 100 | 56, 100 | 56, 100 | 73, 100 | — | — |
| BI - 3 h | 77, 100 | 41, 100 | 40, 100 | 55, 100 | — | — |
| Conditioned[2] | | | | | | |
| BI - 18 h | 41, 100 | 30, 100 | 28, 100 | 28, 100[2] | — | — |
| AI | 27, 100 | 23, 100[1] | 38, 100 | 35, 100 | — | — |
| BI - 1 h | 28, 100 | 20, 100 | 32, 100 | 34, 100[2] | — | 31, 100 |
| BI - 2 h | 28, 100 | 22, 100 | 26, 100 | — | — | 36, 100 |
| BI - 3 h | 35, 100 | 31, 100 | 23, 100 | — | — | 30, 100 |
| AI | — | — | — | 48, 100 | — | — |

[1]Dry: Sealant panels did not undergo conditioning.
[2]Conditioned: Sealant panels went through conditioning cycle (140° F. (60° C.) 3 d in JRF Type I followed by 3 d air dry at 120° F. (49° C.) and 7 d heat aging under 250° F. (121° C.).
[3]BI: Before Immersion.
[4]AI: After JRF Type I immersion for 7 days at 140° F. (60° C.).
[5]Peel strength (pli), % cohesive failure.
[6]Peel strength measured up to 18 h after curing; time indicates time measurement was made after UV cure.

Example 2

Bisphenol A-Based Epoxy Acrylate Adhesion-Promoting Interlayer

A test panel was prepared using the PR1750 sealant as in Example 1.

The adhesion-promoting composition described in Example 1 was applied to the PR1750 test panel as described in Example 1, and following application, the adhesion-promoting composition was exposed to UV radiation for 30 sec under the conditions described in Example 1 to fully cure the adhesion-promoting composition.

A UV SCOD sealant was applied to the cured adhesion-promoting interlayer and cured as described in Example 1. The peel strength and % cohesive failure were determined as described in Example 1. The results are presented in Table 4.

TABLE 4

Adhesion-promoting composition.

| Formula | Application | Sealant (dry) | Peel Test (17 h) |
|---|---|---|---|
| 20 wt % Sartomer ® CN110 0.4 wt % Irgacure ® TPO 79.6 wt % acetone | Precured adhesion-promoting interlayer | PR-1750 | 80.3 pli, 100% CF |

Example 3

Urethane Dimethacrylate Adhesion-Promoting Interlayer

Adhesion testing was performed as described in Example 1 except that the difunctional bisphenol A-based epoxy acrylate oligomer was replaced with a urethane dimethacrylate (UDMA; $R'CH_2[C(CH_3)(R)CH_2]_2CH_2R'$, R is H or $CH_3$, R' is $NHCO_2CH_2CH_2O_2CC(CH_3)=CH_2$). The adhesion was evaluated within 24 h of peel specimen preparation on dry sealant substrates including UV SCOD, PR2001, PR1828 and PR1750. The results are presented in Table 5.

TABLE 5

Adhesion test results.

| Sealant | Peel strength (pli) | % cohesive failure |
|---|---|---|
| UV SCOD | 35 | 100 |
| PR2001 | 55 | 100 |
| PR1828 | 61 | 100 |
| PR1750 | 38 | 100 |

Example 4

Bisphenol A-Based Epoxy Acrylate Adhesion-Promoting Interlayer

A bisphenol A-based epoxy acrylate adhesion-promoting composition was prepared having the constituents indicated in Table 6.

TABLE 6

Adhesion-promoting composition.

| Product | Material | Content (wt %) |
|---|---|---|
| Sartomer ® CN110 | difunctional bisphenol A-based epoxy acrylate oligomer | 40.00 |
| KeyPlast ® Blue A[1] | blue dye | 0.05 |
| Irgacure ® TPO | diphenyl(2,4,6-trimethylbenzoyl)phosphine oxide | 0.80 |
| Acetone | solvent | 59.15 |

[1]KeyPlast ® Blue A, anthraquinone-based pigment available from Milliken Chemical.

Test panels were prepared as in Example 1, with the addition that the adhesion-promoting composition was applied with a Scotch-Brite™ 7447 pad. After applying the adhesion-promoting composition and the overlying UV SCOD sealant, both layers were simultaneously cured using the UV exposure conditions of Example 1.

The peel strength and % cohesive failure for the dry test panels determined as described in Example 1 are presented in Table 7.

TABLE 7

Dry peel strength and % cohesive failure.

| | PR-2001 (pli, % cf) | PR-1828 (pli, % cf) | UV SCOD (pli, % cf) | PR-1750 (pli, % cf) |
|---|---|---|---|---|
| BI - 15 min | 36, 100 | 37, 100 | 35, 100 | 36, 95 |
| BI - 1 h | 38, 100 | 45, 100 | 40, 100 | 39, 95 |
| BI - 4 h | 31, 100 | 39, 100 | 39, 100 | 33, 100 |
| BI - 24 h | 45, 100 | 34, 100 | 34, 100 | 46, 100 |
| AI | 47, 100 | 23, 100 | 50, 100 | 47, 100 |

Example 5

Bisphenol A-Based Epoxy Acrylate Adhesion-Promoting Interlayer

A bisphenol A-based epoxy acrylate adhesion-promoting composition was prepared having the constituents indicated in Table 8.

TABLE 8

Adhesive-promoting composition.

| Product | Material | Content (wt %) |
|---|---|---|
| Sartomer ® CN110 | difunctional bisphenol A-based epoxy acrylate oligomer | 20.0 |
| Irgacure ® TPO | diphenyl(2,4,6-trimethylbenzoyl)phosphine oxide | 0.4 |
| Acetone | solvent | 79.6 |

Test panels were prepared as in Example 1, except that the adhesion-promoting composition was applied by spraying the sealant twice using a Preval® Sprayer. The adhesion-promoting composition was left to dry for 1 min between spray applications. After spraying for the second time, the adhesion-promoting composition was allowed to dry for 30 min and then irradiated with UV from 30 sec as described in Example 1.

After the adhesion-promoting composition was fully cured, a UV SCOD sealant was applied to the cured adhesion-promoting interlayer and exposed to UV for 2 min as described in Example 1.

The peel strength and % cohesive failure for dry and conditioned test panels determined as described in Example 1 are presented in Table 9.

TABLE 9

Dry peel strength and % cohesive failure.

| | PR2001 | PR1828 | UV SCOD | PR1776M | PR2001 | PR1828 | UV SCOD |
|---|---|---|---|---|---|---|---|
| | Dry[1] (pli, % cf) | | | | Conditioned[2] (pli, % cf) | | |
| BI - 17 h | 36, 100 | 40, 100 | 35, 100 | 54, 100 | 26, 100 | 31, 100 | 29, 100 |

Example 6

Bisphenol A-Based Epoxy Acrylate Adhesion-Promoting Interlayer

A bisphenol A-based epoxy acrylate adhesion-promoting composition was prepared having the constituents indicated in Table 10.

TABLE 10

Adhesion-promoting composition.

| Product | Material | Content (wt %) |
|---|---|---|
| Sartomer ® CN110 | difunctional bisphenol A-based epoxy acrylate oligomer | 20.0 |
| Irgacure ® TPO | diphenyl(2,4,6-trimethylbenzoyl)phosphine oxide | 0.4 |
| Acetone | solvent | 79.6 |

Test panels were prepared as in Example 1, except that the adhesion-promoting composition was applied by spraying the underlying sealant once using a Preval® Sprayer. The adhesion-promoting composition was allowed to dry for 30 min and then irradiated with UV for 30 sec as described in Example 1.

After the adhesion-promoting composition was fully cured, a UV SCOD sealant was applied to the cured adhesion-promoting interlayer and exposed to UV for 2 min as described in Example 1.

The peel strength and % cohesive failure for dry and conditioned test panels determined as described in Example 1 are presented in Table 11.

TABLE 11

Dry peel strength and % cohesive failure.

| | PR2007 pli, % cf | P/S870 pli, % cf | PR1782 pli, % cf | PR1772 pli, % cf | UV SCOD pli, % cf |
|---|---|---|---|---|---|
| BI - 2 h | 32, 100 | 41, 100 | 41, 100 | 36, 100 | 36, 100 |
| BI - 24 h | 29, 100 | 38, 100 | 45, 100 | 33, 100 | 33, 100 |

Example 7

Comparative Examples

The adhesion of an underlying sulfur-containing sealant layer to an overlying UV SCOD sulfur-containing sealant was evaluated using different adhesion-promoting interlayers.

The test panels were prepared and evaluated according the Example 1.

The content of the various adhesion-promoting interlayer compositions evaluated is provided in Table 12. In Comparative Test Panels 1-8 the adhesion-promoting compositions were applied using a gauze pad and allowed to dry, the sulfur-containing sealant applied using a brush and fully cured, before applying an overlying UV SCOD sealant, which was UV cured. Test panel 9 was prepared as for Test Panels 1-8, however, both the adhesion promoting interlayer and the UV SCOD sealant were simultaneously cured using UV. For Comparative Test Panels 10-11, the adhesion-promoting composition was cured by exposure to UV, after which the MnO-cured polysulfide sealant (PR-1750) was applied and fully cured, before applying an overlying layer of the UV SCOD sealant, which was cured by exposure to UV. All test panels were evaluated as-prepared (dry conditions) except that in Comparative Example 6, test panels with PR-1782 were tested following conditioning as described in Example 1.

TABLE 12

Multilayer sealants, cure conditions, and adhesion results.

| Adhesion-promoting Interlayer Composition | UV Cure Adhesion-Promoting Interlayer | Sulfur-containing Sealant[9] | Adhesion[10] |
|---|---|---|---|
| 1 PR-188[1] | No[6] | PR-2001 | 100% AF |
| 2 PR-142[1] | No[6] | PR-2001 | 100% AF |
| 3 PR-148 clear[1] | No[6] | PR-2001 | 100% AF |
| 4 PR-1826[1] | No[6] | PR-2001 | 100% AF |
| 5 PR-187[1] | No[6] | PR-2001 | 100% AF |
| 6 5 wt % Laromer ® PR-9000[2] in isopropanol | No[6] | PR-2001, PR-1776M, PR-1750, PR-1828 (dry and conditioned), PR-1782 | 100% AF |
| 7 1 wt % Laromer ® PR9000[2] in isopropanol | No[6] | PR-2001, PR-1776M, PR-1750 | 100% AF |
| 8 1 wt % Laromer ® PR9000[2] with 0.001% dibutyltin dilaurate in isopropanol | No[6] | PR-2001, PR-1776M, PR-1750 | 100% AF |
| 9 10 wt % Sartomer ® CN-110[3] 0.2 wt % Irgacure ® 651/89[4] 89.8 wt % methyl ethyl ketone | Simultaneous[7] | PR-2001, PR-1776M, PR-1750, UV SCOD | 100% AF |
| 10 10 wt % Sartomer ® CN-110[3] 0.2 wt % Irgacure ® TPO4 89.8 wt % acetone | Precured adhesion promoter[8] | PR-1750 | 48 pli, 45% CF[9] |
| 11 5 wt % Sartomer ® CN-110[3] 0.1 wt % Irgacure ® TPO[4] 94.9 wt % acetone | precured adhesion promoter[8] | PR-1750 | 39 pli, 80% CF |

[1]Commercially avilable sealants from PPG Aerospace containing solvents and organo-functional organosilanes.
[2]Laromer ® PR9000, isocyanate-functional aliphatic acrylic ester available from BASF. These adhesion promoting compositions did not include a photoinitator.
[3]Sartomer ® CN-110, difunctional bisphenol A-based epoxy acrylate oligomer available from Sartomer.
[4]Irgacure ® 651, 2,2-dimethozy-1,2-diphenylethan-1-one, Ciba Specialty Chemicals.
[5]Irgacure ® TPO, diphenyl(2,4,6-trimehtylbenzoyl)phosphine oxide, Ciba Specialty Chemicals.
[6]The adhesion-promoting compositions did not include a photoinitiator and therefore were not directly UV-cured.
[7]Sealant and adhesion-promoting interlayer cured simultaneously.
[8]Adhesion-promoting interlayer cured, sealant applied over cured interlayer, and applied sealant cured.
[9]See Example 1 for description of sealants.
[10]Dry measurement unless noted; 24 h peel data: AF 100% adhesive failure; CF cohesive failure; pli/% cohesive failure.

Finally, it should be noted that there are alternative ways of implementing the embodiments disclosed herein. Accordingly, the present embodiments are to be considered as illustrative and not restrictive. Furthermore, the claims are not to be limited to the details given herein and are entitled to their full scope and equivalents thereof.

What is claimed is:

1. A multilayer sealant comprising:
    a first sulfur-containing sealant layer, wherein the first sulfur-containing sealant layer comprises a crosslinked first sulfur-containing prepolymer;
    an adhesion-promoting interlayer overlying the first sulfur-containing sealant layer; and
    a second sulfur-containing sealant layer overlying the adhesion-promoting interlayer, wherein the second sulfur-containing sealant layer comprises a free radical polymerized second sulfur-containing prepolymer,
    wherein the adhesion-promoting interlayer comprises a crosslinked free radical polymerized compound.

2. The multilayer sealant of claim 1, wherein the first sulfur-containing sealant layer comprises a damaged and/or aged sealant layer.

3. The multilayer sealant of claim 1, wherein each of the first sulfur-containing prepolymer and the second sulfur-containing prepolymer independently comprises a polythioether prepolymer, a polysulfide prepolymer, a sulfur-containing polyformal prepolymer, a monosulfide prepolymer, or a combination of any of the foregoing.

4. The multilayer sealant of claim 1, wherein each of the first sulfur-containing sealant layer and the second sulfur-containing sealant layer has a sulfur content greater than 10 wt %, where wt % is based on the total weight of the respective sealant layers.

5. The multilayer sealant of claim 1, wherein the adhesion-promoting interlayer comprises a polymerized urethane di(meth)acrylate monomer or a polymerized urethane di(meth)acrylate oligomer.

6. The multilayer sealant of claim 1, wherein the adhesion-promoting interlayer comprises a free radical catalyzed reaction product of an adhesion-promoting composition, wherein the adhesion-promoting composition comprises:
   a free radical polymerizable compound;
   a free radical initiator; and
   a volatile organic solvent.

7. The multilayer sealant of claim 1, wherein the second sulfur-containing sealant layer is transmissive to actinic radiation.

8. The multilayer sealant of claim 1, wherein each of the first sulfur-containing sealant layer and the second sulfur-containing sealant independently comprises a reaction product of reactants comprising:
   a sulfur-containing prepolymer and a curing agent;
   the reaction product of a thiol/thiol condensation reaction; or
   the reaction product of a free radical initiated thiol/alkenyl reaction and/or thiol/alkynyl reaction.

9. The multilayer sealant of claim 8, wherein the curing agent comprises a polyepoxide, a polyalkenyl, a polyalkynyl, a polyfunctional Michael acceptor, a polythiol, or a combination of any of the foregoing.

10. The multilayer sealant of claim 8, wherein the sulfur-containing prepolymer comprises a thiol-terminated polythioether prepolymer, a thiol-terminated polysulfide prepolymer, a thiol-terminated sulfur-containing polyformal prepolymer, a thiol-terminated monosulfide prepolymer, or a combination of any of the foregoing.

11. The multilayer sealant of claim 1, wherein the adhesion-promoting interlayer comprises a polymerized epoxy (meth)acrylate monomer, a polymerized epoxy (meth)acrylate oligomer, a polymerized urethane (meth)acrylate monomer, a polymerized urethane (meth)acrylate oligomer, a polymerized trifunctional (meth)acrylate monomer, a polymerized trifunctional (meth)acrylate oligomer, or a combination of any of the foregoing.

12. The multilayer sealant of claim 11, wherein,
   the polymerized urethane (meth)acrylate monomer comprises a difunctional epoxy (methacrylate monomer; and
   the polymerized urethane (meth)acrylate oligomer comprises a difunctional epoxy (meth)acrylate oligomer.

13. The multilayer sealant of claim 1, wherein the adhesion-promoting interlayer comprises a polymerized bisphenol A type epoxy (meth)acrylate oligomer.

14. The multilayer sealant of claim 13, wherein the polymerized bisphenol A type epoxy (meth)acrylate oligomer comprises a polymerized difunctional bisphenol A type epoxy (meth)acrylate oligomer.

15. The multilayer sealant of claim 1, wherein the adhesion-promoting interlayer has a thickness from 1 μm to 20 μm.

16. The multilayer sealant of claim 15, wherein the adhesion-promoting interlayer has a thickness from 1μm to 10 μm.

17. The multilayer sealant of claim 1, wherein the second sulfur-containing sealant layer comprises a free radical catalyzed reaction product of reactants comprising:
   a polythiol; and
   a polyalkenyl, a polyalkynyl, or a combination thereof.

18. The multilayer sealant of claim 17, wherein,
   the polythiol comprises a thiol-terminated polythioether prepolymer;
   the polyalkenyl comprises a monomeric polyalkenyl;
   the polyalkynyl comprises a monomeric polyalkynyl; or
   a combination of any of the foregoing.

19. The multilayer sealant of claim 1, wherein the first sulfur-containing sealant layer overlies a substrate.

20. The multilayer sealant of claim 19, wherein the substrate comprises a surface of a vehicle.

21. The multilayer sealant of claim 20, wherein the substrate comprises a surface of an aerospace vehicle.

22. The multilayer sealant of claim 19, wherein the substrate comprises a surface of a part.

23. A vehicle comprising the multilayer sealant of claim 1.

24. The vehicle of claim 23, wherein the vehicle comprises an aerospace vehicle.

\* \* \* \* \*